United States Patent [19]

Hosaka et al.

[11] Patent Number: 5,701,481

[45] Date of Patent: Dec. 23, 1997

[54] DATA PROCESSING APPARATUS WHICH OPERATES IN A PLURALITY OF OPERATION MODES AND INCLUDES FIRST AND SECOND MONITORING MEANS

[75] Inventors: Masao Hosaka, Sagamihara; Yoshimasa Kimura, Kawasaki; Hisashi Sakamaki, Yokohama, all of Japan

[73] Assignee: Canon Kabushiki Kaisha, Tokyo, Japan

[21] Appl. No.: 509,723

[22] Filed: Aug. 1, 1995

Related U.S. Application Data

[62] Division of Ser. No. 430,603, Apr. 28, 1995, Pat. No. 5,499,370, which is a continuation of Ser. No. 29,297, Mar. 8, 1993, abandoned, which is a continuation of Ser. No. 391,719, Aug. 7, 1989, abandoned, which is a continuation of Ser. No. 615,106, May 19, 1984, abandoned.

[30] Foreign Application Priority Data

May 31, 1983 [JP] Japan ............... P58-97273
May 31, 1983 [JP] Japan ............... P58-97274

[51] Int. Cl.$^6$ ............... G06F 9/00
[52] U.S. Cl. ............... 395/676
[58] Field of Search ............... 395/600, 676

[56] References Cited

U.S. PATENT DOCUMENTS 3,648,253  3/1972  Mullery et al. ............... 395/600

*Primary Examiner*—Krisna Lim
*Attorney, Agent, or Firm*—Fitzpatrick, Cella, Harper & Scinto

[57] ABSTRACT

An image forming system comprises means for image forming program modules one for each task and a plurality of monitor means for controlling a program. A predetermined one of the monitor means divides the program modules into blocks in accordance with a control mode, controls the blocks and controls the program in cooperation with the plurality of monitor means.

8 Claims, 35 Drawing Sheets

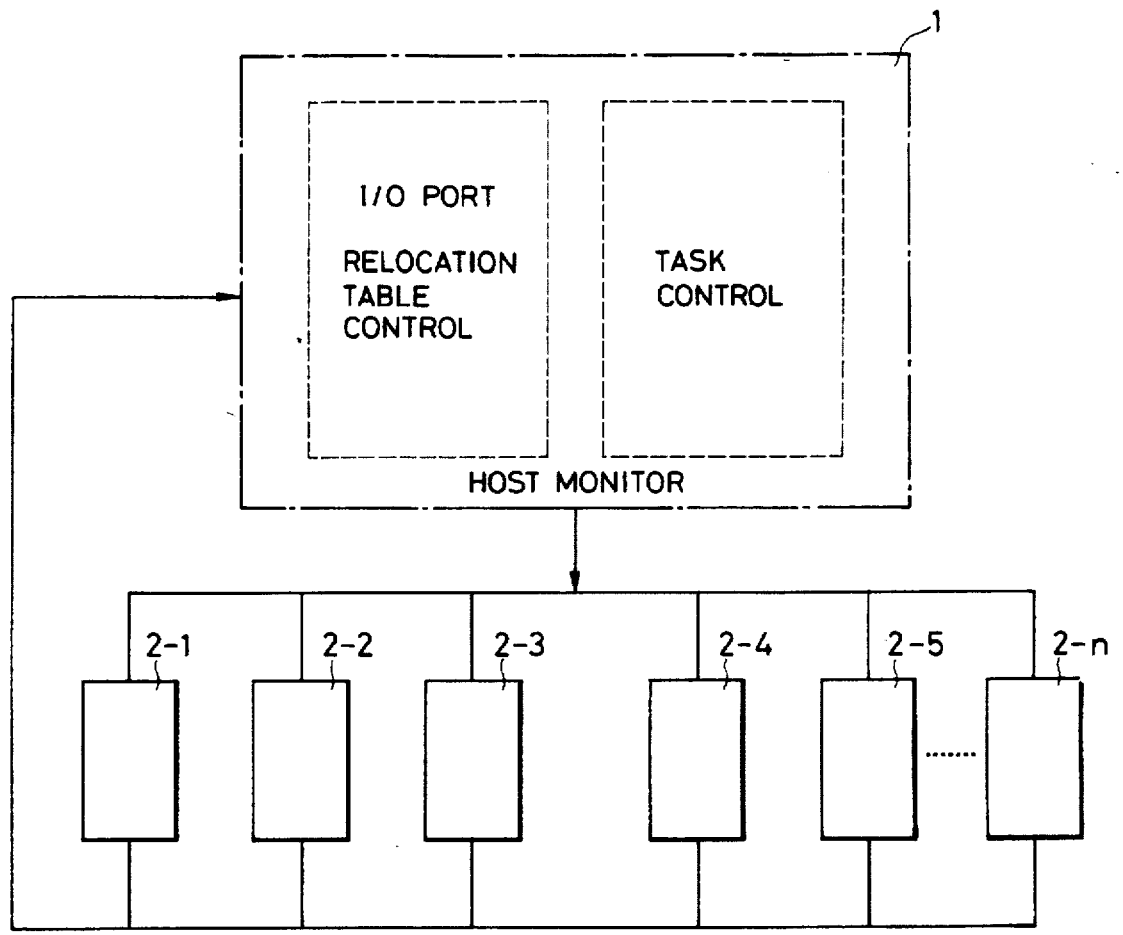

FIG. 4

| PORT BIT LABEL | | PORT TABLE | | | | | | | |
|---|---|---|---|---|---|---|---|---|---|
| | | $b_7$ | $b_6$ | $b_5$ | $b_4$ | $b_3$ | $b_2$ | $b_1$ | $b_0$ |
| IOPRT | 01 | | | | | | | | |
| | 02 | | | | | | | | |
| | 03 | 1 | 1 | 1 | 1 | 1 | 1 | 1 | 1 |
| | 04 | | | | | | | | |
| | 05 | | | | | | | | |
| IOPRT | 06 | | | | | | | | |
| | 07 | | | | | | | | |
| | 08 | 0 | 0 | 0 | 0 | 0 | 0 | 0 | 0 |
| | 09 | | | | | | | | |
| | 10 | | | | | | | | |
| IOPRT | 11 | | | | | | | | |
| | 12 | | | | | | | | |
| | 13 | 1 | 1 | 1 | 1 | 0 | 0 | 0 | 0 |
| | 14 | | | | | | | | |
| | 15 | | | | | | | | |
| IOPRT | 16 | | | | | | | | |
| | 17 | | | | | | | | |
| | 18 | 0 | 0 | 0 | 0 | 1 | 1 | 1 | 1 |
| | 19 | | | | | | | | |
| | 20 | | | | | | | | |

FIG. 6-a
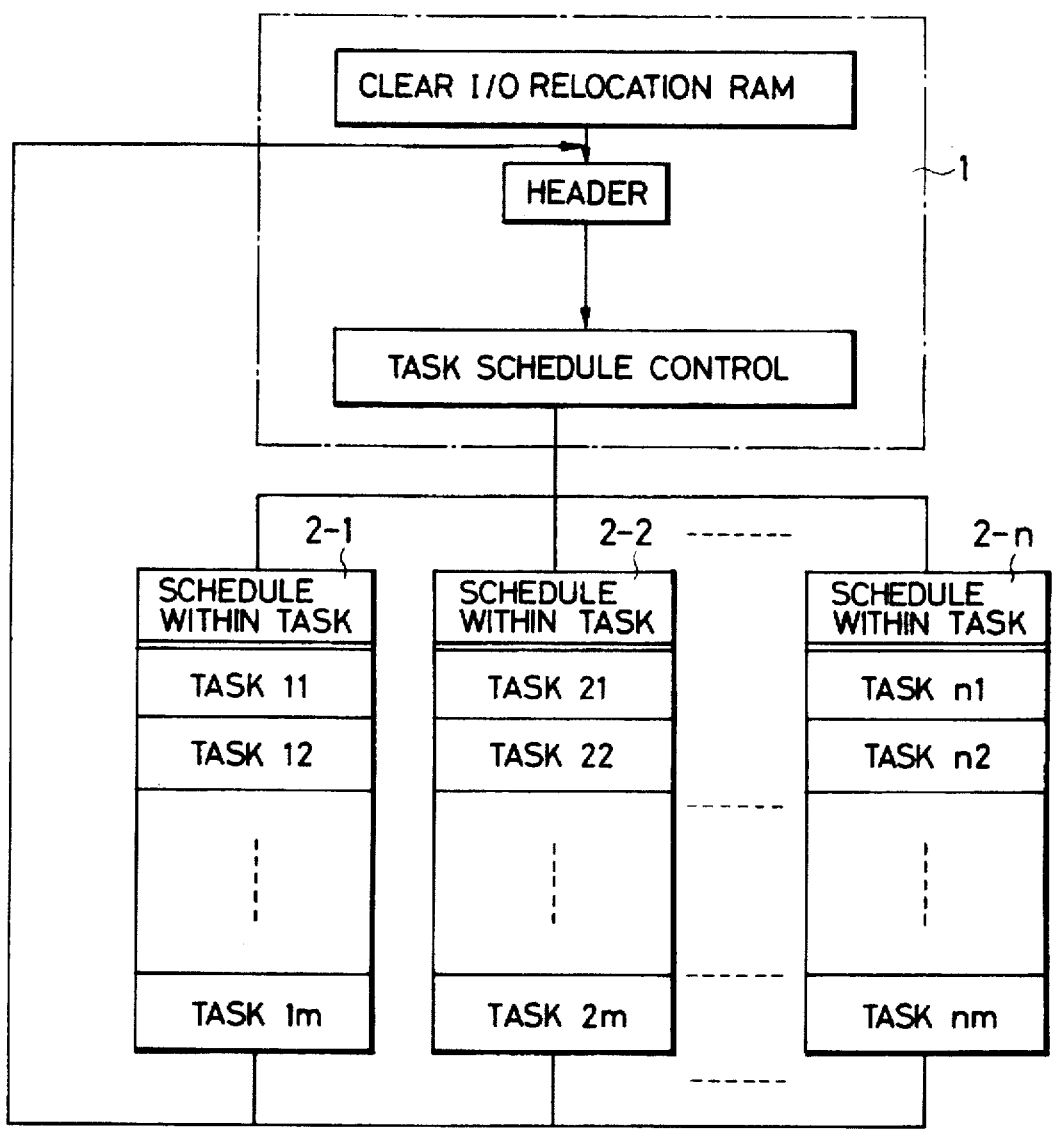
FIG. 6-b
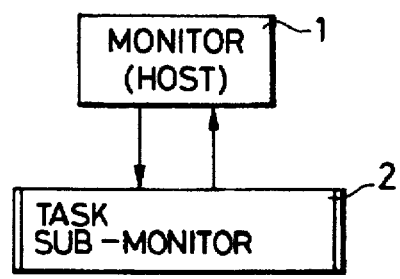

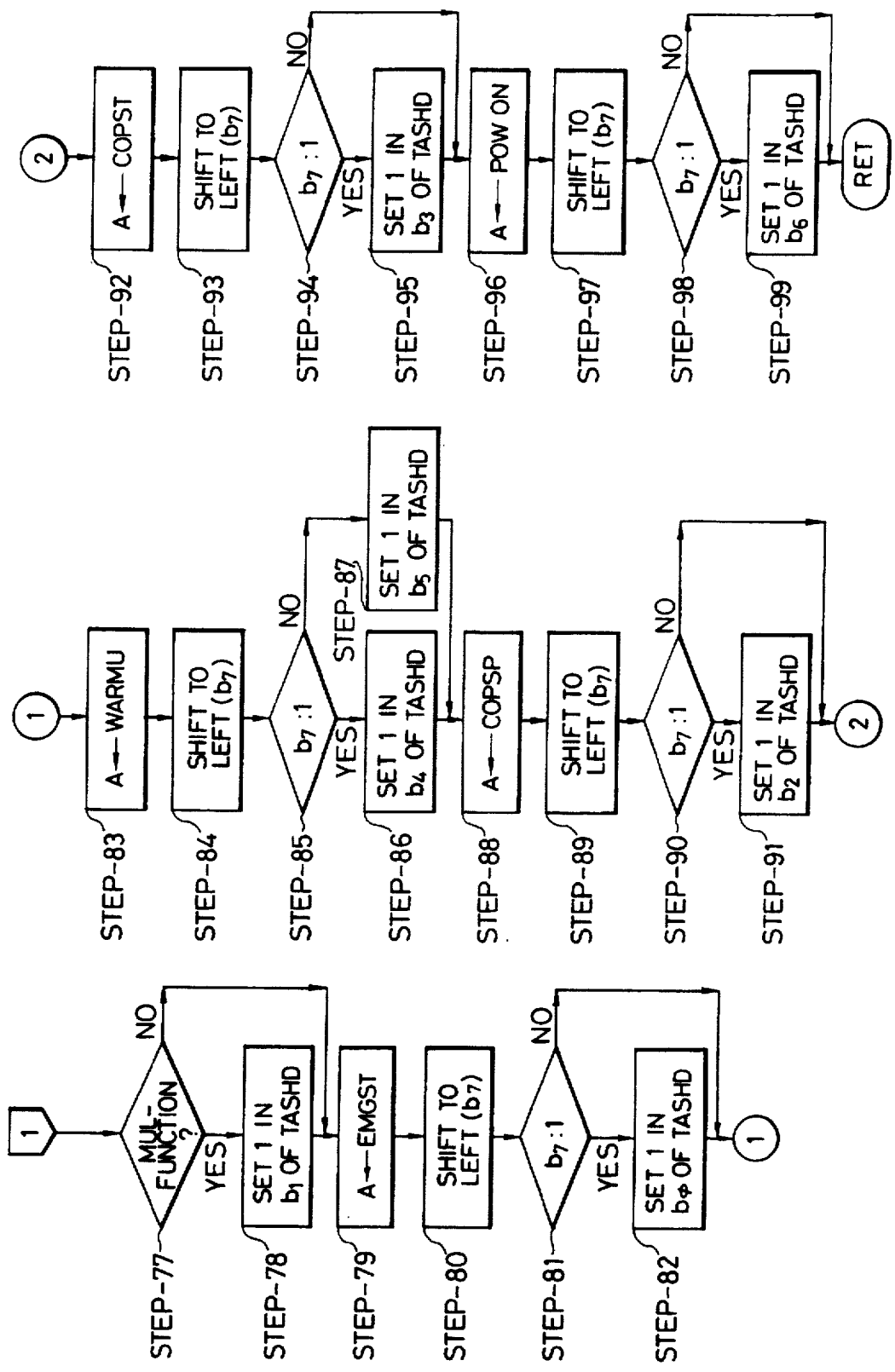

MALFUNCTION MODE
( HARDY MALFUNCTION) : MALFN

MALFUNCTION MODE
( LIGHT MALFUNCTION) :
- ABNOM 1 (JAM)

- ABNOM 2 (NO SUPPLY)

DIAGNOSIS MODE : DIAGN

STEADY MODE : CPMOD (MODE)

DATA PROCESSING APPARATUS WHICH OPERATES IN A PLURALITY OF OPERATION MODES AND INCLUDES FIRST AND SECOND MONITORING MEANS

This application is a division of application Ser. No. 08/430,603 filed Apr. 28, 1995, now U.S. Pat. No. 5,499,370 which is a continuation of application Ser. No. 08/029,297 filed Mar. 8, 1993, now abandoned, which is a continuation of application Ser. No. 07/391,719 filed Aug. 8, 1989, now abandoned, which is a continuation of application Ser. No. 06/615,106 filed May 19, 1984, now abandoned.

BACKGROUND OF THE INVENTION

1. Field of the Invention

The present invention relates to an image forming system.

2. Description of the Prior Art

In the development of an image forming apparatus having a microcomputer, such as a laser beam printer, a facsimile machine, an OCR or an electronic file, a program has been developed for each design of a machine or a unit. Accordingly, it is used only once and is not applicable to other machines, and hence a development efficiency is low. Furhter since a sequence control program and an automatic control program are not separated by a monitor, they are mixedly present in one program package. The program mainly depends on a personal characteristic of a programmer and the content thereof can be comprehended by only the programmer who developed it. The length of the program and a time required for debugging vary in a wider range. A freedom to a change of specification is low and the addition or the modification of the program requires reconstruction of the program and hence rewriting of the program.

SUMMARY OF THE INVENTION

It is an object of the present invention to provide an image forming system in which programs are constructed in modules, which are combined as required and supervised by a monitor.

It is another object of the present invention to provide an image forming system in which programs are stored in a library and necessary programs are selected from the library without developing a new program, to efficiently construct the program.

It is other object of the present invention to provide an image forming system which facilitates the development of a program of the image forming system to attain an efficient software architecture.

It is other object of the present invention to provide an image forming system which has means for constructing programs in modules one for each task and configurating tasks to be processed upon the occurrence of an event.

It is other object of the present invention to provide an image forming system having a monitor which comprises a header for detecting the occurrence of error and the occurrence of an event, means for counting timing pulses, means for controlling a zero-crossing pulse and means for controlling a task.

It is other object of the present invention to provide an image forming system having a monitor for supervising a program and means for configuring tasks by program modules divided for each task in accordance with the occurrence of an event.

It is other object of the present invention to provide an image forming system in which a long program is constructed by programs divided for each task and the long program is controlled by an execution supervisory program so that a complex program can be readily constructed.

It is other object of the present invention to provide an image forming system in which a solid-state monitor or a silicon monitor is resident on a memory of a one-chip microcomputer (MPU) or an external memory of the MPU to facilitate the development of a program and the supervision of the program.

It is other object of the present invention to provide an image forming system in which a program is divided into a sub-program which controls the image forming system to handle a task and a sub-program which supervises the first sub-program and acts as a core of the overall program.

BRIEF DESCRIPTION OF THE DRAWINGS

FIG. 3 shows a structure of a monitor, FIG. 4 shows an input/output port bit pattern, FIG. 6a shows a configuration of the monitor, FIG. 6b illustrates reception and grant of an execution right by the monitor, FIG. 13-1 shows a hardware configuration, FIG. 13-2 illustrates a fan-out of an interrupt input, FIG. 13-3 illustrates a test for the interrupt input, FIG. 14-1 shows a connection with peripheral devices, FIG. 14-2 shows a system configuration, FIGS. 17-1, 17-2, 17-3, 17-4, 17-5, 17-6, 17-7, 17-8, 17-9 and 17-10 show flow charts to explain structural functions of a host monitor, FIG. 21-1 shows generation of the ZCP from an AC, FIG. 21-2 shows a partial enlarged view of FIG. 4-1, FIG. 21-3 shows a structure of a flag register of zero-crossing pulse control, FIG. 21-4 shows a flow chart of the zero-crossing pulse control, FIGS. 25-1 and 25-2 are general flow charts showing the function of the monitor.

DETAILED DESCRIPTION OF THE PREFERRED EMBODIMENTS

Figure 1:
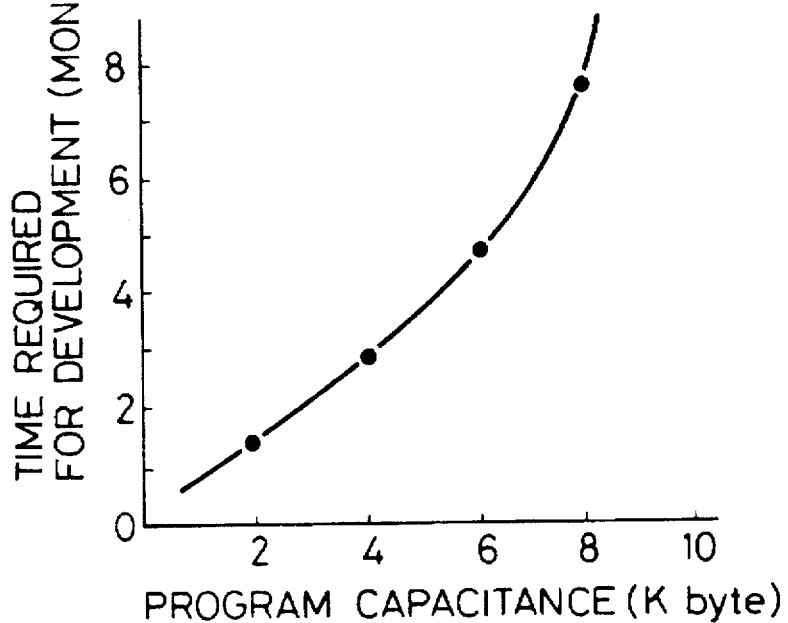
FIG. 1 shows a relation between a program capacity and the number of days required to develop the program.

In general, it is difficult to standardize a program to compare with a hardware because a specification differs from product to product and an operation also differs. However, in an image forming system such as a copying machine, even if processes are different or copy speeds are different, only a content of a controlled system changes and an overall configuration must not change. In the copying machine, a control program may be divided into three major categories. They are a process control which sets and resets a load in a predetermined sequence by a predetermined timing, an automatic control system constructed in a closed loop on a program in accordance with a signal from a sensor, and a supervisory program for supervising and operating those programs. The process control includes a timing control and setting and resetting of the load by reading a timing (which is, in most cases, a clock pulse generated in synchronism with a rotation of a motor or a photosensitive drum). The automatic control includes a temperature control for maintaining a temperature of a fixing heater at a constant temperature, an automatic toner density control, a photosensitive material potential control, an automatic light intensity control by reading an original sheet density pattern and a lamp control for maintaining a light intensity at a constant level. The supervisory program checks the progress of the process in the process control and, if it is in the course of the process, controls the load to further proceed the process. Under this condition of the machine (and also in the program Of the automatic control system), a flag is set and reset as the process proceeds. Thus, the supervisory program checks the flag to acquire a supervision right to the process to be next executed. For example, if an abnormal condition is detected, the AC power is immediately cut off or only the copying process is stopped And an instruction for repair is displayed or audibly announced, depending on the degree of abnormality. The supervisory program supervises the execution of such a program and usually called an OS.

The present invention is based on the fact that the control program in the electronic equipment, particularly in the image forming system does not basically change even if the process changes. The electronic equipment is not limited to the image forming system. Instead of manufacturing hardware and a software for each product, the hardware is standardized to standardize a frame of the program, and the operation system (OS) for controlling the image forming system is prepared and an application program inherent to each product is also prepared to eliminate the shortcomings encountered in the prior art system.

More specifically, the automatic control program, the process control program and the execution supervisory programs are constructed in module, and if the process is to be changed, parameters are changed if the change is minor, or programs are added in accordance with the addition of the function. Program menus are arranged one for each module and selectively used.

When a high performance hardware is used for a low hierarchy unit, it may be considered redundant and wasteful. However, a cost of a semiconductor chip is decreasing more and more as the technology advances. From general consideration of a scale merit due to the standardization, an efficiency of production and an improvement of mass production, the use of the high performance hardware in the low hierarchy unit leads to the improvement of reliability and the cost reduction.

Figure 2:
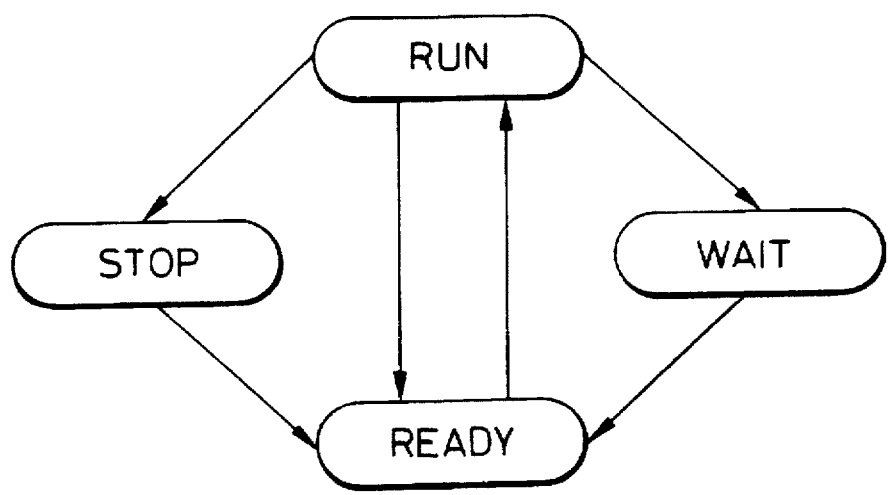
FIG. 2 shows a task transition chart.

In the present invention, instead of preparing a long and complex single program, the program is divided into tasks to be individually executed and those sub-programs are controlled by the execution supervisory program. In this manner, the complex program can be readily prepared. Such an execution supervisory program (OS) is referred to as a small real-time monitor (or real time monitor). The real time monitor is a monitor program which controls the programs such that a plurality of tasks are parallelly executed by one MPU. Apparently, the plurality of tasks are parallelly executed under the control of the real-time monitor, but at each instant only one task is executed by the MPU and the other tasks are in waiting state. FIG. 2 shows a task status transition chart. The task is in one of the status shown in FIG. 2. In a "stop" status, there is nothing to be processed and a start from other task is being waited. In a "ready" status, a task can be executed but it is waiting because the CPU is being used by other task. In a "run" status, a task occupies the CPU to execute instructions. In a "wait" status, occurrence of a certain event is waited.

In the real-time processing of the copying machine, highly urgent programs and relatively non-urgent programs are mixed. For example, a thermal overrun of a heater in an abnormal condition detection task has a high priority and a sequence control carried out at a constant timing has a relatively low priority. Accordingly, in order to attain coordinated scheduling, the priorities are classified and controlled for each class. In the task scheduling of the present embodiment, headers are provided in the monitor and they are checked with the highest priority to select the task.

Figures 1, 13:
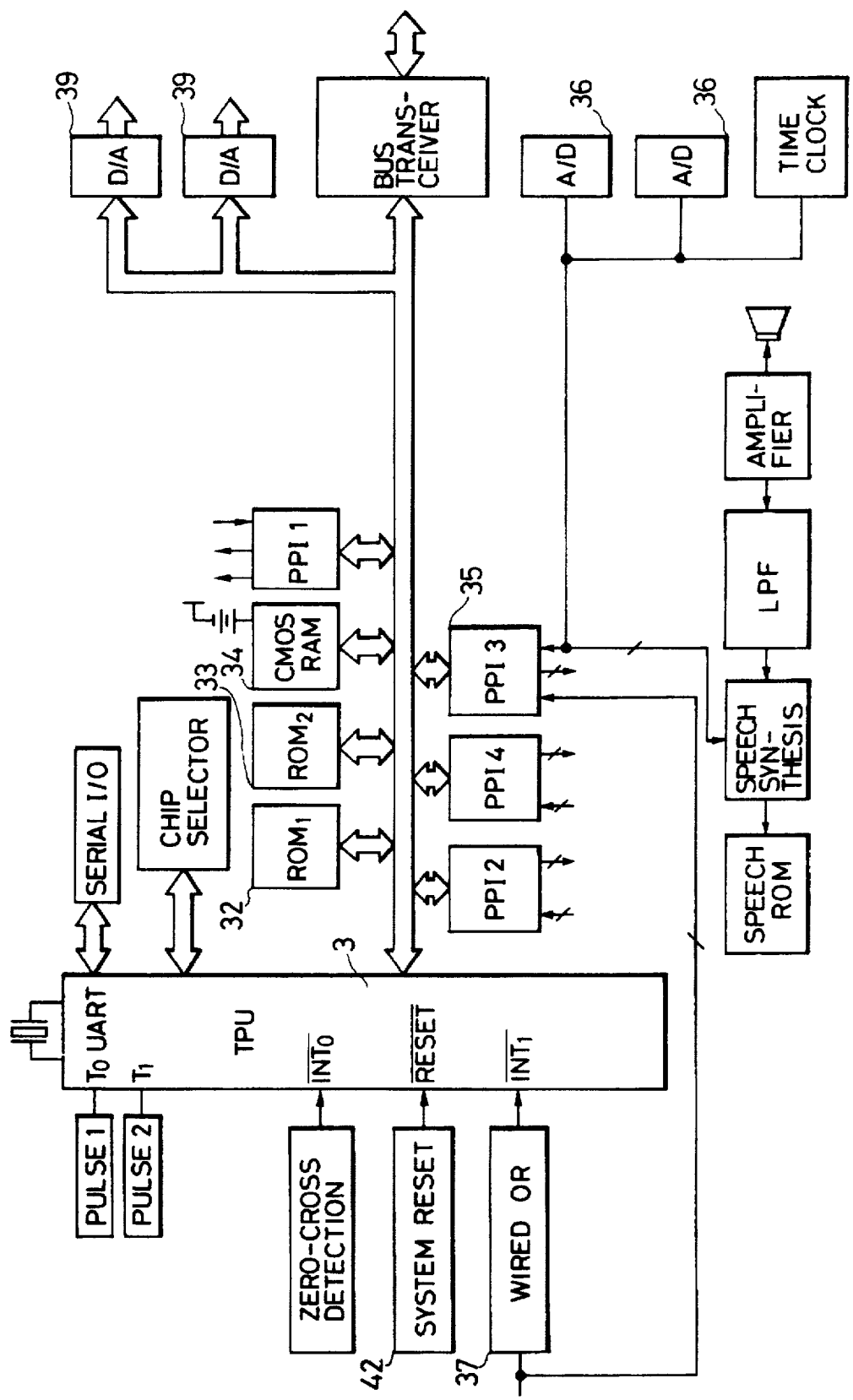
Figures 2, 13:
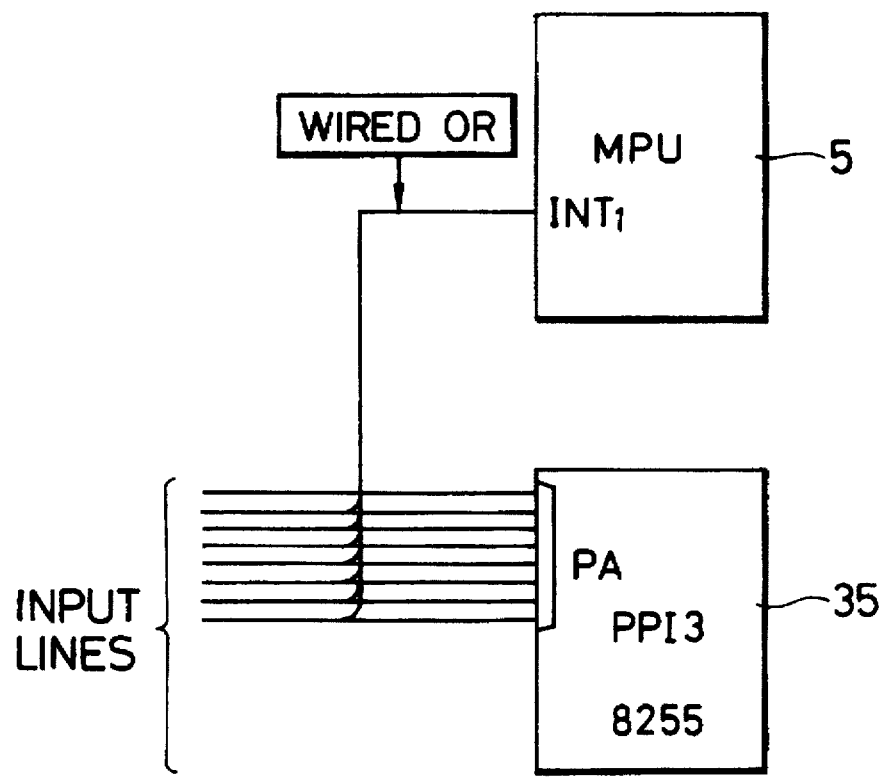
Figures 3, 13:
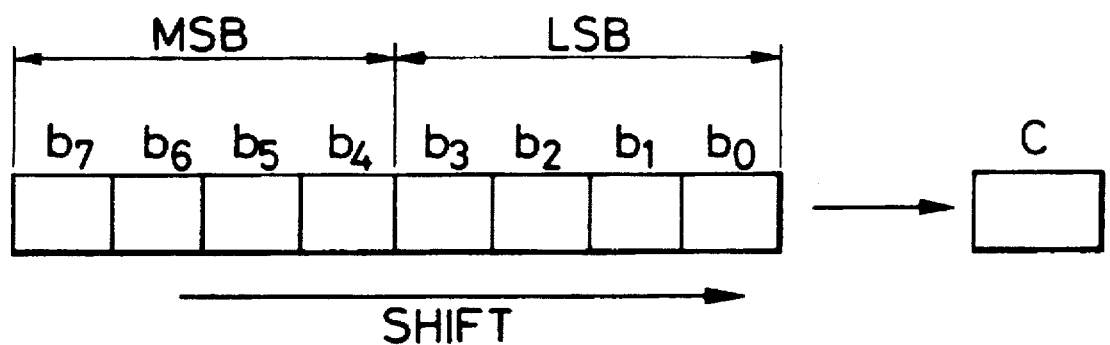

FIG. 3 shows a construction of the real time monitor of the present embodiment. The real time monitor for the copying machine comprises a host monitor 1 and interblock sub-monitors 2-1~2-n. The task generation, deletion and synchronization are carried out by the host monitor and the sub-monitors.

An I/O port relocation table in FIG. 3 is an I/O address table on a hardware. A label is set for each 8 bits and an absolute address is added at the time of initialization. A bit pattern of the I/O port is determined based on the label as shown in FIG. 4. In FIG. 4, IOPRT 01~IOPRT 05 have all "1" bits and they are OUT ports. INPRT 06~INPRT 10 have all "0" bits and they are IN ports. In INPRT 11~INPRT 16, MSBs b7~b4 are "1" and LSBs b3~b0 are "0". Thus, the four MSB bits are OUT ports and the four LSB bits are IN ports. In IOPRT 17~IOPRT 21, four MSB bits are IN ports and four LSB bits are OUT ports. When a program designer initially sets the I/O, he/she may select necessary ports from FIG. 4 and specify addresses. For example, if IOPRT 01 is designated to I/O address 2000H, all bits are OUT ports. To set or reset the bits, INPRT 0 is accessed to control the bits. Similarly, if IOPRT 06 is designated to address 2001H, all bits are IN ports. In this case, since the port label and the port address have one-to-one correspondence, one I/O label cannot be used to more than one addresses. Such I/O is used as a system macro. For example, an I/O handler macro is shown below.

TABLE 1

| High Order Macro | Entry Name | Function |
|---|---|---|
|  | ¥IOINT | Initialize I/O ports |
| ¥IOHND | ¥IOSET | Set I/O port inputs/outputs |
|  | ¥IOCHK | Check I/O ports |

The reception and the delivery of parameters of the system macro are carried out via a register. The macro ¥IOCHK checks if the content of the I/O port is equal to the content of the register, and if they are not equal, corrects it by the content of the register (or data memory). It is mainly used to check the OUT port. When an I/O LSI device is reset by a noise or a disturbance, it is immediately set to a correct value. Accordingly, a sequence trouble is avoided and a reliability is improved.

The task control of the host monitor 1 of FIG. 3 controls the task generation, deletion and execution, controls the copy process and checks the abnormal mode. They are carried out by checking the flag or the status. As the copy process is executed, basic status and flags are generated and deleted (set and reset) in the system macro. The copy process is illustrated in a flow chart of FIG. 5, which is for a copying machine with a heater. The MPU is usually executing a certain step. This, execution status is stored in the register or the data memory as the status or the flag.

Figure 5:
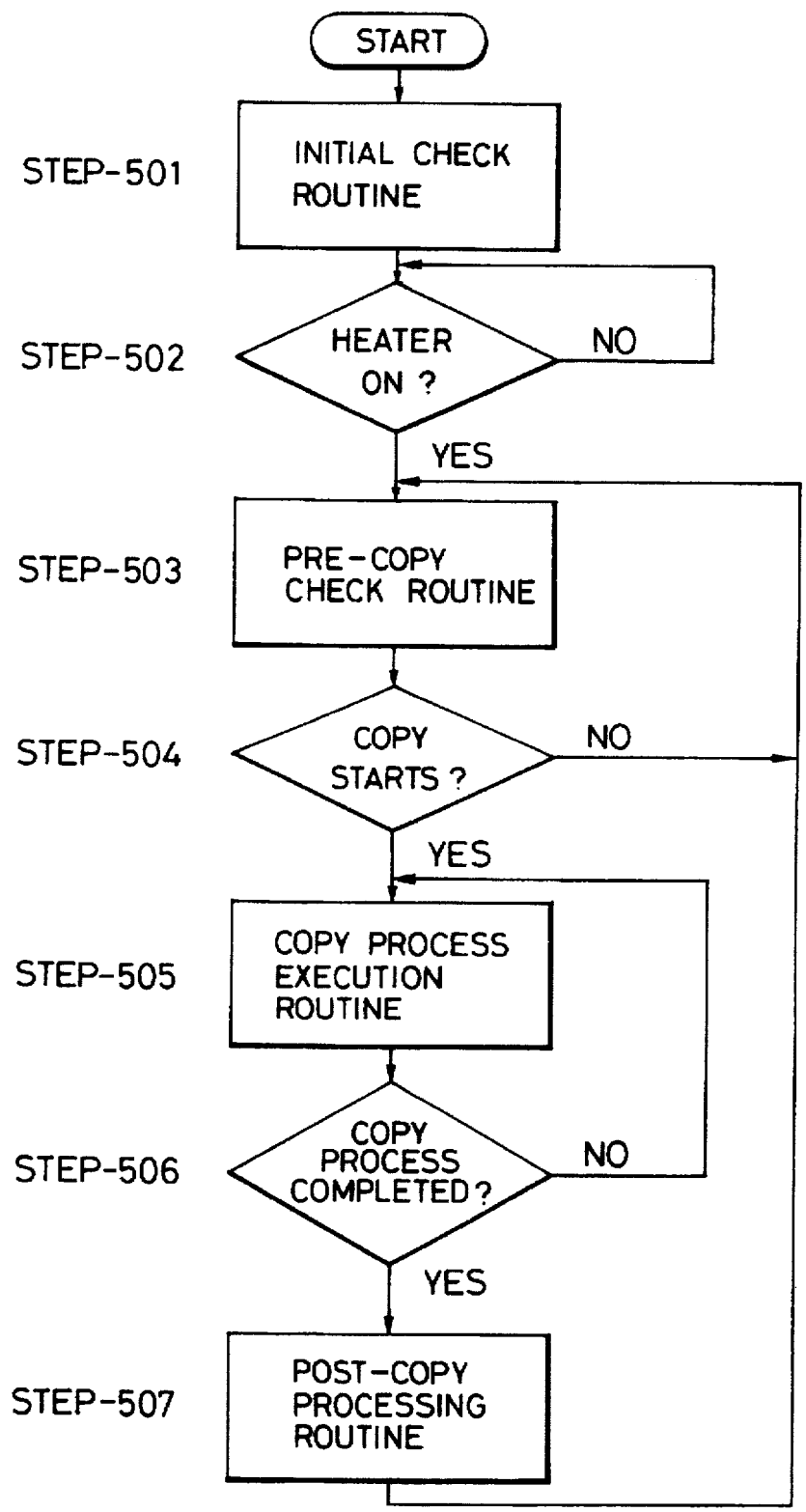
FIG. 5 is a flow chart of a copy process.

In a step 501 of FIG. 5, a power is turned on by an operator. A power unit is still in an off state and the MPU carries out an initial check and initialization. In the initial check, it is checked if there is a danger in energizing the power unit, if a paper is jammed near a heater, if a heater temperature sensor is in failure and if an exposure lamp control circuit is normal.

Mechanical units of the machine are them initialized. This is usually called positioning. If a slider is not at a home position, it is returned to the home position, and cams and rings are positioned to home positions. They are checked not only in the step 501 but also in a pre-copy wait state in a step 503. If it is determined that there is no problem in energizing the power unit, a relay for the load energization power unit is closed.

In a step 502, the power unit is energized and the heater is powered and heated to a predetermined fixing temperature. The status of the machine is checked until the predetermined temperature is reached.

The step 503 is a pre-copy stand-by state. The heater of the fixing unit is controlled to the predetermined temperature. Any abnormal condition is always monitored in this routine. The preset number of copies to be made is displayed and a key input is scanned to search an operator command.

In a step 504, a copy start key is checked. If it is in a copy start state, the copy process is immediately started.

In a step 505, the copy process is executed. It is executed by a series of programs for charging, exposing, developing, transferring, discharge cleaning, paper feeding, registering, separation, conveying and fixing.

In a step 506, the termination of the copy process is checked. When the preset number of copies to be made is equal to the number of copies made, a copy end flag is set and a post-copy routine is started.

A step 507 is a post-copy processing step in which the photo-sensitive material is cleaned in preparation for the next copy. If the next copy operation is ready during this step, "copy OK" is displayed even before the completion of the step. When the copy start key is on, the copy process of the step 505 is immediately started.

The series of copy processes have thus been explained with reference to the general flow chart. Those copy process comprises an aggregation of a number of tasks. The tasks necessary for the copy operation are divided to the respective copy stages (processing steps and check routines of the flow chart of FIG. 5), and the monitor for supervising the stages and the sub-monitors for supervising blocks each consisting of tasks necessary for processing each stage are provided. FIG. 6-a shows a construction of the monitor.

When the power is turned on, the MPU starts from the address 0. It clears the RAM (data memory register) and initializes a stack pointer. It relocates the IN ports and the OUT ports in accordance with the system so that it can be used in the same program module for different types of machine and different hardware configurations. The header checks the flag or status to check the occurrence of the task to be urgently processed, and if it is, the processing of the other task is interrupted and the urgent task is processed. The task schedule control controls the execution order of the series of copy processes. The schedule of the task is determined by setting and resetting the status or the flags in accordance with the result of the execution of the tasks, and the destination task block is selected.

In the present invention, the copy job is divided into blocks of the copy stage, and the selection of the task schedule and the check of the urgent task are carried out in the monitor.

After the execution right of the MPU is shifted to the task block (stage) by the selection of the task, a module to be executed is selected by the monitor (2-1-2-n) in the task block. However, the MPU is not neamattened in the stage and the execution right of the monitor is received or delivered in the header→task schedule control→stage of the monitor. FIG. 6b shows a relation thereof.

Figure 7:
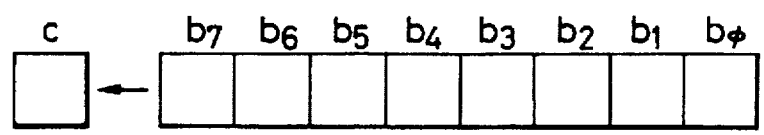
FIG. 7 shows a structure of a status flag which is tested by a header of the monitor.

FIG. 7 shows a format of a status flag tested by the header of the monitor. It consists of 8 bits. The status flag includes HAZD1, HAZD2, EMGST, WARMU, COPSP, COPST and POWON.

HAZD1 shows a heavy abnormal status, and the AC power is cut off and the machine is stopped when this status bit is set. In FIG. 7, b7 is a flag which is set to "1" when factors b0–b6 are active. The factors are shown below.

TABLE 2-1

| HAZD 1 | |
| --- | --- |
| b7 | Status |
| b6 | Heater thermal overrun |
| b5 | Exposure lamp controllable |
| b4 | Jam in fixing unit |
| b3 | Main motor lock |
| b2 | Optical system lock |
| b1 | Front cover open |
| b0 | Top cover open |

If b7 is "1", a carry is generated by executing a shift left command once and the AC power is cut off. Thus, the MPU executes an error processing routine.

HAZD2 shows a light abnormal status. When this status is detected by the generation of the carry after the execution of the shift left command once, the current copy cycle is continued but the next copy cycle is stopped or supplement of supply (toner etc) is requested to an operator. The abnormal status can be detected by the number of times of shift. A relation between factors and bits is shown below.

TABLE 2-2

| HAZD 2 | |
| --- | --- |
| b7 | Status |
| b6 | No paper in upper cassette |
| b5 | No paper in lower cassette |
| b4 | No toner |
| b3 | Heater broken |
| b2 | Thermister broken |

TABLE 2-2-continued

| HAZD 2 | |
|---|---|
| b1 | Lamp broken |
| b0 | Exchange photosensitive drum |

For EMGST, a flag is set when an operator turn on an emergency stop switch on a keyboard. For WARMU, in a heater fixing type copying machine, if a flag shows that the heater has been warmed up (to a predetermined temperature), the next step is started. That is, the selection of tasks is performed. COPSP is a flag which is set when the operator turns on a copy stop switch (other than the emergency stop switch) or when a required number of copies have been made and the number of copies made reaches a preset number of copies. COPST is a flag which is set when the operator turns on a copy start key on the keyboard to make a copy. POWON is a flag which is set when an initial check of the machine after the power-on detects no abnormal condition. By this flag, a power relay is energized and an AC power unit is energized. Whenever the flag in the header is checked, the MPU selects the task execution irrespective of the order of the task schedule.

TASHD shows a status to control the task execution order. By this flag, the tasks are called by a macro instruction and the execution of the MPU is shifted to the task. The status is set, or reset in accordance with the status in the header and the execution of the tasks. The processing factor is discriminated by the number of times of execution of the shift command, and the tasks are called by the macro instruction. The execution right of the MPU is shifted to the called tasks. When the execution right of the MPU is again shifted to the monitor after the processing of the tasks, TASHD is checked to call the macro instruction to be executed next. A relation between factors and bits are shown below.

TABLE 2-3

| TASHD | |
|---|---|
| b7 | Power-on initialization |
| b6 | Initial check |
| b5 | Pre-heat-up stand-by routine |
| b4 | Copy stand-by routine |
| b3 | Copy process routine |
| b2 | Copy end routine |
| b1 | Error processing routine 2 |
| b0 | Error processing routine 1 |

According to TASHD of Table 2-3, there are at least 8 blocks in the tasks (macro) to be executed. The power-on initialization of the MSB b7 of the TASHD is processed in the monitor when the operator turns on the power and it is not necessary to detect the TASHD and call the macro. It is not necessary to check the bit. If b7 is "1", it means that the power-on initialization is being executed. It is, therefore, redundant. It is a safeguard when the program overruns by some cause (such as a noise or a bug in the program). When the program overruns, b7 is set to "1" as soon as it is detected and execution right of the MPU is returned to the initialization in the monitor to restart the program from the beginning so that the disorder of the sequence is minimized and the damage to the user is prevented. In the error processing routine 2 of b0, the cycle is stopped (as soon as the current process is completed) to suspend the next copy cycle. There is no specific macro for this process, and the copy end routine is called and the copy inhibit flag is set in the monitor. There are macros for the bits b6, b5, b4, b3 and b1 and when they are called, the corresponding processes are carried out.

Referring to Table 3, the tasks and the entry names of the macro call are explained. In the copying machine in accordance with the present invention, there are 33 tasks each of which can be accessed by calling the entry name. Individual tasks are grouped into a block which is defined as a macro so that stages of the copy process (for example, pre-copy check routine and copy process execution routine) are constructed.

TABLE 3

| Task No. | Task Function | Entry Name |
|---|---|---|
| T-1 | Clear RAM | ¥RAMCL |
| T-2 | I/O port location handler | ¥IOLOC |
| T-3 | I/O port handler | ¥IOHND |
| T-4 | Display control | ¥DISCN |
| T-5 | Key entry scan control | ¥KEYEN |
| T-6 | Positioning | ¥POSIT |
| T-7 | Paper feed check | ¥JAMPA |
| T-8 | Error mode check | ¥MALCH |
| T-9 | Error processing | ¥MALPR |
| T-10 | Motor drive control | ¥MOTDR |
| T-11 | Optical system scanner motor servo control | ¥SCANM |
| T-12 | Optical system magnification setting pulse motor control | ¥PALEN |
| T-13 | Paper feed registration control | ¥FEDRE |
| T-14 | Photosensitive drum control (charge, transfer, discharge, separation) | ¥POCON |
| T-15 | Exposure lamp control | ¥EXPCN |
| T-16 | Auto-erase control | ¥ERASE |
| T-17 | Photosensitive drum cleaning control | ¥PCCLN |
| T-18 | Paper ejection control | ¥PAPEX |
| T-19 | Heater temperature control | ¥FUSCN |
| T-20 | Toner density control | ¥TONCN |
| T-21 | Double feed sensor control | ¥DVPFE |
| T-22 | Developing bias control | ¥DEVBI |
| T-23 | Surface potential control | ¥PCVSC |
| T-24 | Original image density pattern recognition | ¥RECOR |
| T-25 | Speech response control | ¥ACOUS |
| T-26 | Speech recognition | ¥RECAC |
| T-27 | Automatic diagnosis | ¥DIAGN |
| T-28 | External check control | ¥APPLY |
| T-29 | Timing pulse count control | ¥TIMPS |
| T-30 | Zero-crossing pulse control | ¥ZEROC |
| T-31 | Interpulse timer control | ¥INTIM |
| T-32 | Auto-shut-off | ¥SHUTO |
| T-33 | Clock control | ¥CLOCK |

The functions of Table 3 are briefly explained. The function of the task No. T-1 is to initialize the data memory, that is, to clear the use areas of the memory.

T-2 relocates the I/O ports in accordance with the hardware system.

T-3 comprises ¥IOINT, ¥IOSET and ¥IOCHK and executes the I/O command, outputs the content of the data area to the designated port and inputs the content of the port to the designated memory area.

T-4 is a control program to indicate the status of the copying machine and controls the dynamic scan by using a dot matrix display panel, an LCD or a 7-segment LED depending on the specification of the machine. It also indicates the status of the machine in each of the copy stages and responds to the command from the user.

T-5 scans key switches of a control panel to check the entry by the operator. It also accepts or inhibits the input in accordance with the copy stage and mode. For example, the change of the preset number of copies during the copy run is inhibited while the inputs from the clear key and the emergency stop key are accepted.

T-6 initializes the mechanism and drives the photosensitive drum, the scanner and the cam to return them to their home positions. If a home position sensor does not detect the return to the home position within a predetermined time, an error signal is issued to visually indicate the error or audibly announce it.

T-7 checks the pass of the paper in the copying machine, the registration in the paper feeder, the separation of the paper and the ejection of the paper based on information from a photo-sensor or a mechanical switch which is a paper size sensor arranged in the paper feed path. It also checks remaining papers in the initial check prior to the copy start. In this case, the paper feed unit is driven until the paper is ejected, and if it is not ejected, an error is detected.

T-8 checks the ¥JAMPA of T-7, the break of the heater or the lamp, the failure of the temperature sensor, the open state of the door, the overheat of the motor, the failure of the timing pulse encoder and abnormal conditions of the optical system, the developing unit and the photosensitive drum, by using the sensors in the machine.

T-9 carries out the error processing such as emergency stop, cycle stop (stop after completion of the current process) and inhibit of restart depending on the degree of abnormal state including jam, improper density, break of lamp, inadvertent opening of the case, the exhaust of paper, the exhaust of toner, locking of motor, overcurrent and overload. The content of the abnormal state is visually indicated or audiably announced to the operator by the control unit. When the error has been repaired and the copy ready mode is to be started, the photo-sensitive drum is cleaned before the copy ready mode is started depending on the degree of error (for example, jam in the developing mode and the stop of the machine before completion of cleaning.

T-10 controls the stop and the start of the motor depending on the status of the machine.

T-11 is a servo control. It detects the position by reading the encoder pulse and controls the speed, forwardly and reversely drives the carriage and short-returns the carriage in response to a paper size signal.

T-12 moves a lens under the control of an open loop by the pulse motor in accordance with a magnification (enlarge or reduction) inputted from the control panel.

T-13 controls the paper feed from the upper and lower cassettes to select one of the cassettes which meets the paper size requested by the operator (Limit-less paper feed). It also controls a loop of the paper to assure correct registration.

T-14 controls the photosensitive drum, the charging, the transferring, the separation, the discharging, the corona high voltage power supply and the discharging lamp. As the number of copies increases, the toner and the paste of the paper are deposited on the tangusten wire of the high voltage charger and the toner is molten and covers the surface of the wire. As a result, uninformed corona discharge occurs. In order to prevent such deposition, a ceramic vibrating device is contacted to the tangusten wire of the corona charger to vibrate the wire during the interval between the copy sequences and the wire is cleaned after the end of the copy operation.

T-15 controls the exposure lamp. It turns on and off the exposure halogen lamp in accordance with a timing. In order to prevent the affect of the voltage fluctuation, the power supply voltage is digitally detected through an A/D converter and it is converted to an effective value so that a digital phase control is attained. In this task, the AC power supply is sampled and the phase shift is calculated.

T-16 senses the paper size by a paper feed path unit and erases the photosensitive drum in accordance with the paper size.

T-17 samples the surface potential by the surface potential sensor and controls the discharging corona, the discharging lamp and the cleaner (blade).

T-18 is a paper ejection control. It ejects the paper and arranges the copies in a stacker (tray). It also increments a copy counter by one.

T-19 controls the heater temperature in the following manner. The power is controlled such that the temperature rises rapidly after the power-on and the temperature is maintained at a predetermined temperature during the copy run but it is maintained lower than the predetermined temperature during the stand-by to save the power. (200° C. during the copy run and 150° C. during the stand-by). In order to digitally control the power, the zero-crossing point (¥ZEROC of the macro T-30) is detected by the interval timer of the MPU (¥INTIM of the macro T-31) to carry out the phase control for the intended purpose (heater temperature).

T-20 detects the toner density and maintains a constant ratio of toner and carrier for two-component developer. For one-component developer, the residual amount of toner is detected and the toner is supplemented as required. In the present embodiment, a standard pattern is placed on an original sheet mount and a reflected light therefrom is focused on the photosensitive drum and the deposited toner is detected by the optical sensor. It is A/D converted and processed by the MPU to determine the necessity of the supplement of the toner.

T-21 detects the double feed. The detection signals of the photo-sensor when the paper is present and when the paper is absent are stored in a memory, and a current supplied to a light emitting diode is controlled by the D/A converter such that a variation due to an ambient condition of the photo-sensor is cancelled, and the detection signal of the photo-sensor is compared with the reference value to detect the double feed.

T-22 controls the developing bias in accordance with the original pattern density and the ground potential detection. It controls the bias voltage in accordance with the degree of usage (fatigue) of the photo-sensitive drum.

T-23 detects the dark areas and the light areas of the photo-sensitive drum surface potential by a static electric field chopper sensor. When a residual potential is detected, the bias is controlled by a module 18 to be described later to keep the image quality at a constant level.

T-24 reads the original pattern, detects the maximum and minimum densities by the A/D converter and controls the light intensity (feed-back to a lamp regulator).

T-25 is an output control by a speech synthesizer which responds to the operator by speech.

T-26 stores a spectrum of a specified speaker to use it in substitution for the key counter. If the operator speaks "stop" in the emergency stop mode, the machine stops. This can be used as a safe operation because the machine is stopped even if the operator is not in the vicinity of the machine.

T-27 diagnoses the machine. For a minor failure, a guidance by speech is issued to request the operator to repair. The process of the machine is controlled without feeding the paper so that the machine status is kept at the best copy condition.

T-28 controls the accessories of the copying machine. It controls an auto-document feeder (ADF), a sorter, a collator, an OCR and a fee counter. The ADF, the OCR and the fee counter may be powered from the main machine, and the sorter and the collator are powered from the main machine if they are low or medium speed devices (10–40 cards per minutes), and from separate power supply if they are high speed devices.

T-29 counts the clock pulse generated by the encoder in synchronism with the rotation of the main motor. The timing pulse is usually applied to an interrupt terminal of the MPU or an event timer count terminal. The timing of the sequence is controlled in accordance with the accumulated count.

Figure 8:
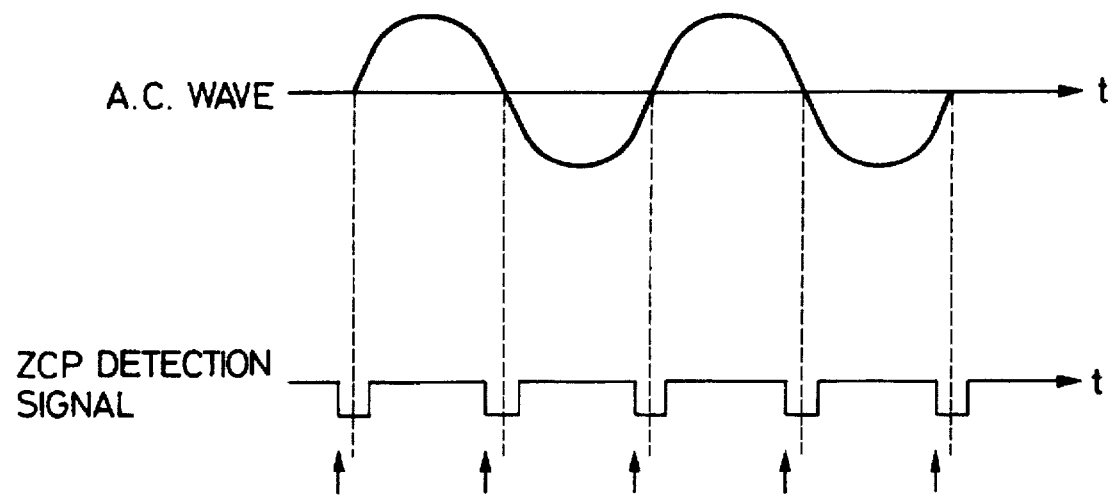
FIG. 8 illustrates the detection of a zero-crossing point.

T-30 discriminates 50 Hz and 60 Hz frequencies, phase-controls the heater and the lamp and triggers the zero-crossing. FIG. 8 illustrates the control. The zero-crossing points (ZCP) of the A.C. wave are digitally detected as shown in FIG. 8. The MPU detects the edges shown by arrows in FIG. 8 and counts finer internal pulses generated by the MPU internal program to detect the true ZCP.

T-31 controls the interval timer used in the program routine. In the present embodiment, the MPU is Intel 8051. It contains two 16-bit timer channels, which control the timer counter.

T-32 resets the preset number of copies, the magnification and the selected cassette to the standard mode and sets the heater temperature to the stand-by mode if the copy start key is not depressed within a predetermined time period (1–2 minutes).

T-33 controls the clock count IC to inform the copy job time, record the copy data (year, month, day) and time, and print the date on the copy paper. It also controls the constant time monitor when the machine is diagnosed.

As described above, there are 33 tasks which are appropriately combined into the task group in accordance with the mode of the copying machine and controlled by the monitor. The task group includes a monitor for controlling the individual tasks and monitor has several status. The tasks are grouped into blocks in accordance with the copy mode (stage), and when the MPU is switched from the monitor to the copy mode, the monitor in the block (called a sub-monitor) controls the execution. The schedule control (sub-monitor) in the task group is explained with reference to the structure of the status flag of FIG. 7. Table 4-1 shows an initial check mode status SCINT. T-3 and other numbers are the task numbers shown in Table 3. In this mode, the error is checked after the power is turned on and the key inputs are entered to check if there is any problem in connecting the power unit.

TABLE 4-1

| | SCINT | |
|---|---|---|
| b7 | I/O port handler | T-3 |
| b6 | Display control | T-4 |
| b5 | Paper feed check | T-7 |
| b4 | Error mode check | T-8 |
| b3 | Clock control | T-33 |
| b2 | — | |
| b1 | — | |
| b0 | — | |

Tables 4-2 and 4-3 show SCPOW1 and SCPOW2 which check the status of the machine when the power unit is connected to the machine to warm up the heater, control the machine to the optimum condition in preparation for the copy operation and control the operation and the display for the interaction with the operator.

TABLE 4-2

| | SCPOW 1 | |
|---|---|---|
| b7 | I/O port handler | T-3 |
| b6 | Display control | T-4 |
| b5 | Key entry scan | T-5 |
| b4 | Positioning | T-6 |
| b3 | Paper feed check | T-7 |

TABLE 4-2-continued

| | SCPOW 1 | |
|---|---|---|
| b2 | Error mode check | T-8 |
| b1 | Error processing | T-9 |
| b0 | Clean photosensitive drum | T-17 |

TABLE 4-3

| | SCPOW 2 | |
|---|---|---|
| b7 | Heater temperature control | T-19 |
| b6 | Speech response control | T-25 |
| b5 | Zero-crossing pulse control | T-30 |
| b4 | Interval timer control | T-31 |
| b3 | Automatic diagnosis | T-27 |
| b2 | Surface potential control | T-23 |
| b1 | External device control | T-28 |
| b0 | Clock control | T-33 |

The stand-by routine includes SCPOW 1 (Table 4-2), SCPOW 2 (Table 4-4) and SCSTB (Table 4-5).

TABLE 4-4

| | SCPOW 2 | |
|---|---|---|
| b7 | Heater temperature control | T-19 |
| b6 | Speech response control | T-25 |
| b5 | Zero-crossing pulse control | T-30 |
| b4 | Interval timer control | T-31 |
| b3 | Automatic diagnosis | T-27 |
| b2 | Surface potential control | T-23 |
| b1 | External device control | T-28 |
| b0 | — | |

TABLE 4-5

| | SCSTB | |
|---|---|---|
| b7 | Main motor control | T-10 |
| b6 | Magnification setting pulse motor control | T-12 |
| b5 | Speech recognition | T-26 |
| b4 | External device control | T-28 |
| b3 | Auto-shut-off | T-32 |
| b2 | — | |
| b1 | — | |
| b0 | — | |

In the stand-by routine, the heater is warmed up, the machine is ready to make copies and the setting of the number of copies is permitted. If the copy start key is not depressed within a predetermined time from the setting of the number of copies, the magnification and the cassette, the machine is reset to the standard mode by the auto-shut-off (macro ¥SHUTO). The standard mode sets the number of copies to 1, the cassette to the upper one (or lower one if the upper one is empty), the magnification to the unity, the external device (auto-feeder, sorter and collator) to none and the copy density to middle level. In this mode, the submonitor is controlled by the three status SCPOW1, SCPOW2 and SCSTB.

Tables 4-6, 4-7, 4-8 and 4-9 show SCCOP1, SCCOP2, SCCOP3 and SCCOP4 which control the execution routine of the copy process after the copy start key has been depressed in the copy process mode.

TABLE 4-6

| | SCCOP 1 | |
|---|---|---|
| b7 | I/O port handler | T-3 |
| b6 | Display control | T-4 |
| b5 | Key entry scan control | T-5 |
| b4 | Paper feed check | T-7 |
| b3 | Error mode check | T-8 |
| b2 | Speech response control | T-25 |
| b1 | Speech recognition | T-26 |
| b0 | — | |

TABLE 4-7

| | SCCOP 2 | |
|---|---|---|
| b7 | Heater temperature control | T-19 |
| b6 | Toner density control | T-20 |
| b5 | Double feed sensor control | T-21 |
| b4 | Developing bias control | T-22 |
| b3 | Surface potential control | T-23 |
| b2 | Original density pattern recognition | T-24 |
| b1 | Automatic diagnosis | T-27 |
| b0 | External device control | T-28 |

TABLE 4-8

| | SCCOP 3 | |
|---|---|---|
| b7 | Main motor control | T-10 |
| b6 | Optical system scan servo control | T-11 |
| b5 | Paper registration control | T-13 |
| b4 | Photosensitive drum control | T-14 |
| b3 | Exposure lamp control | T-15 |
| b2 | Auto-erase control | T-16 |
| b1 | Photosensitive drum cleaning control | T-17 |
| b0 | Paper ejection control | T-18 |

TABLE1 4-9

| | SCCOP 4 | |
|---|---|---|
| b7 | Timing pulse count | T-29 |
| b6 | Zero-crossing pulse control | T-30 |
| b5 | Interval timer control | T-31 |
| b4 | Clock control | T-33 |
| b3 | — | |
| b2 | — | |
| b1 | — | |
| b0 | — | |

The SCCOP1, SCCOP2, SCCOP3 and SCCOP4 control the execution routine of the copy process after the copy start key has been depressed.

Tables 4-10, 4-11 and 4-12 show SCEND1, SCEND2 and SCCOP4 which are sub-monitors to control the post-process after the copy operation in the copy end routine.

TABLE 4-10

| | SCEND 1 | |
|---|---|---|
| b7 | I/O port handler | T-3 |
| b6 | Display control | T-4 |
| b5 | Key entry scan control | T-5 |
| b4 | Paper feed check | T-7 |
| b3 | Error mode check | T-8 |
| b2 | Speech response control | T-25 |

TABLE 4-10-continued

| | SCEND 1 | |
|---|---|---|
| b1 | Speech recognition | T-26 |
| b0 | External device control | T-28 |

TABLE 4-11

| | SCEND 2 | |
|---|---|---|
| b7 | Heater temperature control | T-19 |
| b6 | Surface potential control | T-23 |
| b5 | Automatic diagnosis | T-27 |
| b4 | Main motor control | T-10 |
| b3 | Photosensitive drum cleaning control | T-17 |
| b2 | Paper ejection control | T-18 |
| b1 | — | |
| b0 | — | |

TABLE 4-12

| | SCOOP 4 | |
|---|---|---|
| b7 | Timing pulse count control | T-29 |
| b6 | Zero-crossing pulse control | T-30 |
| b5 | Interval control | T-31 |
| b4 | — | |
| b3 | — | |
| b2 | — | |
| b1 | — | |
| b0 | — | |

Their main tasks are the cleaning of the photosensitive drum and the ejection of the paper. If the restart of the copy operation is ready (the mechanism has been initialized and the next copy start is permitted), a reload signal may be issued from the task display control even during the post-processing, and if the copy start key is detected by the monitor, the copy process mode is immediately started.

The error processing sub-monitor ABNML (Table 4-13) in the error processing routine is explained.

TABLE 4-13

| | ABNML | |
|---|---|---|
| b7 | I/O port handler | T-3 |
| b6 | Display control | T-4 |
| b5 | Key entry scan stroke | T-5 |
| b4 | Paper feed check | T-7 |
| b3 | Error mode check | T-8 |
| b2 | Error processing | T-9 |
| b1 | Speech response control | T-25 |
| b0 | Speech recognition | T-28 |

When the monitor detects the error, the error processing is carried out in accordance with the error. When the abnormal condition may cause a fire or affect people's lives, such as the abnormal condition in the heater or the lamp. The power is immediately cut off. This mode is stored in a non-volatile memory. If the power is turned on while the failure is not repaired, the status stored in the non-volatile memory is checked so that this mode is immediately started. In this mode, the interaction with the operator is permitted, and if the status (copy inhibited, abnormal condition) is displayed or speech response key is depressed, the status of the machine is informed by the speech. When the maintenance command key is depressed, a user is permitted to maintain the machine. If there is a failure (removal of jammed paper or cleaning of the charged corona), the maintenace process is informed. If the user cannot maintain the machine, a service man call lamp is lit and the content thereof is informed.

Figure 9:
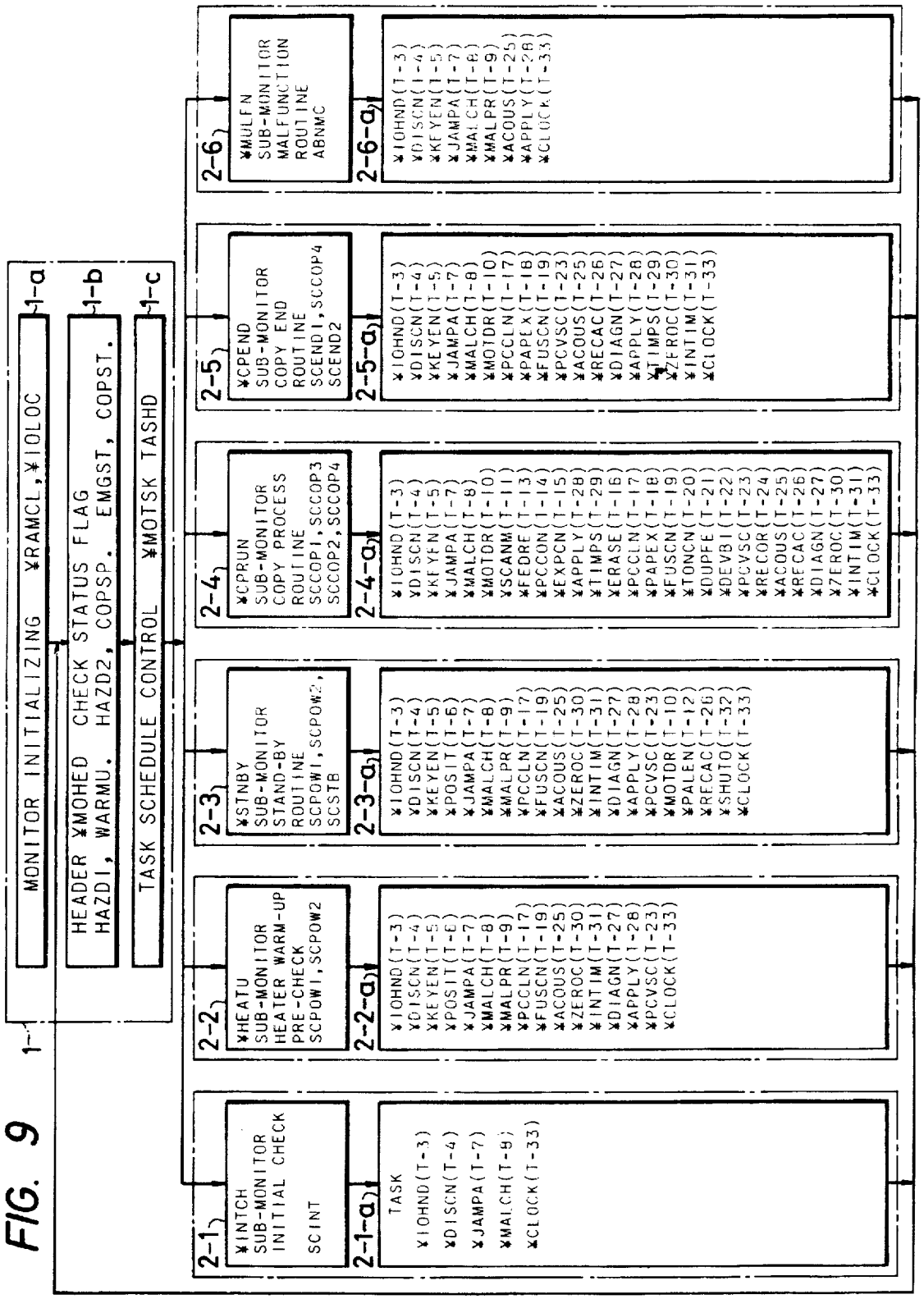
FIG. 9 shows a configuration of an overall program for a copying machine.

FIG. 9 shows an overall program for the monitor, the sub-monitors, the copy mode and the macro call names of the tasks. (¥———) indicates the macro call name and (T———) indicates the task number shown in Table 3. The tasks are grouped into blocks in accordance with the copy mode (stage). When the copy mode is started by the MPU or the monitor, it is executed by the monitor (sub-monitor) in the block. The copy mode is controlled by the sub-monitor and a macro instruction to call the sub-monitor is provided. The tasks in the mode are switched by calling the status ¥MOTSK of the task schedule control 1-c in the monitor.

In the power-on condition, the monitor is initialized (¥RAMCL, ¥IOLOC) 1-a in the host monitor 1, and the status flag is checked in the header 1-b. The sub-monitors 2-1~2-6 are controlled by the task schedule control. The task groups 2-1-a~2-6-a controlled by the respective sub-monitors are executed and after the execution, the header 1-6 executes the tasks.

The macro instruction which calls the sub-monitor is explained. ¥INTCH of 2-1 of FIG. 9 is the macro for calling the initial check mode, ¥HEATU of 2-2 is the macro for calling a check routine before heater warm-up, ¥STNBY of 2-3 is the macro for calling the copy stand-by routine, ¥CPRUN of 2-4 is the macro for calling the copy process routine, ¥CPEND of 2-5 is the macro for calling the copy end routine and ¥MULFN of 2-6 is the macro for calling the error processing mode.

The execution in FIG. 9 is briefly explained. In the power-on condition,

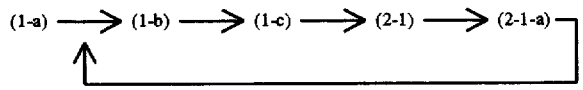

is executed, and if no status bit is set in the HAZD1 of the header 1-b, that is, if there is no trouble in the machine, the task schedule control 1-c calls ¥HEATU of 2-2 so that the task is changed to

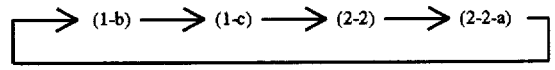

When the heater is warmed up to the predetermined temperature, a flag is set at b7 of WARMU of the header 1-b, and when it is detected, the execution of the task is switched and the macro ¥STNBY of 2-3 is called and the stand-by mode is started.

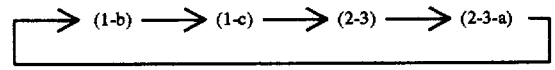

If the copy start key is depressed, a flag is set at b7 of COPSP of the header 1-b of the monitor 1, and the task schedule control 1-c calls ¥CPRUN 2-4 to enter into the copy routine.

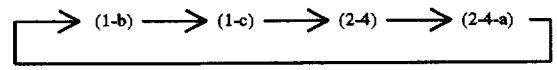

It continues until the number of copies preset by the operator are completed. The status of the header 1-b of the monitor 1 is checked and if the flag is set in HAZD1 or EMGST, the machine is emergency-stopped. If the flag is set in HAZD2 or COPSP, the machine is cycle-stopped. The former calls the macro ¥MULFN of 2-6 and the latter calls ¥CPEND of 2-5. When the number of copies made reaches the preset number of copies, a flag is set in COPSP of the monitor header 1-b. When the flag is set in COPSP, the check routine of the MPU is switched to execute

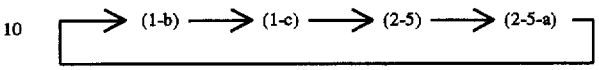

If the flag is set in HAZD1 or EMGST (when the operator depresses the emergency stop key on the keyboard), the monitor calls the sub monitor ¥MULFN of 2-6 to start the error processing routine.

According to the program construction of the present invention, the macro execution order of the sub-monitors is controlled by the task schedule of the monitor, and the execution of the copy mode is controlled and the flag in the header is checked to switch the task schedule by the external factor. The flag in the header calls ¥MOTSK in the monitor to forcibly change the task execution order. The copy program is divided into the monitor and the sub-monitor, and the overall and the individual copy modes (stages) are separetely controlled to improve the efficiency in designing the program. A fixed program (which does not change as the type of the copying machine changes) may be constructed in a firmware and stored in a solid-state mask ROM together with the monitor. The tasks which are possibly changed may use EPROM so that it is updated as required. The on-chip memory of the MPU may be masked and the fixed portions of the monitor and the program may be stored in the masked area, or the external memory may be masked and the MPU on-chip memory may use the EPROM to store the variable program. In certain machine types, when the unnecessary program is called in the sub-monitor, NOP (no operation) command is issued and the task is returned to the monitor without being executed.

Figure 10:
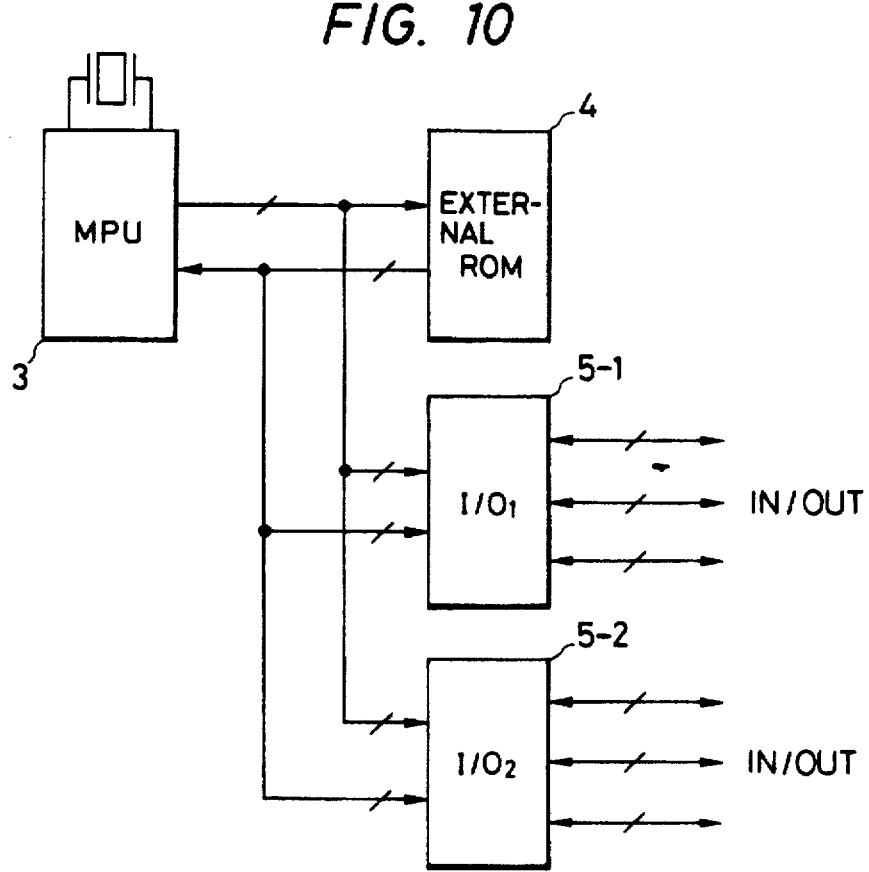
FIG. 10 shows a block diagram of a one-chip MPU, an external ROM and an expansion I/O device.

FIG. 10 shows a block diagram of an on-chip MPU (in which CPU, ROM, RAM, I/O and counter are integrated), an external ROM and expansion I/O devices. Numeral 3 denotes the MPU, numeral 4 denotes the external ROM and numerals 5-1 and 5-2 denotes the expansion I/O devices.

Figure 11A:
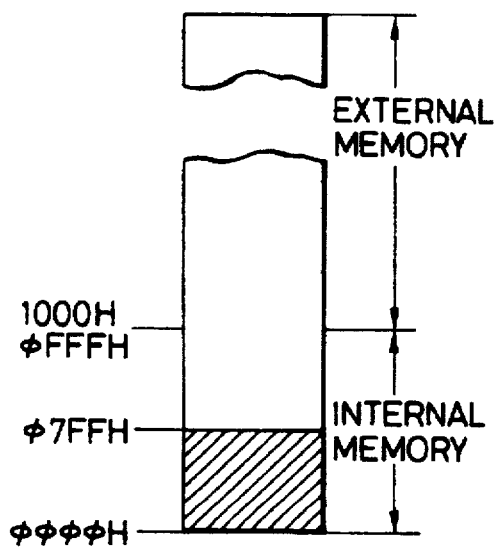
FIG. 11 shows a memory map.
Figure 11B:
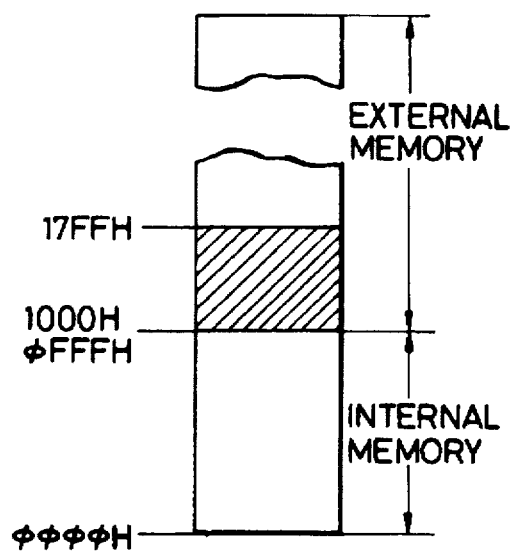

FIG. 11 shows a memory map, in which FIG. 11a shows the memory map when the monitor is stored in the memory of the MPU, and FIG. 11b shows the memory map when the monitor is stored in the external memory. The monitor is stored in the hatched area. The internal memory is of 4K-byte size (0000H-0FFFH) and the monitor area is of 2K-byte size (0000H-07FFH). In FIG. 11b, the monitor is stored in the 2K bytes (1000H-17FFH) of the external memory.

Figure 12:
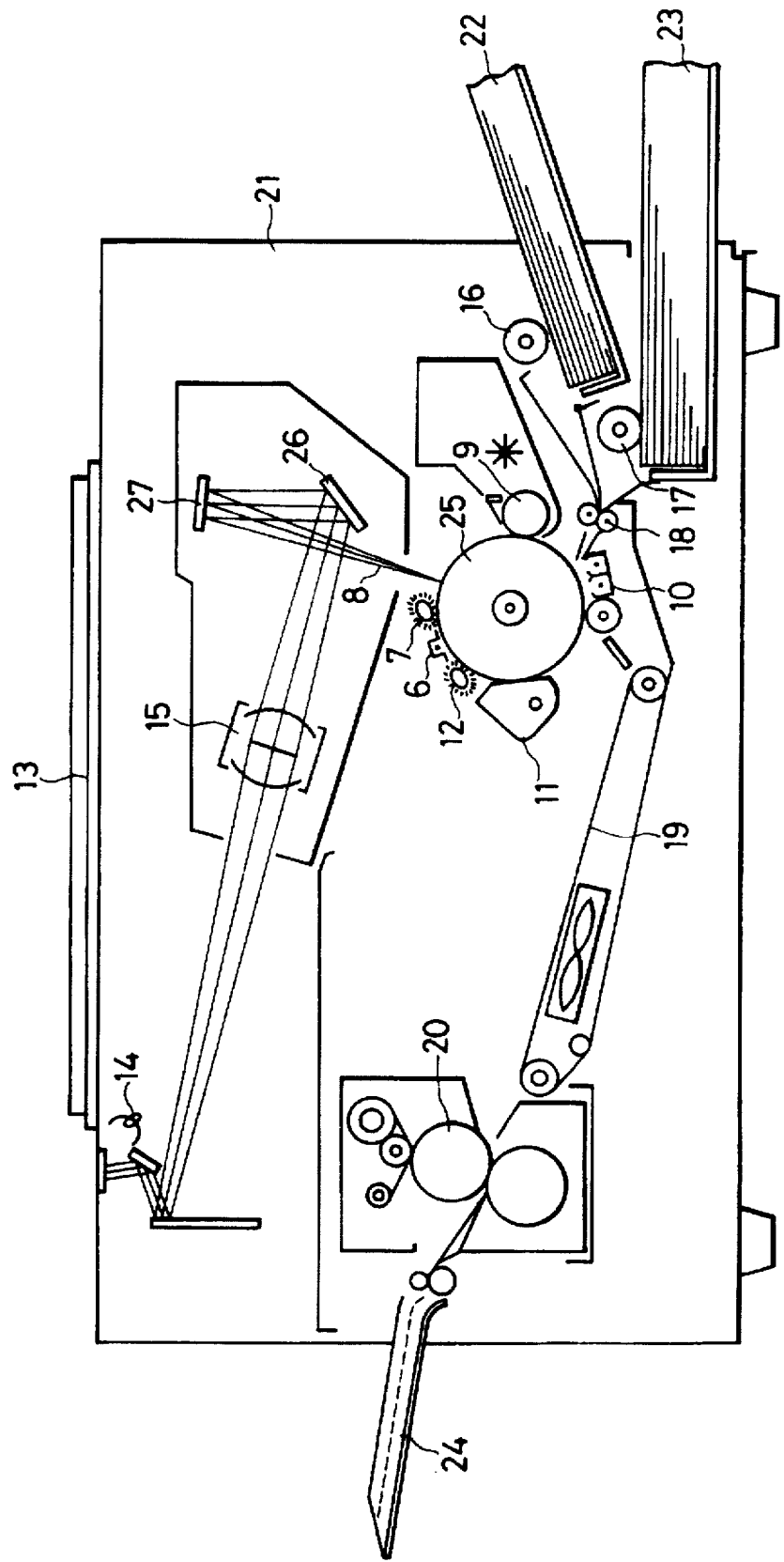
FIG. 12 shows an outline of the copying machine.

The copying machine to which the present invention is applied is briefly explained with reference to FIG. 12.

Two-stage paper feed cassettes 22 and 23 are arranged on one side of a main frame 21 of the copying machine, and a paper ejection tray 24 is arranged on the other side. Arranged around a photosensitive drum 25 are a corona charger 6, an erase lamp 7, an optical system 8, a developing roller 9, a transfer/separation charger 10, a cleaner 11 and a pre-fatigue lamp 12. A contact glass 13 is arranged on the top of the main frame 21, and an original sheet mounted on the contact glass 13 is illuminated by an exposure lamp 14 and the light therefrom is directed to the optical system 8 by a lens system 15. Papers in the paper feed cassettes 22 and 23 are fed to a registration roller 18 by paper feed rollers 16 and 17. The paper having the toner image on the photosensitive drum 25 transferred thereon by the transfer/separation charger 10 is fed to a fixing roller 20 by a separation belt 19 and finally accommodated in a paper ejection tray 24. The detail of the process will be described later.

FIG. 13-1 shows a hardware configuration. The MPU 3 is Intel 8051 and two external ROMs are used. The ROM1 32 is of 2732 (4K bytes) capacity and the ROM2 33 is of 2764 capacity. A 2K-byte C-MOS RAM 34 is also provided as a diagnostic non-volatile memory and an OS monitoring data segment. When all of those are packaged, the code memory (ROM) is of 16K-byte size and the RAM is of (2K+128)-byte size.

The MPU3 has an internal 4K-byte ROM and an internal 128-byte RAM which can be used by a user. The OS program is stored in the internal 4K-byte ROM and the control program is stored in the external ROM1 32 and ROM2 33.

The I/O device is Intel 8255 PPI (programmable peripheral interface). The PPI has three 8-bit ports and the I/O port can be set by the mode designation. Two 8-bit A/D converters 36 are of 4-channel serial compare type and used for the acquisition of the analog data. They can be accessed by the PPI3 35 port by port.

A speech synthesizer is also accessed by the port of the PPI3 35. The 30-second announcement is attained by one internal speech ROM and the 100-second announcement is attained when one speech ROM is added.

A clock IC is also accessed port by port. From the port of the PPI3 35, a command is issued to count the date and the time (hour, minute, second) and record the data and the time on the copy, or count the run time and the idle time of the machine and set the process conditions (initialization of the photosensitive drum, the cleaning time, the corona potential and the bias potential).

Of the 8 bits of the input port of the PPI3 35, seven bits are wired ORed (37) and applied to an external interrupt port $\overline{INT1}$ of the MPU 3. This input port is detected upon interruption and the line on which the signal is present can be determined by polling. Thus, the priority order can be assigned by bit shift and the signal can be weighted. A priority order setting circuit is shown in FIGS. 13-2 and 13-3. The signal applied to the port PA is sequentially shifted toward the LSB, that is, to the right as shown in FIG. 13-3 and a carry is checked. Accordingly, the b0 has the highest priority. Thus, by assigning the signals to b0–b7 depending on the importance, the signals can be weighted.

Further, data communication with an external unit is attained by utilizing a serial I/O UART of the MPU 3.

If the system is not sufficient with the devices shown in FIG. 13-1, the bus line of the MPU 3 is externally extended by a bus transceiver for expansion. A chip selection signal for the external device can also be expanded.

Two 8-bit D/A converters 39 are provided. The analog data is converted by the A/D converter, digitally processed by the MPU 3, and the analog signal is fed back. It is used for the detection of the double paper feed, the analog control of LED, the analog signal source of the bias and the high voltage and the rotation control signal of the servo motor.

The MPU 3 is one-chip MPU 8051 (in which CPU, ROM, RAM, I/O and counter are integrated) and a zero-crossing pulse (ZCP) derived from a commercial power supply is applied to an interrupt line INT0. The count of the ZCP is used as the count of the timing pulse (100 milliseconds for 50 Hz and 8.3 milliseconds for 60 Hz) or as a start point when the AC power control is D/A converted by a program.

Counter inputs T0 and T1 count the external pulses on a hardware irrespective of the execution of the program. Accordingly, execution efficiency of the program is improved. The interrupt INT 1 is used to detect the input port of the line to which the line connected to the PPI 335 is applied.

A system reset 42 applies a predetermined delay pulse to a reset terminal of the MPU 3 to initialize the system immediately after the power-on.

Figures 1, 14:
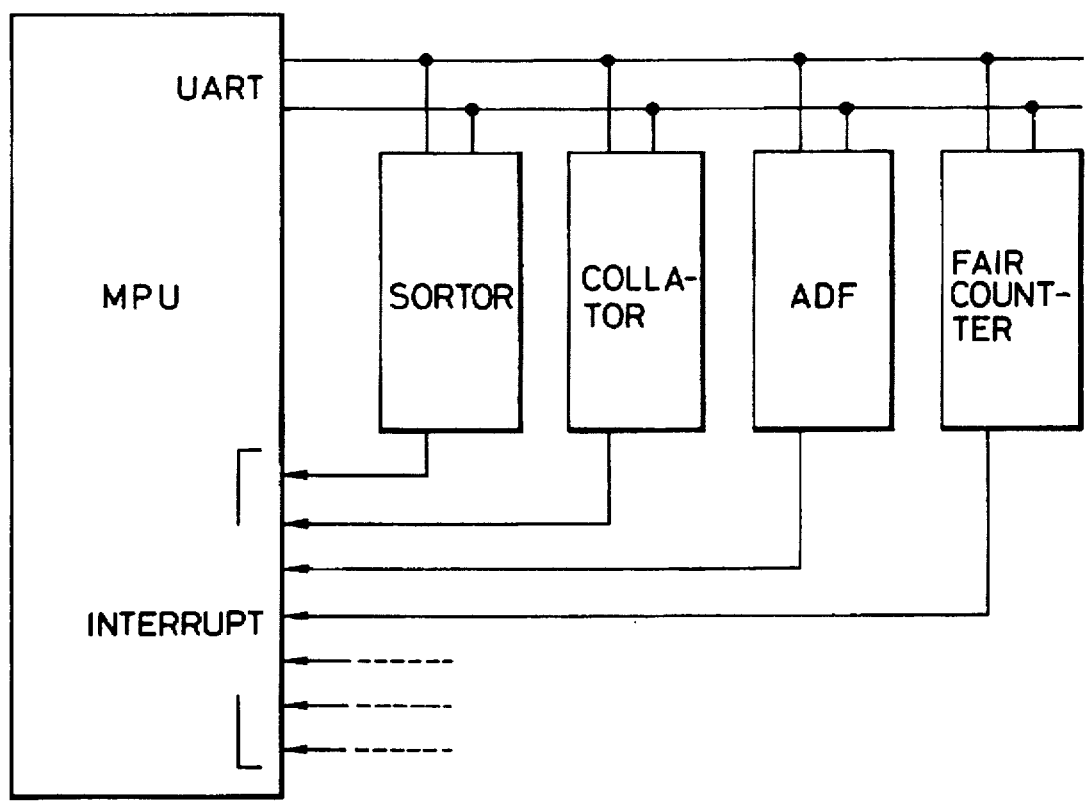
Figures 2, 14:
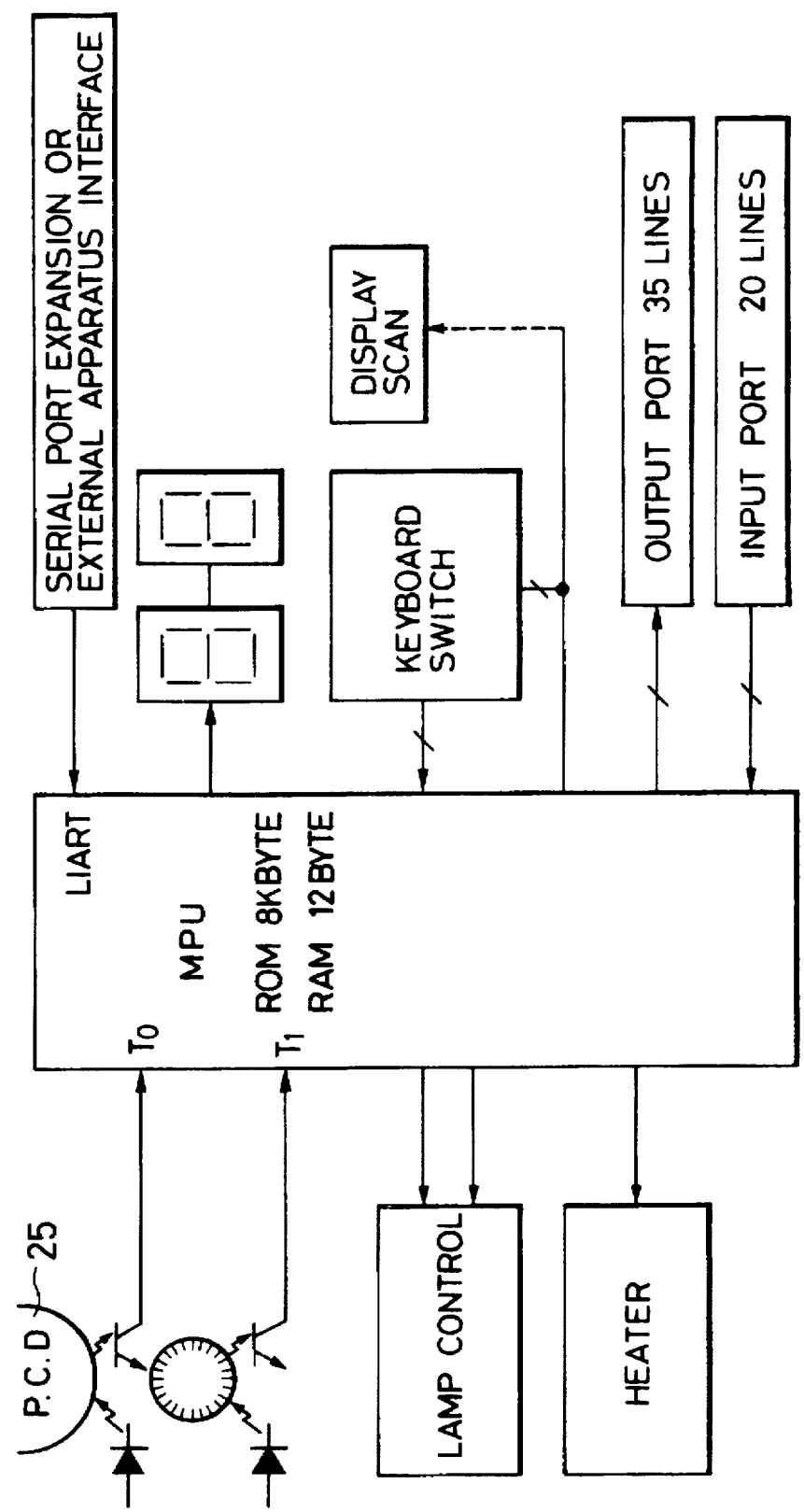

FIG. 14 is a block diagram showing interconnection of peripheral devices such as sorter, collator, ADF and fee counter.

A standard controller is provided for each of a small scale system (FIG. 14-2), a medium scale system and a large scale system and necessary units are selectively used so that the productivity of the software is improved and the cost is reduced. Since the frame of the software has been constructed by the monitor, only the application program necessary to the machine need be loaded.

In the system shown in FIG. 14-2, a signal is picked up from one point on the photosensitive drum 25 to provide a start pulse. The start pulse is used to prevent an image from being formed on a seam position or take-up position when a seamed photo-sensitive drum or a drum having an OPC belt which is automatically taken up after a predetermined number of copies have been made is used. The start pulse is not necessary for a seamless photosensitive drum (because the image may be formed at any position because the drum is seamless). When a servo motor is used to scan the optical system, an exact time required for one revolution of the drum is measured and fluctuation in the rotating speed is corrected by the rotation control of the servo motor to correct the fluctuation of rotation due to the fluctuation of the power supply so that a proper image is formed. The MPU 3 is connected to a lamp control, a heater control, a display, a display scan, an interface, a keyboard and an I/O port.

Figure 15:
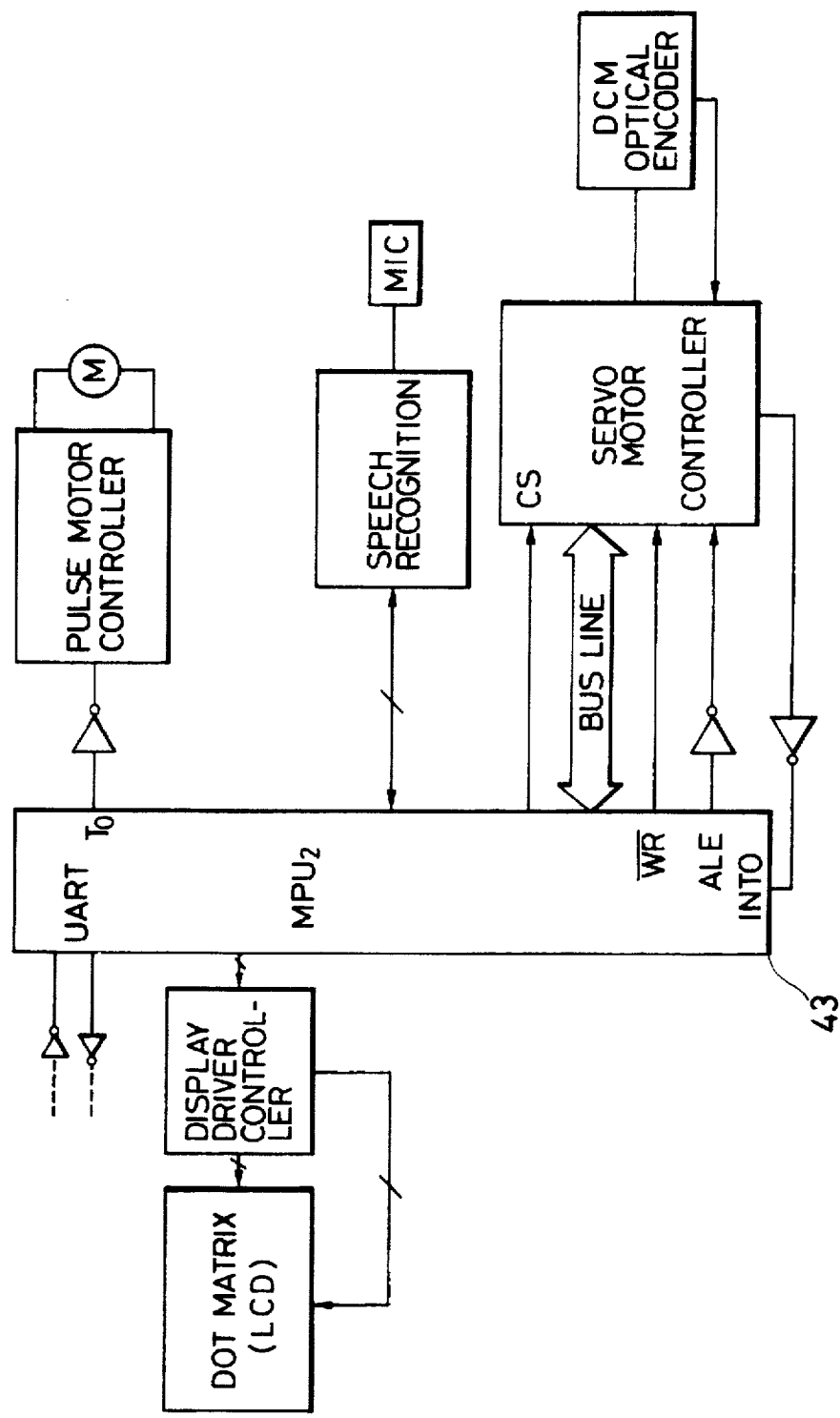
FIG. 15 shows the hardware configuration of FIG. 13-1 to which an $MPU_2$ is connected.

FIG. 15 shows a pulse motor controller which is connected to an MPU2 43 by the hardware shown in FIG. 13-1 and UART of the MPU3 to control the servo motor of the optical system and set the magnification of the lens, and the MPU2 43 which controls the key entry. The MPU2 43 has a speech recognition unit with option which may be substituted for the key counter by a specified speaker. A voice spectrum of the specified speaker is stored in a memory, and an input speech is spectrum-analyzed and compared with the spectrum stored in the memory, and if they match, the entry of the copy command is permitted. For non-limited persons, the entry of special speeches (for example, stop, copy stop, power-off, dangerous) may be permitted for emergent cases. The speech recognition may be NEC three chips MC-4760 (analog I/F processor), MPD-7716 (speech recognition processor) and MPD-7762 (controller). As will be explained later, a microphone 118 for audio input is located at the control panel. While not shown, a human body sensor may be arranged in the copying machine so that the speech man-machine interface (speech recognition and response) is activated only when a human body is detected.

Figure 16:
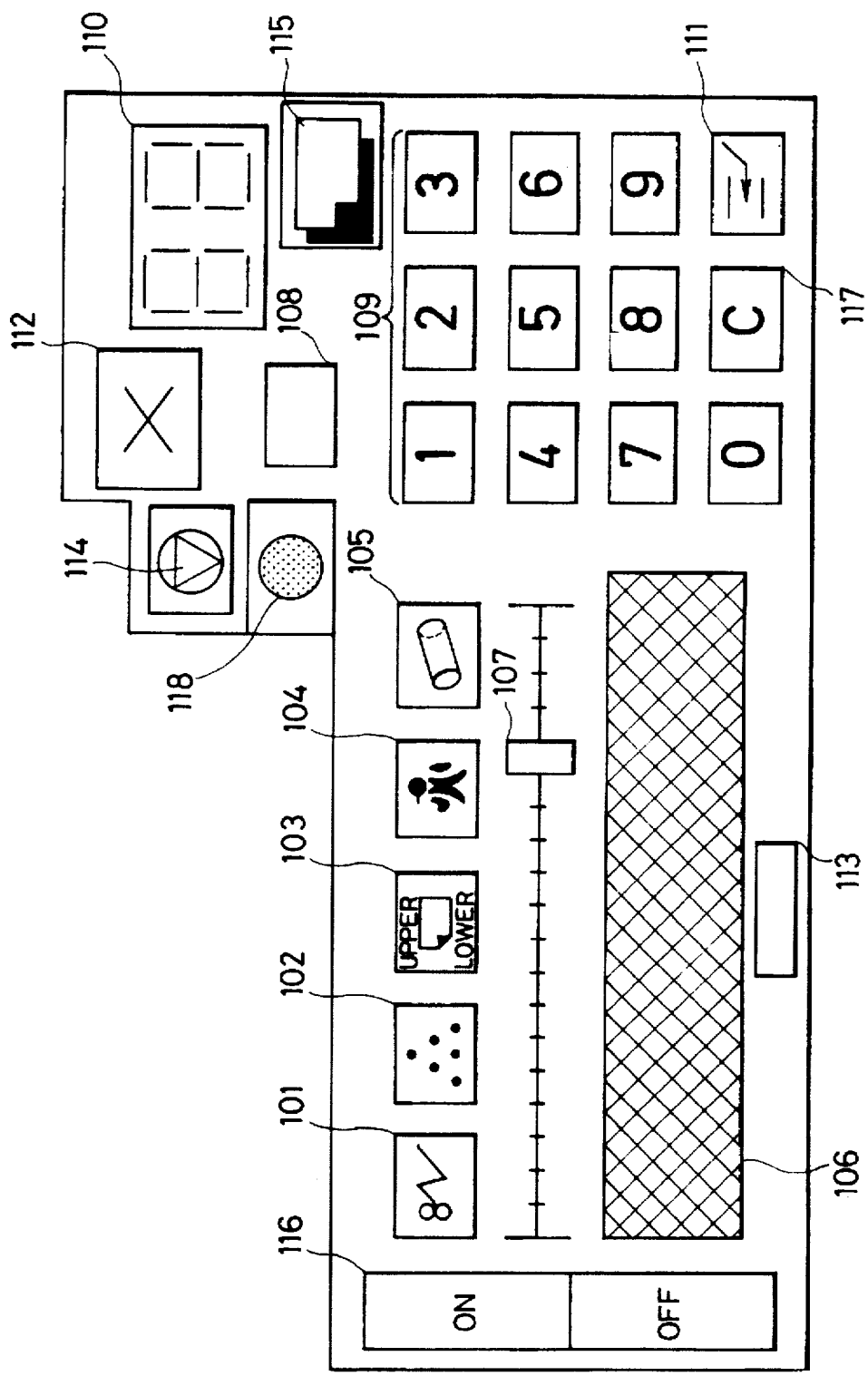
FIG. 16 shows a display control panel of the copying machine.

FIG. 16 shows the display/control panel of the copying machine. Numeral 101 denotes a jam lamp, numeral 102 denotes a toner exhaust lamp, numeral 103 denotes a cassette paper exhaust lamp, numeral 104 denotes a service man call lamp, numeral 105 denotes a cartridge exchange lamp, numeral 106 denotes a speaker of the speech synthesizer, numeral 107 denotes an image density selection key, numeral 108 denotes a magnification mode selection key/indicator, numeral 109 denotes a ten-key, numeral 110 denotes a copy count indicator, numeral 111 denotes an interrupt copy mode selection key/indicator, numeral 112 denotes a copy OK/unaccepted indicator, numeral 113 denotes an audio guide key, numeral 114 denotes a copy stop key, numeral 115 denotes a copy start key, numeral 116 denotes a power switch, numeral 117 denotes a cancel key and numeral 118 denotes a speech recognition microphone which is option.

When a copy of certain decument is urgently needed during continuous copy mode of other document, the interrupt key 111 is depressed and the data for the current copy (for example, the preset number of copies, the number of copies mode, the magnification and the image density) is temporarily stored in the memory. Then, the interrupting copy is made, and after the copy operation, the data is automatically read out and the interrupted copy cycle is restarted. The display 110 may be a segmented LED which displays the copy count such as the number of copies made. The display 110 has two digits and can display 0–99 so that the copies are endlessly made. The copy cycle can be continued until the copy stop key 114 is depressed or the papers are exhausted. In a low speed machine, an upper limit of the copy count may be set to 20 and a higher count may be displayed by a 7-segment LED to allow multi-copy operation. The upper limit may be 10, 20, 30 or 50 depending on the specification of the machine. Although two digits are used, it is not necessary to allow the input count up to 99 and it should be determined taking the operability into consideration. Recently, the performance of the copying machine is improving and the number of copies per minute was improved from past 15–20 to 30–40 or even 135. Thus, a number of copies can be made in a short time. The papers of the same size may be loaded in the upper and lower cassettes, 250 sheets for each cassette or 500 sheets in total. Thus, when the papers in the upper cassette have been exhausted, the papers are automatically fed from the lower cassette so that 500 sheets of copies can be made in a short time. In the endless copy mode, the total number of copies is audibly informed if the audio guide key is depressed. It is also possible to inform the copy job time before or after the copy operation. (For example "It will take three minutes" or "It took three minutes"). When the audio guide key 113 is depressed, the status of the copying machine is audibly informed. For example, if it is depressed during the copy operation, "the preset number of copies is o o , the number of copies made is o o , the remainders are o o . It takes o o more seconds" is announced, and if the key 113 is depressed when the error is indicated, "Paper jam in the paper feed unit" or "Paper jam in the paper ejection unit" is announced. If the supply is short, "No paper in the upper cassette" or "Toner is short. Supplement it." or "Exchange the cartridge" is announced. In the copying machine having a sensor for the remaining papers, a comparison is made with the preset number of copies and "Remaining papers are short. Only o o sheets of copies can be made." is announced.

When the error is indicated, for example, when the paper jams in the transfer unit "Open the front door", "Take out the transfer charger", "Remove the jammed paper", "The paper was removed. Close the front cover and restart the machine" are announced. If the user cannot maintain the machine, the service man call lamp 104 is lit and the phone number of the service station is announced.

The image density selection key 107 is used to set the light intensity of the exposure lamp. As the key is shifted toward the light end, the lighter image is formed, and as the key is shifted to the dark end, the darker image is formed. In this manner, the density can be manually controlled. The speech input microphone 118 for speech recognition may be optionally provided on the control panel.

As described above, in accordance with the present invention, the tasks for the copy job are divided into modules, the monitor for controlling the modules is provided, certain copy processes are grouped into blocks for each mode, the monitors (sub-monitors) for controlling the blocks are provided, and the execution right of the MPU is received or granted by the schedule control by the host monitor and the sub-monitors to control the execution of the block in each mode. The host monitor comprises the header for controlling the I/O relocation and detecting the occurrence of the abnormal state and the change of the task schedule, and the schedule controller. The MPU interruption is used to detect the abnormal condition (heater overheat, lamp kept lit, door open, etc.) and count the zero-crossing pulse and the timing pulse.

The construction of the monitor of the present invention is now explained with reference to FIGS. 17-1 to 17-9 which show the construction and the function of the host monitor. (The functions of the tasks are shown in Table 3.) First, referring to FIG. 17-1a;

In a step 1, the monitor is initialized. This step is started upon the power-on. Once the monitor is initialized, it is not initialized in the second and subsequent runs.

In a step 2, it is checked if the initialization is over, and if yes, the program jumps to a step 6.

In a step 3, monitor initialization process is started. The bit b7 of the task scheduler TASHD is set to "1". That is, a flag for the execution of the task initial check process stage is set.

In a step 4, the RAM clear macro ¥RAMCL is called.

In a step 5, the I/O is relocated in accordance with the system hardware. The macro ¥IOLOC is called. This completes the initialization of the monitor.

In a step 6, the monitor header is checked. The flag for switching the task is set or reset. The macro ¥MOHED is called.

In a step 7, the schedule of the process task is checked. In the present invention, the process stages are divided into several blocks which are handled as one task group, and the sub-monitors for controlling the tasks in the task group are provided. Accordingly, the task group which is the aggregation of the tasks is handled as a large macro.

In steps 8 and 9, the task scheduler TASHD b0 is checked. The TASHD is set or reset in the header ¥MOHED. The abnormal condition is checked in accordance with a priority order. The flag is checked to detect a heavy abnormal condition. In the present invention, the same macro ¥MULFN is called both for the heavy abnormal condition and for the light abnormal condition. The processing is carried out depending on the degree of the abnormal condition.

In steps 10 and 11, the light abnormal condition is checked. If the flag is set, the macro ¥MULFN is called.

In steps 12, 13 and 14, the task scheduler TASHD (b7) is checked. If it is set, the macro ¥INTCH is called. The same macro as that in steps 15 and 16 is called. The power unit is turned on and the abnormal condition is checked.

In steps 15 and 16, if the condition is met, the initial check process task macro ¥INTCH is called.

In steps 17 and 18, if the condition is met, the macro ¥HEATU is called. It is a process stage to warm up the heater to the predetermined temperature.

In steps 19 and 20, the heater has been warmed up to the predetermined temperature and the copy operation is ready. The macro ¥STNBY is called to stand by the depression of the copy start button.

In steps 21 and 22, the copy start button is depressed and the copy process is executed. The macro ¥CPRUN is called.

In steps 23 and 24, the copy process is terminated and the post-process is started. The macro ¥CPEND is called.

In a step 25, the diagnose task ¥DIAGN is called. If the execution flag of any task is not set, there is an abnormal condition. The program might have overrun by the noise. In this case, the dignosis (task of which is not explained here) is executed and the monitor is reinitialized depending on the type of the abnormal condition. The error processing stage macro ¥MULFN is called depending on the degree of the abnormal condition.

The contents of the macros called in the monitor are now explained. For the ¥RAMCL (RAM clear, see FIG. 17-3b);

In a step 51, the start address of the data memory is loaded to the register.

In a step 52, the end address of the data memory is loaded to the register.

In a step 53, the designated address of the memory is cleaned.

In a step 54, the memory address is incremented by one.

In steps 55 and 56, it is checked if the memory clear has reached the end address, and if not, the program jumps to the step 53 where the data memory is cleared.

The macro ¥IOLOC (I/O location) (see FIG. 17-3c) relocates the I/O in accordance with the system hardware configuration.

In a step 61, the absolute address for locating the I/O to the stock pointer is set in the stock. Depending on the type of MPU, the data stocked in the stock can be directly accessed. Accordingly, the table in the program or the I/O information stored as the data is accessed independently of the position on the memory. (The absolute address is designated on the stock.)

In a step 62, the mode of the I/O device (the data set in the control register of the device to designate the input port and the output port) is set on the table.

In a step 63, the I/O location is designated by the absolute address designated in the step 61. Whenever the data is on the memory, the distance (offset) from the program counter is indicated when the instruction is executed. Usually, the stock is used as described in the step 61. The content of the stock pointer is decremented by a number corresponding to the length of the required storage area to prepare an area for the temporary variable.

In a step 64, the I/O data is sent to the I/O device and the I/O device is initialized.

The ¥MDHED (header test, see FIG. 17-3d) sets the task scheduling. The flags in the respective status are checked to switch the tasks.

In steps 71, 72 and 73, the error flag (heavy error) is checked.

In a step 74, if the error flag is detected, the TASHD b0 is set to "1".

In steps 75, 76 and 77, the error flag (light error) is checked.

In a step 78, the TASHD b1 is set to "1".

In steps 79, 80 and 81, the ON state of the emergency stop switch is checked.

In a step 82, if the ON state of the emergency stop switch is detected, the same process task as that of the heavy error is executed. The TASHD b0 is set to "1".

In steps 83, 84 and 85, the heater temperature is checked to see if it rised to the predetermined temperature.

In step 86, the heater has been warmed to the predetermined temperature and the copy process is ready. The TASHD b4 is set to "1".

In step 87, the heater has not been warmed up and the copy process is not permitted. The TASHD b5 is set to "1".

In steps 88, 89 and 90, the depression of the copy stop button is checked.

In step 91, the depression of the copy stop button is detected, and even if the preset number of copies have not yet been made, the copy process is ended and the post-process is executed. Unlike the emergency stop, the process is stopped after the normal post-process. The number of the uncopied remains in the counter. (If the copy start switch is not depressed within the predetermined time, the auto-sheet-off is operated and the counter is reset.) The TASHD b2 is set to "1".

In steps 92, 93 and 94, the depression of the copy start button is tested.

In a step 95, the task is switched from the stand-by mode to the copy process mode. The TASHD b3 is set to "1".

In steps 96, 97 and 98, the initial check is carried out and the ON state of the power unit is checked.

In a step 99, the ON state of the power unit is detected and the energization is permitted. The TASHD b6 is set to "1".

The host monitor switches the task in accordance with the event occurred and calls the task corresponding to the event. The process tasks are grouped into the task group of one mode. The task group and the process tasks are also called by the macro. The task group has the sub-monitors for controlling the process tasks, and when the sub-monitor is macro-called by the host monitor and the execution right is transferred, it is controlled by the sub-monitor.

The sub-monitors in the respective modes are now explained. The mode ¥INTCH (initial check stage, see FIG. 17-5c) is called when the power switch is turned on and the host monitor is initialized. The machine is checked (the remaining papers, faults, etc.) and it is checked if there is a problem in energizing the power unit. If there is no problem, the flag is set to execute the next mode.

In a step 101, the initial check mode status SCINT is checked and the execution task is macro-called. The task schedule flag of SCINT is set or reset in accordance with the result of the execution of the task. Certain tasks need not be repeatedly executed once they are executed. For example, the macro ¥CLOCK in a step 105 need not be called when the clock need not be displayed on the control panel (when the user does not command) or when the machine is not periodically monitored (when the photosensitive drum surface is not periodically measured). However, the display control, the key entry scan, the paper feed path scan, the paper feed path check, the error condition check and the I/O handler must be repeatedly executed. In the present invention, the I/O processing is batch-processed in each mode. The mode ¥INTCH is always executed except in the step 105.

In steps 102–105, the process tasks are macro-called and executed.

In a step 107, it is checked if the execution right should be returned to the host monitor. It is determined in accordance with the result of the execution of the process task. Depending on the configuration of the host monitor, it can be forcibly reset when a new event occurs by the interruption. The present invention does not specifically refer to the switching method of the host monitor and the sub-monitor. It is carried out in accordance with the flag set or reset in accordance with the result of the execution of the process task.

The HEATU (check stage before heater warm-up, see FIG. 17-5f) is switched in this stage if the initial check detects no error and the energization is permitted. It is the check routine before the fixing heater is warmed up (to the predetermined temperature and the copy process is ready. (In the pressure fixing and the flash fixing which do not use the heat fixing, this stage is omitted and the positioning and the initialization of the photosensitive drum are carried out, and the pre-copy machine condition for the copy OK status is set.)

In a step 201, the status SCPOW1 and SCPOW2 are tested, and the execution macro is called. In addition to the heater warm-up, the initialization for making copy process ready is carried out. Thus, the macros of positioning (¥POSIT), photosensitive drum initialization (¥PCCLN), heater temperature control (¥FUSCN) and diagnosis (¥DIAGN) are called.

In steps 202–217, the process tasks are macro-called and executed.

As described above, once the positioning macro is called, it is neglected thereafter and not called. The macro which samples the surface potential by the periodic monitor by the count of the clock function, is neglected except at the predetermined count time.

In a step 218, the return to the host monitor is checked. This stage is controlled by the sub-monitor of this stage unless the event is generated.

The ¥STNBY (pre-copy stand-by stage, see FIG. 17-6g) is now explained. The heater has been warmed up (the initialization has been completed in the copying machine of non-heat fixing type), the conditions are met and the copy process is ready. It stands by the depression of the copy start button. The macro includes the task process which is called after the operator has depressed the command switch and the task process which makes the copy process ready by setting the condition in accordance with the values set by the operator. (Exposure lamp position setting, magnification setting, etc.)

In a step 301, the status SCPOW1, SCPOW2 and SCSTB are checked and the macros are called. The check and the processing for keeping the copy condition of the machine at an optimum condition are carried out until the copy process is started. The clock is counted, and if the copy start key is not depressed in a predetermined time, the input data so far is erased and the heater power is reduced to one half for saving the power, and the stand-by mode macro ¥SHUTO is called.

In steps 302–321, the macros are called and the tasks are executed.

In a step 322, the return to the host monitor is checked. If the event (copy start, error detection, etc.) is not generated, it is controlled by the sub-monitor of this stage.

The ¥MCPRN (copy process execution stage, see FIG. 17-7h) executes the copy process. The execution for each copy is controlled. The preset number of copies are processed. This is the busiest stage for the machine operation and the CPU operation.

In a step 401, the status SCCOP1, SCCOP2, SCCOP3 and SCCOP4 are checked and the execution tasks are scheduled. The executed macros are neglected and the unexecuted tasks are controlled. The process is executed together with the diagnosis and the error detection.

In steps 402–428, the tasks are executed.

In a step 429, the return to the host monitor is checked. When a new event (end of the preset number of copies, depression of the copy stop key, error detection) is detected, the execution right is shifted to the host monitor and the task is switched.

In the ¥CPEND, when the preset number of copies have been made and the copy stop (cycle stop) key is depressed the task is switched to this stage. If the end process is reached during the execution of the task of this stage, the copy process is enabled even if all operations are not completed. If the copy start key is depressed, the ¥CPRUU (cooy process execution stage) is immediately called.

In a step 601, the status SCEND1, SCEND2 and SCCOP4 are checked and the tasks are scheduled.

In steps 602–618, the tasks are executed.

In a step 619, the return to the host monitor is checked. If the condition is met during the execution of this stage, the copy enable signal is issued, and if the copy start key is depressed, the task is immediately switched (¥MCPRN is called).

In the ¥MULFN (error processing stage, see FIG. 17-9j), the task being executed by the monitor is switched to this stage.

In a step 701, the status ABNMC is checked. Depending on the degree (heavy or light) of the error, the power is immediately cut off and the copy process is disabled (standby). In order to repair the error, the display or audio guide control macro is called.

In steps 702–710, the tasks are executed.

In a step 711, the return to the host monitor is checked. It is carried out upon the occurrence of the event (reset, repair end).

As described hereinabove, in accordance with the present invention, the monitor is provided to control the machine so that the flexibility is imparted to the addition and the change of the programs. The program modules and the hardwares can be selected in accordance with the system and the separate program need not be designed for each application. A menu of standard programs are prepared as a library. The specification can be readily changed. Thus, the design efficiency is improved and the time required for debugging is reduced and the productivity and the reliability of the hardware and the software are significantly improved.

Figure 18:
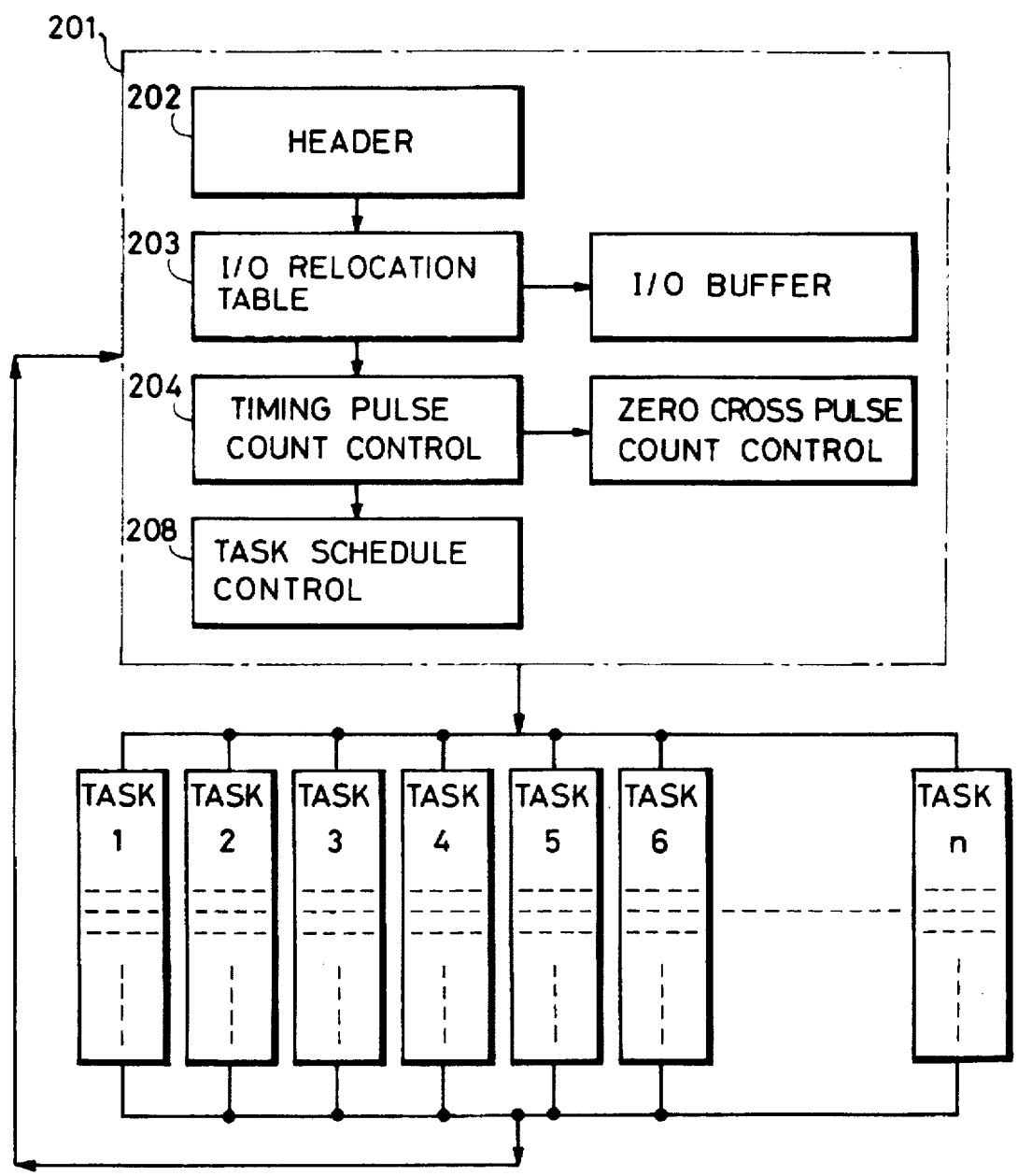
FIG. 18 shows a structure of the monitor.

FIG. 18 shows a construction of a real-time monitor in accordance with an embodiment of the present invention. The monitor of the present invention comprises a header, an I/O relocation table, an I/O buffer, a timing pulse controller, a zero-crossing pulse count controller and a task schedule controller. The generation, deletion, synchronization and communication functions of the task are executed by this monitor. The construction of the monitor is described below.

The sequence controller of the copying machine counts the encoder pulse generated by the motor rotation or the drum rotation and the process program is called (subroutine) in accordance with the count to proceed the sequence. The monitor of the present embodiment basically controls the task schedule based on the pulse count.

The detail of the monitor is explained.

Numeral 201 in FIG. 18 denotes the monitor and numeral 202 denotes a header. When the execution right of the MPU is returned to the monitor, it is first entered to the header 202. The power supply is turned on and the program is started from the address 0. When it is entered to the monitor 201, it is also entered to the header 202. The occurrence of the event to be emergently processed is checked by checking the flag or the status, and if the flag or the status is set, the process under execution is interrupted and the event checked is immediately processed. Thus, the task schedule is forcibly changed by the event checked. The event may be the overheat of the heater, the continuous turn-on of the lamp, the opening of the door (when there is a danger that a human body may contact to the charged area because of the opening of the door), the jam near the fixing unit or the locking of the motor.

Figure 19:
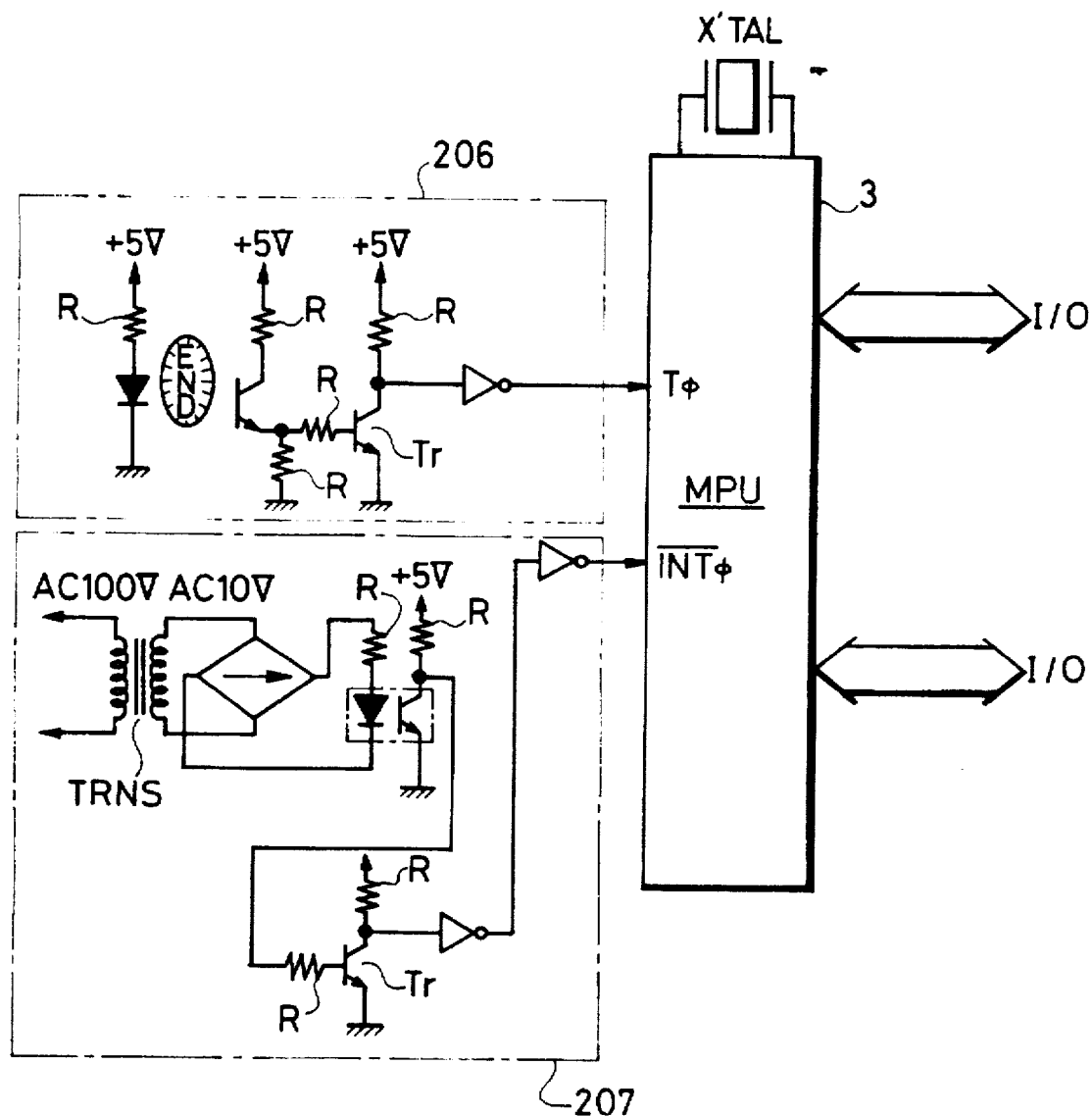
FIG. 19 shows a relation between an MPU, an encoder and a zero-crossing pulse.

Numeral 203 in FIG. 18 denotes an I/O relocation table for imparting the flexibility to the hardware for each application (corresponding to the type of the machine). Thus, even if the hardware configuration may change, the I/O address can be allocated only by the macro instruction without changing the program configuration. At the time of the initialization of the program, a desired port (corresponding to the hardware configuration) is selected and it is allocated to the absolute address. The macro instruction for assigning the I/O relocation table (not shown) to the absolute address is provided. The I/O buffer corresponds to the port and it is inputted and outputted through this buffer. The I/O on the on-chip port of the one-chip MPU can be bit-manipulated and a register is provided therefor. It is attained by operating the register. In this case, it is carried out through the buffer, and if it is the port on the on-chip, the I/O input/output is carried out by the bit manipulation. FIG. 19 shows a relation between the MPU and the encoder zero-crossing pulse.

Numeral 204 in FIG. 18 denotes a timing pulse count controller. The sequence controller of the copying machine counts the encoder pulse generated by an encoder pulse generator 206 of FIG. 19 in synchronism with the movement of the motor or the photosensitive drum to set or reset the load, and checks the signal from the sensor to check the condition of the machine to proceed or stop the sequence.

Numeral 3 in FIG. 19 denotes the MPU which is Intel 8751 in the present embodiment. The 8751 contains two 16-bit event counters. One channel thereof (TO terminal) is used as the input of the encoder pulse 206. The event counter is counted up irrespectively of the execution of the program of the MPU 3. The execution of the MPU is not disturbed by the count. When the MPU which does not contain the event counter is used, the timing pulse is applied to the interrupt terminal and it is executed by the interrupt service routine program. In this case, whenever the timing pulse is inputted, the program currently executed is interrupted and the timing pulse is counted. For example, when the timing pulse has a pulse width of 2 mseconds, the interruption occurs at every 2 mseconds and the program is interrupted. The faster the pulse rate is, the more frequently is the interruption occurs and the execution program is disturbed. Accordingly, when the pulse rate is high, it is not a wise way to count the timing pulse by using the interrupt terminal. When a very low cost MPU which does not contain the interrupt terminal nor the counter, the pulse is applied to the I/O port and the pulse may be counted by a software by polling. In this case, only a relatively low rate pulse can be counted. Particular sensing means for the timing pulse may be selected depending on the system size and the application.

The INT $\phi$ terminal of the MPU3 of FIG. 19 is used to interrupt the zero-crossing pulse from the zero-crossing pulse generator 207 by using the event counter to count the timing pulse. The zero-crossing pulse is used to detect the zero-crossing point of the AC wave and it is applied to the MPU3 and detected to control the power and count up the timer. For the 8751, the interrupt INT$\phi$ enables the edge detection and the level detection by the program. In this case, it is set to the edge detection. The timing pulse counted by those means is compared in the monitor to determine the schedule of the tasks.

Figure 20:
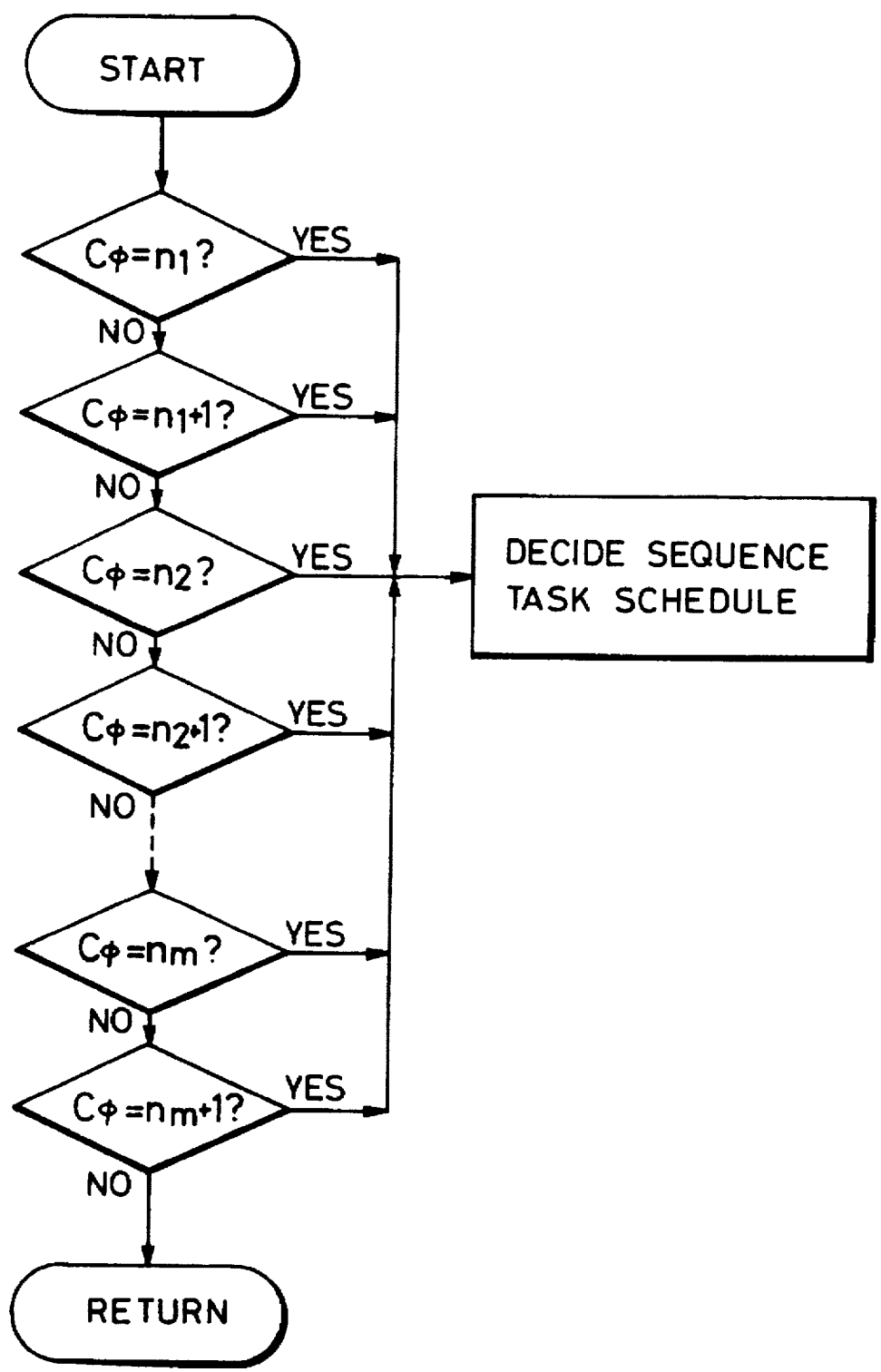
FIG. 20 shows a relation between a count of a timing pulse and a comparison.

FIG. 20 illustrates the comparison of the count of the timing pulse. The timing pulse is inputted as the event input. The falling edge (or rising edge) of the timing pulse is detected and synchronized with the internal clock and it is stored in a 16-bit counter or CO register. The content of the counter register CO is compared with a predetermined value ($n_l$–$n_m$). If they are equal, the program branches to the task schedule controller and the execution task status is set to establish the schedule. Similarly, the task is reset. It means the end of execution. In FIG. 20, the count $n_1$ is incremented by one to $n_1$+1 during the comparison process and the incremented count is again compared so that any error by a certain factor (noise or delay of execution due to the program execution time) due to rapid counting of the timing pulse is prevented.

In this manner, the incoming timing pulse is counted in the monitor and when the count reaches the preset value (e.g. 40, 60, 100, 200, . . . 1100 . . . ), the task schedule is established for the execution (task generation and erasure). When the end of one period of the copy sequence (for example, one revolution of the photosensitive drum, the end or start of one segment of a belt type photosensitive material) is detected in the comparison program routine, the counter register is reset and it is counted up again from zero. For a seamless photosensitive drum, when the count of the timing pulse reaches a predetermined value (e.g. 1200 or 1500), it is counted up to generate the internal interruption. When it reaches the predetermined value (one period), the counter register is reset. The setting of the count for the task generation or erasure is carried out by the macro instruction. For example, if the data is set such that ¥PSCOT=100, the task is started (generated or erased) when the pulse count reaches 100. The task schedule control will be described later.

Figures 1, 21:
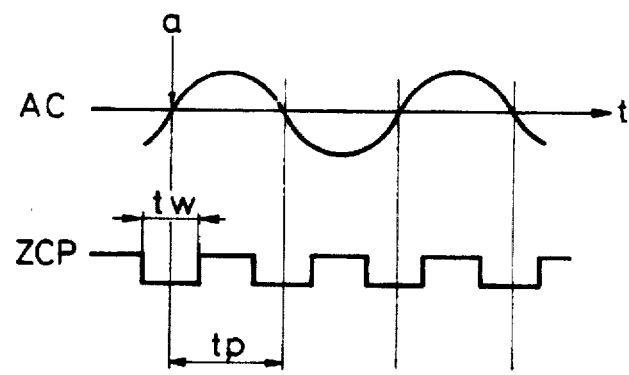
Figures 2, 21:
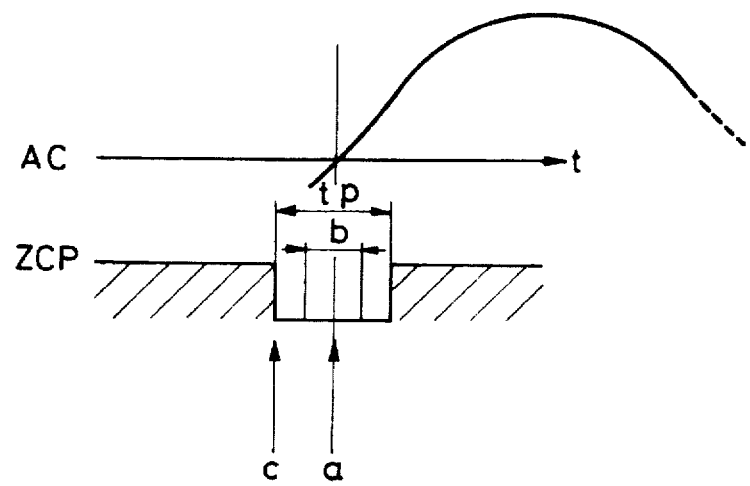
Figures 3, 21:
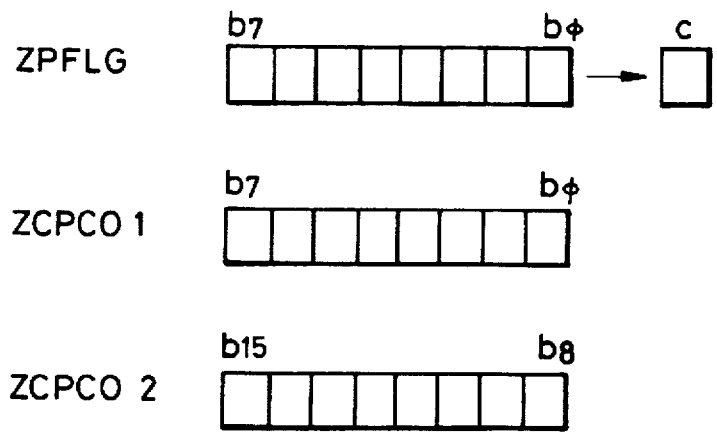
Figures 4, 21:
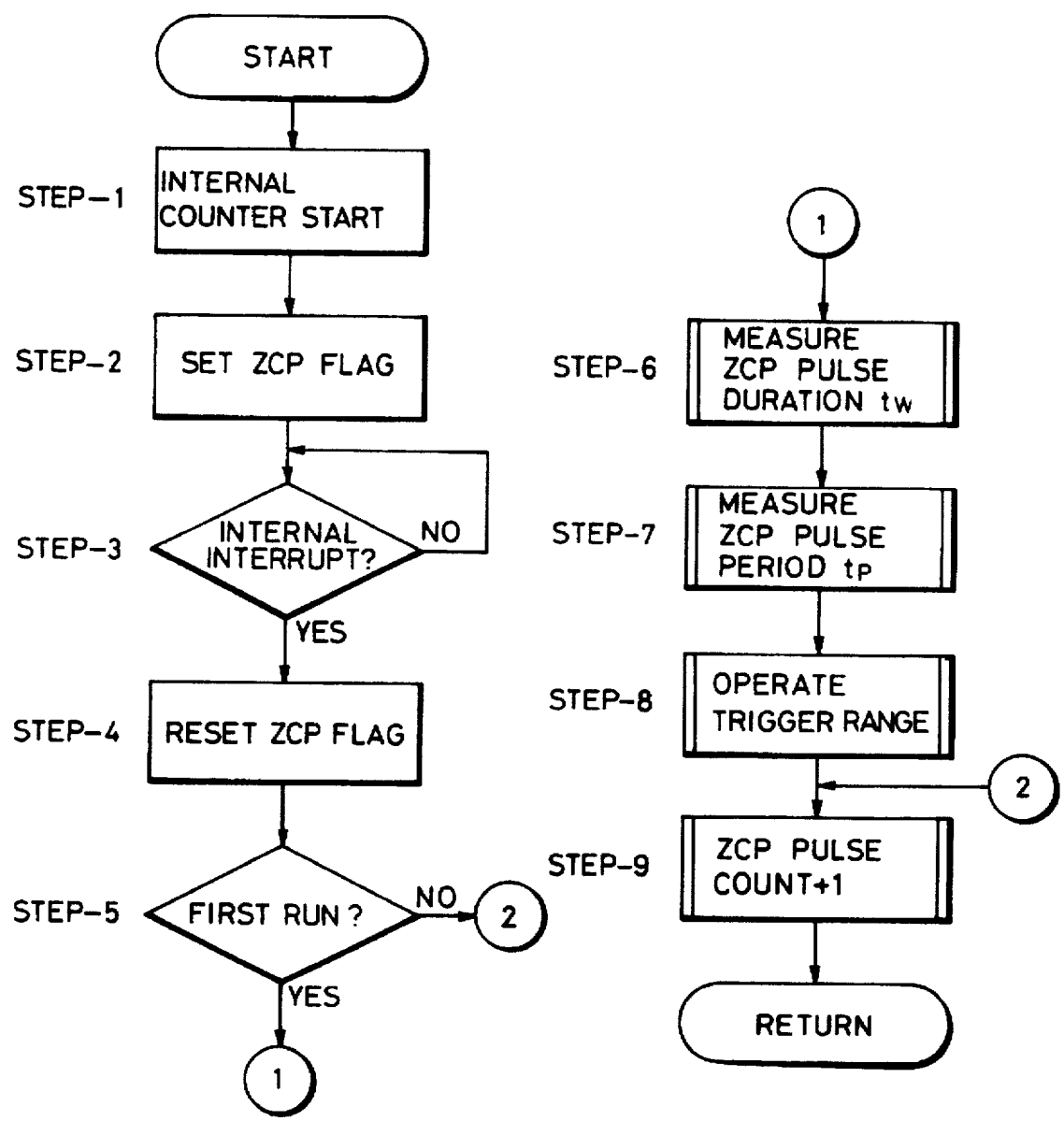

FIG. 21-1 illustrates the generation of the zero-crossing pulse ZCP from the AC wave. The zero-crossing pulse derived from the AC wave is applied to the interrupt terminal to detect the fall (or rise) to interrupt the process. The two represents a pulse width of the ZCP and the $t_p$ represents a period. By counting the period $t_p$ by narrower pulse, for example, the internal pulse of the MPU (the pulse divided from the crystal. For the 8571, it is 1 μsec if a 12 MHz crystal is used), the frequencies 50 Hz and 60 Hz can be discriminated. A point a is a true ZCP. The ZCP may be used to control the zero-crossing point trigger of the AC power, the PWM of the AC power, the phase control, the generation of the timer by the count of the ZCP and the task schedule control (switching of the task Upon the receipt of the ZCP).

FIG. 21-2 is an enlarged view of FIG. 21-1. A point a is the true ZCP, and the $t_p$ represents the period. The pulse width $t_w$ of the ZCP is influenced by the circuit configuration and ranges between 50–500 μ seconds. The point a which is the true ZCP may be considered to be at a mid-point of the pulse width $t_w$. Accordingly, by starting the internal counter from a detection point c to count the tw, the operation is carried out. The end of the tw may be fanned out to the ports and checked at the ports, or may be applied to other interrupt terminal at the rising edge. The triggering range b is narrow so that the zero-crossing trigger is more precisely effected to suppress the noise. If the ZCP can be calculated by calculating the tw, the range b can also be calculated. The counter may be started from the point c to determine the range b and a flag is set for the zero-crossing point status ZPFLG for that period.

FIG. 21-3 shows constructions of the flag registers ZPFLG, ZCPCO1 and ZCPCO2 of the zero-crossing pulse controller.

FIG. 21-4 shows a flow chart of the zero-crossing pulse controller.

In a step 1, the interruption is issued at the ZCP a point and the internal counter $C_1$ is started. The start of the counter generates or erases the zero-crossing flag. For the Intel 8751 MPU, the internal pulse has a pulse width of 1μ second. (It controls the ZCP flag.)

In a step 2, a flag is set at the LSB b0 of the register ZPFLG. This flag is checked by the I/O controller and if it is "1", the zero-crossing is triggered. This flag is set for only 200μ seconds. (If a higher precision is required, a shorter period is used.)

In a step 3, the internal interruption is checked. When the count set in the step 1 is reached (in the present embodiment, in 200μ seconds or 200th pulse), the internal interruption is issued.

In a step 4, after the predetermined period has elapsed, the flag at the ZPFLG b0 is reset. In the present embodiment, the zero-crossing trigger is enabled for 200μ seconds. As described above, if a higher precision is desired, the count in the internal counter in the step 1 is appropriately selected.

In FIG. 21-4, the range b is measured and the trigger range b is ended in the step 4, and the flag is reset. In a first run of the program execution (immediately after the power-on), the value is fixed (not calculated). The fixed value is set to 100μ seconds after the detection, and after the calculation, it is set to the new value. Since the load is not energized in the first run after the power-on, it has no influence to other portions.

In a step 5, it is checked if it is immediately after the power-on.

In a step 6, the ZCP pulse width tw is measured.

In a step 7, the period $t_p$ is measured and the frequencies 50 Hz and 60 Hz are discriminated.

In a step 8, the trigger range b is calculated. The counting is done after the detection of c to calculate the b. The narrower the b is, the larger is the noise suppression effect of the triggering. However, in view of the program execution time, the low speed MPU is hard to detect the flag. The range b is determined in accordance with the speed of the MPU 3.

In a step 9, the ZCP is counted. The timer may be constructed in accordance with the count. As shown in FIG. 21-3, the ZCPCO1 represents the low order 8 bits of the ZCP counter and the ZCPCO2 represents the high order 8 bits. It is incremented by one for each incoming ZCP pulse and stored in the ZCPCO1. When the ZCPCO1 is full and a carry is generated when it is incremented by one, the carry is supplied to the ZCPCO2. In this manner, the count of the zero-crossing pulse is stored in the 16 bits of the ZCPCO1 and the ZCPC02.

In FIG. 21-3, ZPFLG is the zero-crossing trigger flag. In FIG. 21-2, "1" is set at b0 of the ZPFLG only for the period of b. In the output program routine, the ZPFLG is shifted right to check the flag, and if the flag is set, the zero-crossing is triggered.

As described above, the timing pulse count controller comprises the external encoder pulse and the zero-crossing pulse (ZCP). The sequence or the automatic control system task schedule is controlled by the count.

The task schedule controller 208 of FIG. 18 is explained. It switches the task schedule. It executes the task in accordance with the predetermined copy mode and sequence. If the emergent error or interruption occurs, the priority order of the task schedule is changed so that the emergent task is executed.

Figure 22:
FIG. 22 shows a status checked by the monitor.
Figure 22:
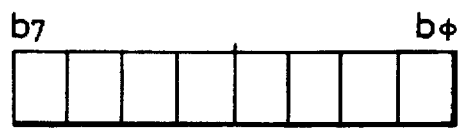
Figure 22:
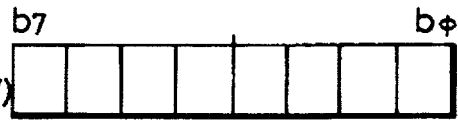
Figure 22:
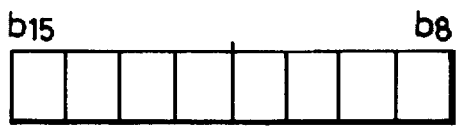
Figure 22:
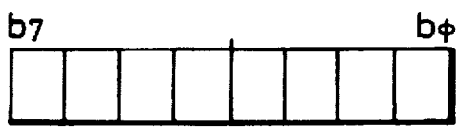
Figure 22:

The status checked in the task schedule controller of the present monitor is shown in FIG. 22. The malfunction mode, the diagnosis mode (status) and the steady mode are checked. The malfunction mode (heavy malfunction) is executed in the monitor at the highest priority. The status is checked in the header 202 of FIG. 18. If any malfunction is detected, the execution task is immediately executed. When the status is checked in the header, the status MALFN shown in FIG. 22 is immediately called. The steady mode status is of 1 byte length and it is executed starting from the MSBC (b7). When the number of tasks is large, the number of bytes may be increased as required. The diagnosis mode will be described later.

Figure 23:
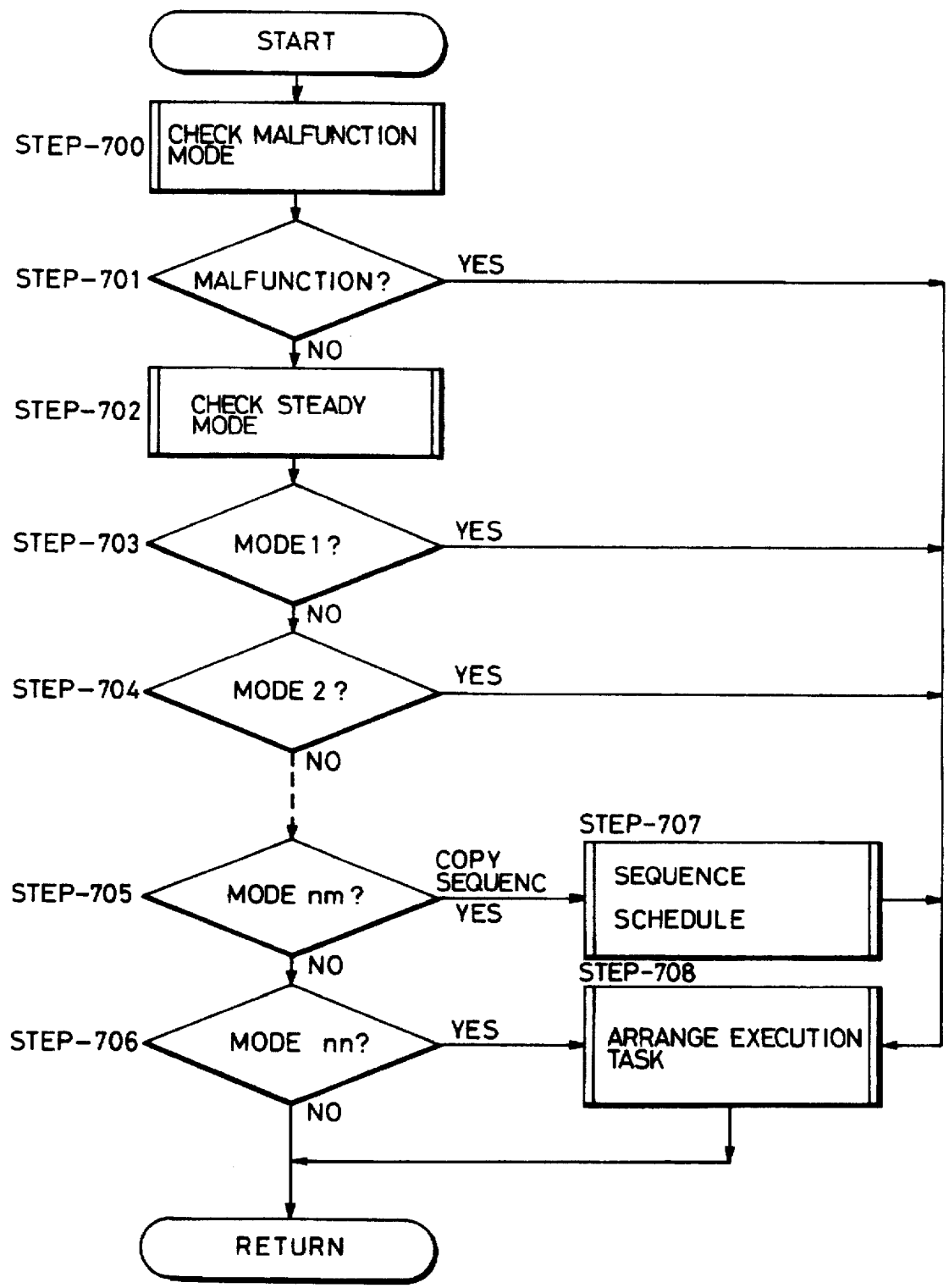
FIG. 23 shows a flow chart of a task schedule control.

FIG. 23 shows a flow chart of the task schedule controller (task scheduler).

In a step 700, if the malfunction mode (heavy malfunction mode) is detected by the header, the monitor immediately jumps to the step 101 to check the malfunction (heater overheat, continuous turn-on of the halogen lamp, etc.). The status MALFN and ABNOM of FIG. 22 are usually checked.

In a step 701, if the malfunction (either heavy malfunction or light malfunction) is detected, the error processing task is assembled in the step 10 108 and executed. The content of the process differs depending on the degree of the malfunction.

In a step 702, the steady mode is checked. The stage being executed by the MPU 3 is determined.

In steps 703, 704 and 706, the mode is checked and the task corresponding to the mode is combined in the step 108.

In a step 705, the sequence in the copy mode is controlled. If this mode is detected, the order of the control of the tasks determined by the count of the timing pulse is read out to combine the task execution.

In a step 707, the copy mode task is arranged in accordance with the count of the timing pulse of the sequence control. The execution task is constructed.

In a step 708, the tasks are constructed in accordance with the mode. Necessary tasks are selected from the task group in accordance with the mode and arranged in the order of execution.

The task scheduler has thus been described. The emergent task switching is checked in the header by the occurrence of the event. For other tasks, the status are set or reset in their processing routines by the steady event (for example, when the fixing temperature reaches the predetermined temperature and the copy process is enabled, or when the copy start/stop button is depressed).

Table 5 shows the steady mode (CPMOD) status for determining the task schedule shown in FIG. 22. The CPMOD is checked in the monitor and the tasks necessary for the flagged mode are arranged. In the present embodiment, there are eight stages in the steady mode. If the numbers of the modes and the stages are larger, the CPMOD may be expanded to two bytes or three bytes.

TABLE 5

| CPMOD | |
|---|---|
| b7 | Initial check |
| b6 | Power-on (Warm-up) |
| b5 | Copy enable (stand-by) |
| b4 | Copy process (copy start) |
| b3 | Copy stop |
| b2 | Copy end |
| b1 | Interrupted copy |
| b0 | Test mode |

The MPU 3 moves the CPMOD to the accumulator and sequentially shifts it to the left to check the carry to determine the bit position of the status flag. The necessary task is arranged and the macro is called. Since the emergency is relatively low, the emergency stop flag need not be set at b7.

Table 6 shows the status MALFN of the malfunction mode of FIG. 22, particularly the heavy malfunction mode. If it is detected by the header, the MALFN is immediately read out and the error is checked and the processing task is called. In any case, the power unit must be immediately cut off to prevent the accident. In the MALFN, the b0 bit is used to prevent the operator from touching the charged area when he/she opens the front cover or the top cover, and it is different from the hardware error.

TABLE 6

| | MALFN (heavy malfunction) |
|---|---|
| b7 | Emergency stop flag |
| b6 | Heater overheat |
| b5 | Fixing unit jam |
| b4 | Exposure lamp malfunction |
| b3 | Optical system scan motor overrun or locking |
| b2 | Lens drive motor overrun or locking |
| b1 | Not use |
| b0 | Door open |

Table 7 shows light malfunction status ABNOM1 and ABNOM2 in the malfunction mode. When it is detected during the copy process, the copy operation is stopped as soon as the current process is completed (cycle stop) and the restart of the next copy cycle is inhibited.

TABLE 7

| | ABNOM1 (Jam) |
|---|---|
| b7 | Jam flag |
| b6 | Paper feeder jam |
| b5 | Registering unit jam |
| b4 | Separator jam |
| b3 | Fixing unit jam |
| b2 | Paper extraction unit jam |
| b1 | Drum wrapping |
| b0 | |

| | ABNOM2 (Supply) |
|---|---|
| b7 | No supply flag |
| b6 | No paper in upper cassette |
| b5 | No paper in lower cassette |
| b4 | No toner |
| b3 | Photosensitive drum exchange |
| b2 | |
| b1 | |
| b0 | |

If the b7 of the ABNOM1 is detected, the jam is detected and it is rotated to determine the location of the jam. If the jam status is set at b6, b5 or b4, the machine is stopped after the copy paper has been completely ejected if it is in the fixing unit or the paper ejection unit. If the jam occurs in the fixing unit or the paper ejection unit, the paper feed must be stopped and the machine must be immediately stopped.

The ABNOM2 checks the supply. If the flag at b7 is "1", it indicates that the supply is exhausted. In this case, the machine is not immediately stopped or cycle-stopped. However, if the papers of the designated size are exhausted in the upper and lower cassette, the machine is cycle-stopped. If the papers of the same size are contained in the upper and lower cassettes and the papers in the upper cassette are exhausted, the papers are fed from the lower cassette so that a large volume of papers can be endlessly fed. When the toner is exhausted or the photosensitive drum is to be exchanged, the warning is issued by the display or the audible speech and the machine is not stopped. The machine can be operated although the copy quality is degraded.

TABLE 8

| | DIAGN (Circuit diagnosis) |
|---|---|
| b7 | Low voltage power supply |
| b6 | Charging high voltage power supply |
| b5 | Transferring high voltage power supply |
| b4 | Discharging high voltage power supply |

TABLE 8-continued

| | DIAGN (Circuit diagnosis) |
|---|---|
| b3 | Separating high voltage power supply |
| b2 | Erase lamp |
| b1 | Pre-exposure lamp |
| b0 | Discharging lamp |
| b15 | Circuit malfunction flag |
| b14 | Toner density control circuit |
| b13 | Lamp regulator |
| b12 | Temperature control circuit |
| b11 | Jam sense circuit |
| b10 | Optical system scan servo motor control circuit |
| b9 | Optical lens drive circuit |
| b8 | Main motor control circuit |

Table 8 shows the status for checking the diagnosis mode. The diagnosing sensor is included in each circuit and the diagnosing signal therefrom is tested. If the circuit is uncontrollable or the abnormal current or voltage is detected, or no output is produced (from the power supply) or the lamp is not lit by the circuit malfunction, the status flag is set at the predetermined bit of the DIAGN. The bit b15 is the abnormal flag which is set when the status flag is set in one of b0-b14.

The tasks and the entry names of the macro call are now explained with reference to Table 9. The copying machine of the present embodiment has 28 different tasks each of which can be accessed by calling the entry name. The individual tasks are blocked into one macro to construct the stages of the copy process (for example, pre-copy check routine, copy process execution routine, etc.).

TABLE 9

| Task NO. | Task Function | Entry Name |
|---|---|---|
| T-1 | Display control | ¥DISCN |
| T-2 | Key entry scan control | ¥KEYEN |
| T-3 | Positioning | ¥POSIT |
| T-4 | Paper feed check | ¥JAMPA |
| T-5 | Malfunction mode check | ¥MALCH |
| T-6 | Malfunction processing | ¥MALPR |
| T-7 | Motor drive control | ¥MOTDR |
| T-8 | Optical system scanner motor servo control | ¥SCANM |
| T-9 | Optical system magnification setting pulse motor control | ¥PALEN |
| T-10 | Paper registration control | ¥FEDRE |
| T-11 | Photosensitive drum control (charge, transfer discharge, separation) | ¥POCON |
| T-12 | Exposure lamp control | ¥EXPCN |
| T-13 | Auto-erase control | ¥ERASE |
| T-14 | Photosensitive drum cleaning control | ¥PCCLN |
| T-15 | Paper ejection control | ¥PAPEX |
| T-16 | Heater temperature control | ¥FUSCN |
| T-17 | Toner density control | ¥TONCN |
| T-18 | Double fee&sensor control | ¥DVPFE |
| T-19 | Developing bias control | ¥DEVBI |
| T-20 | Surface potential control | ¥PCVSC |
| T-21 | Original density pattern recognition | ¥RECOR |
| T-22 | Speech response control | ¥ACOUS |
| T-23 | Speech recognition | ¥RECAC |
| T-24 | Automatic diagnosis | ¥DIAGN |
| T-25 | External test control | ¥APPLY |
| T-26 | Interval timer control | ¥INTIM |
| T-27 | Auto-shut-off | ¥SHUTO |
| T-28 | Clock control | ¥CLOCK |

The functions of Table 9 are now briefly explained.

T-1 is a control program for indicating the condition of the copying machine. It controls the dynamic scan by using a dot matrix display panel, an LCD or a 7-segment LED depending on the specification of the machine. It also indicates the condition of the machine in each copy stage and responds to the user commanded content.

T-2 scans the key switches on the control panel to check the entry by the operator. It permits or inhibits the entry in accordance with the copy stage and mode. For example, the entry for the change of the setting of the number of copies during the copy run is inhibited, and the entry of the clear key or the emergency stop key is permitted.

T-3 initializes the mechanism to return the photosensitive drum, the scanner and the cams to their home positions. This is done while checking the home position sensors, and if they are not returned to the home position within the predetermined time, an error signal is issued to visually or audibly inform it to the operator.

T-4 checks the passage of the paper in the copying machine and checks the paper feed, the registration, the separation and the paper ejection. In the initial check before the copy start, the remaining paper is checked. The paper feed unit is driven until the paper in the machine is ejected, and if it is not ejected by the jam, the malfunction is detected.

T-5 checks the ¥JAMPA of T-4 and checks the heater, the lamp, the temperature sensor, the door opening, the motor locking and overheat, the timing pulse encoder, the optical system, the developing system and the photosensitive drum, by using the sensors.

T-6 carreis out the error processing such as emergency stop, cycle stop or inhibition of restart depending on the degree of the malfunction such as the jam, the density, the lamp, the inadvertent door opening, the paper exhaust, the toner exhaust, the motor locking, the overcurrent and the overload. The content of the malfunction is visually or audibly informed to the operator from the control panel. When the error is repaired and the return to the copy process is permitted, the photosensitive drum is cleaned depending on the degree of the error (the jam in the development cycle, the machine stop before the completion of the cleaning, etc).

T-7 stops or starts the motor depending on the condition of the machine.

T-8 is a servo control. The encoder pulse is read to detect the position to control the speed, the forward and backward rotation and the short return by the paper size signal.

T-9 moves the lens under the open-loop control of the pulse motor in accordance with the magnification (reduction or enlargement) inputted by the control panel.

T-10 controls the paper feed from the upper and lower cassettes so that the papers of the size designated by the operator are automatically fed to allow a large volume of copies (limitless paper feed). It also controls the loop of the paper in the registration station to precisely focus the image.

T-11 controls the charging, the transferring, the separation and the discharging of the photosensitive drum, and controls the corona high voltage power supply and the discharging lamp. The toner and the paper taste deposit on the tangusten wire of the high voltage charger as it is used for a long period, and the toner is fused and causes uninformed corona discharge. In order to prevent it, a ceramic vibrator is contacted to the charging corona tangusten wire and it is vibrated between the copy sequences to clean the wire after each end of the copy sequence.

T-12 controls the exposure lamp. It turns on and off the exposure halogen lamp at a predetermined timing. In order to prevent the influence of the voltage fluctuation, the power supply voltage is digitally detected by the A/D converter, and it is converted to an effective value and digitally phase-controlled. This task samples the AC power supply and calculates the phase shift.

T-13 detects the paper size by a paper feed pass device and erases the photosensitive drum in accordance with the paper size.

T-14 controls the discharging corona, the discharging lamp and the cleaner (blade) while the surface potential is sampled by the surface potential sensor.

T-15 is a paper ejection control. It ejects the paper and stocks the paper in the stocker (tray). It increments the copy counter by one.

T-16 controls the heater temperature. The power is controlled such that the heater is warmed up rapidly upon the power-on and maintained at a predetermined temperature after the warm-up. During the stand-by, the heater is kept at a temperature below the predetermined temperature in order to save the power. (200° C. during the copy run, and 150° C. during the stand-by.) In order to digitally control the power, the zero-crossing point (¥ZEROC of macro T-28) is detected by the interval timer of the MPU (¥INTIM of macro T-26) to phase-control the power in accordance with the intended purpose (heater temperature).

T-17 detects the toner density, and for the two-component developer, maintains a constant ratio of the carrier and the toner. For one-component developer, it detects the amount of the remaining toner and supplement the toner. In the present embodiment, a standard pattern is placed at a corner of the original table and a reflection image thereof is focused on the photosensitive drum and the amount of toner deposited is detected by the photo-sensor. It is A-D converted and processed by the MPU3 to supplement the toner.

T-18 detects the double feed. The light intensities to the photo-sensor when the paper is absent and present are stored in the memory, and the current supplied to the light emitting diode is controlled by the D/A converter to cancel the fluctuation due to the ambient condition of the photo-sensor. The output of the photo-sensor is compared with a reference to detect the double-feed.

T-19 controls the developing bias in accordance with the original pattern density and the ground potential detection. It also controls the bias potential in accordance with the aging (fatigue) of the photosensitive drum.

T-20 detects the dark area and the light area of the photosensitive drum surface potential by a static electrical field chopper sensor. If a residual potential is detected, the bias is controlled by the module 18 to keep the image quality to a constant level.

T-21 reads the original pattern, detects the maximum and minimum densities by the A/D converter and feeds them back to the lamp regulator.

T-22 is an output control by the speech synthesizer which audibly responds to the operator.

T-23 stores a spectrum of a specified speaker to use it in substitution for the key counter. In the emergency stop, if the operator announces "stop", the machine is stopped. This can be used as a safety feature because the machine can be stopped even if the operator is not in the vicinity of the machine.

T-24 diagnosis the machine. For the light malfunction, an audio guidance is given to ask the user to maintain the machine. The process of the machine is controlled without feeding the paper to check the condition of the machine so that the machine is kept in the best copy condition.

T-25 controls the accessories of the copying machine. It controls the auto-document feeder (ADF), the sorter, the collator, the OCR and the fair counter. The ADF, the OCR and the fair counter may be powered from the main frame of the machine, and the sorter and the collator are powered from the main frame when they are low or medium speed devices (10–40 cards per minute), and from a separate power supply when they are high speed devices.

T-26 controls the interval timer used in the program routine. In the present embodiment, the MPU is Intel 8051 which contains two channels of 16-bit timer to control the timer counter.

T-27 resets the preset number of copies, the magnification and the designation of the cassette to the standard ones and set the heater temperature to the stand-by mode if the copy start key is not depressed within the predetermined time (one to two minutes).

T-28 controls the copy job time announcement, the copy data and time recording and the printing of the date on the copy paper. It also controls the constant time monitor for the machine diagnosis.

The task arrangement is now explained. As described above, the tasks are arranged in accordance with the event occurred, and when the copy cycle is started, the tasks are switched in accordance with the timing pulse generated by the encoder. This will be explained by using the entry names of Table 9.

① Initial check (activation of power unit after power-on)

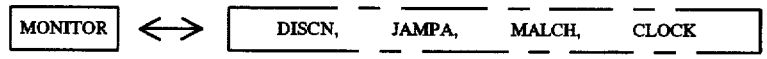

② Check before heater warm-up (warm-up)

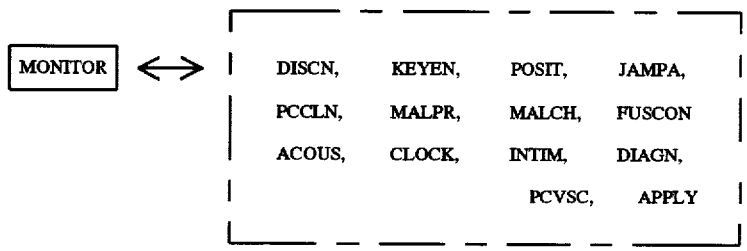

③ Stand-by routine (Copy ready)

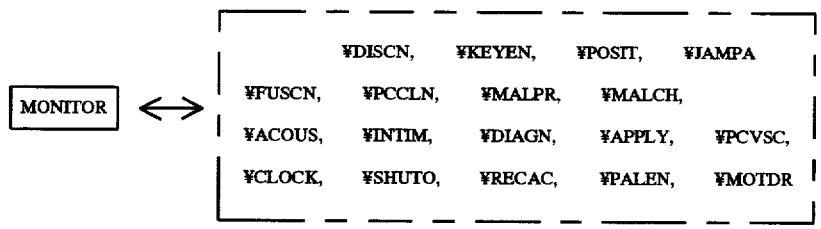

④ Copy process routine (Copy run)

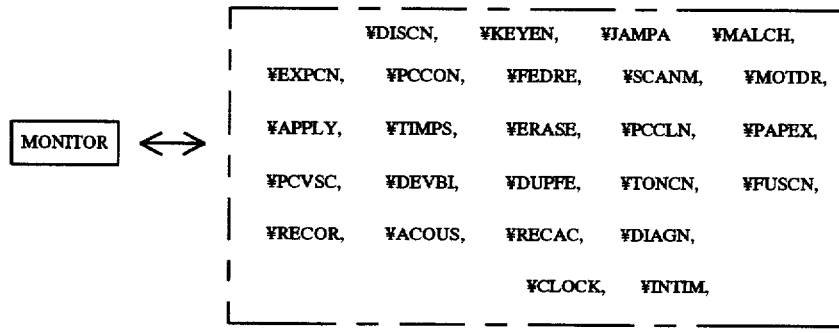

⑤ Copy process end routine (Copy end)

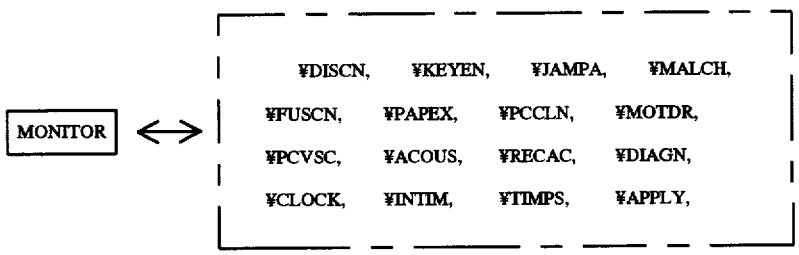

⑥ Error processing

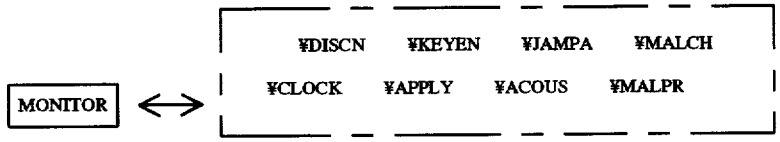

In the arrangement of the tasks, the tasks are macro-called through the monitor, and when one task (¥———) is executed, the execution right is returned to the monitor. Between the task and the monitor, the tasks in the respective modes are sequentially executed. If the emergent event occurs by the interruption during the execution of the task and the execution right is returned to the monitor (before the completion of the execution of the task) and the execution of the different mode is started, the same task is called in the next mode except for the malfunction processing mode to continue the processing of that task, or the next task is executed by interrupting the task currently executed. In the former case, when the heater reaches the predetermined temperature, in the check routine before the heater warm-up, the mode is shifted to the stand-by routine but the macro ¥FUSCN continuously controls the temperature. In the latter case, the photosensitive drum is discharged and cleaned after the copy process, and if the copy start key is depressed during the execution of the task of ¥MPCCLN, the task is immediately interrupted and the copy run routine is started.

The relation between the monitor and the task has been described above. With the present construction, even if the type of machine or the object to be controlled differs, the machine operation can be added or modified as desired by changing the task schedule of the monitor and programming the tasks in modules or macros. For example, when many modes are included, the CPMOD of Table 5 may use two-byte area, and if the order of execution is to be modified, the bit position may be changed. For the necessary mode, the bit pattern is set to "0". The same is true for the MALFN of Table 6, the ABNOM1 and ABNOM2 of Table 7 and the DIAGN of Table 8. If the number of events is large, the register may be expanded. Accordingly, additional unused registers (10-several hundreds bytes) are usually accommodated in the monitor. The monitor is farmware. In the system which uses the one-chip MPU3, it may reside in the on-chip memory. In the system having the external memory, a portion of the memory or the monitor is arranged on one memory chip and the chip is used in the system. Thus, by incorporating it into the machine system as the solid-state monitor, the program can be moduled and the number of steps required to design and debug the program is significantly reduced.

As described hereinabove, the tasks which are program-moduled are controlled by the copying machine control monitor. The monitor of the present invention executes the abnormality check called the header, and if the heavy abnormality is detected, it is immediately processed. The switching of the copy mode is checked by the occurrence of the event. The I/O relocation having the buffer can check the input/output status of the I/O.

The timing pulse count controller is provided. It counts the timing pulse generated by the encoder, and switches the tasks in the copy mode. It also controls the zero-crossing pulse counting and controls the timer comprising the zero-crossing trigger and the zero-crossing pulse count. The task schedule controller is provided. It switches the copy modes and arranges the tasks to be executed. The controller also checks the diagnose status. When the malfunction is detected by the diagnosis, it arranges the tasks for processing the malfunction.

Figure 24:
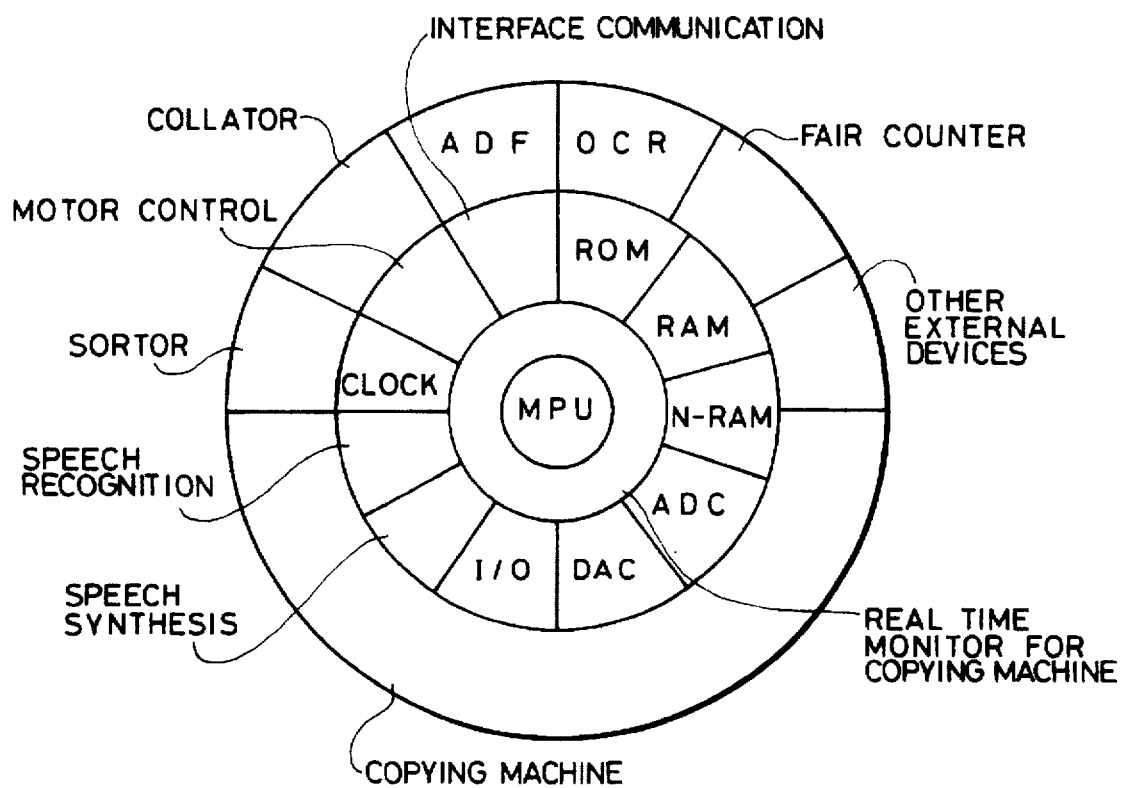
FIG. 24 shows a function of a copying machine superivised by the MPU and the monitor.

FIG. 24 shows the functions of the copying machine controlled and attained by the MPU and the monitor. In FIG. 24, ROM is the program memory, RAM is the data memory, N-RAM denotes the non-volatile data memory, ADC denotes the A/D converter, DAC denotes the D/A converter, and I/O denotes the I/O port. The communication interface interfaces the external devices and the MPU system.

In the prior art system, the program is designed and debugged whenever the machine is developed. By using the monitor of the present invention, the necessary programs are selected from the library and arranged to construct the task schedule. This can be simply attained by preparing the macro instruction. As a result, the program development period is significantly shortened and the efficiency and the reliability of the software are improved.

Figures 1, 25:
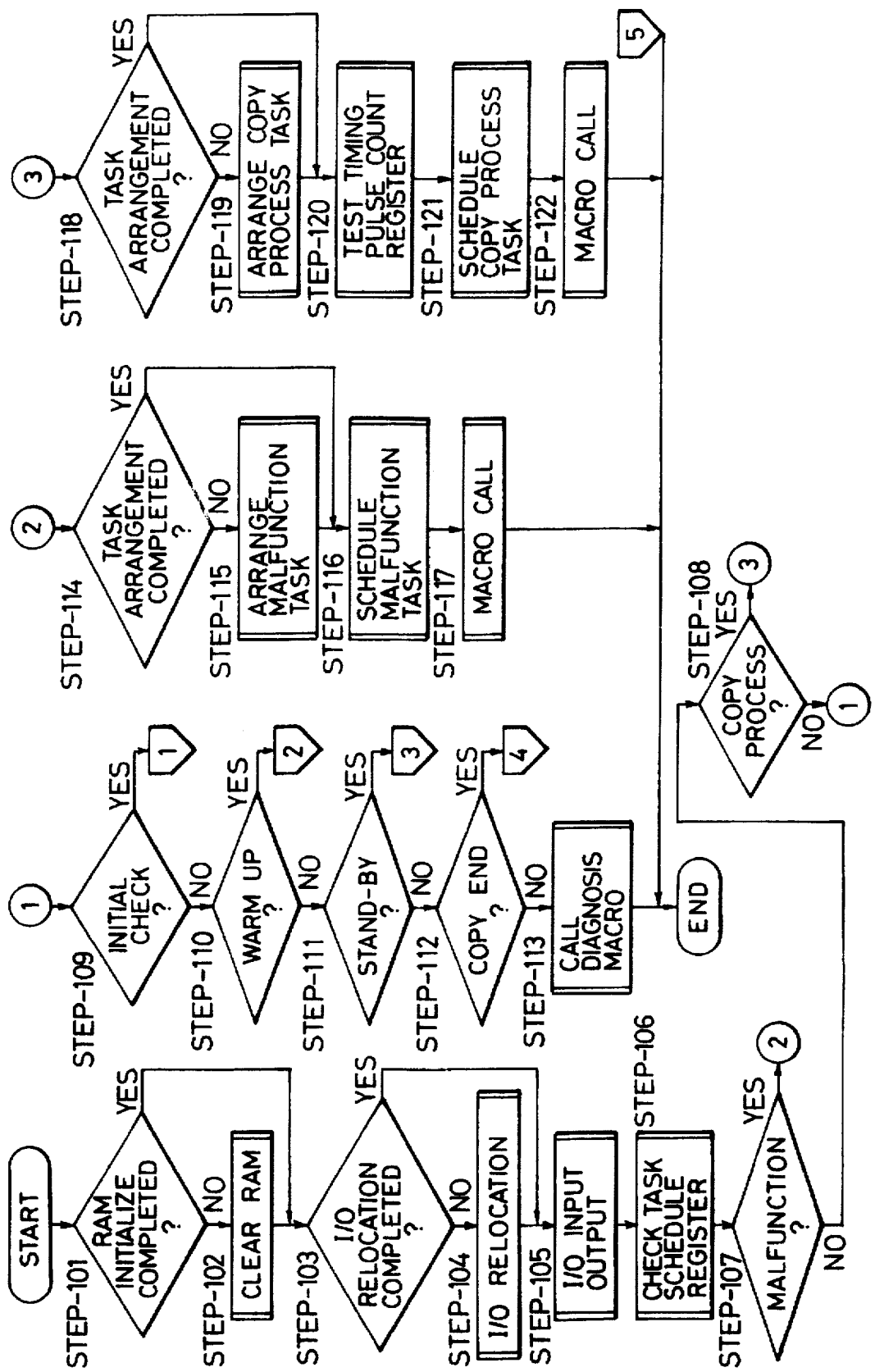
Figures 2, 25:
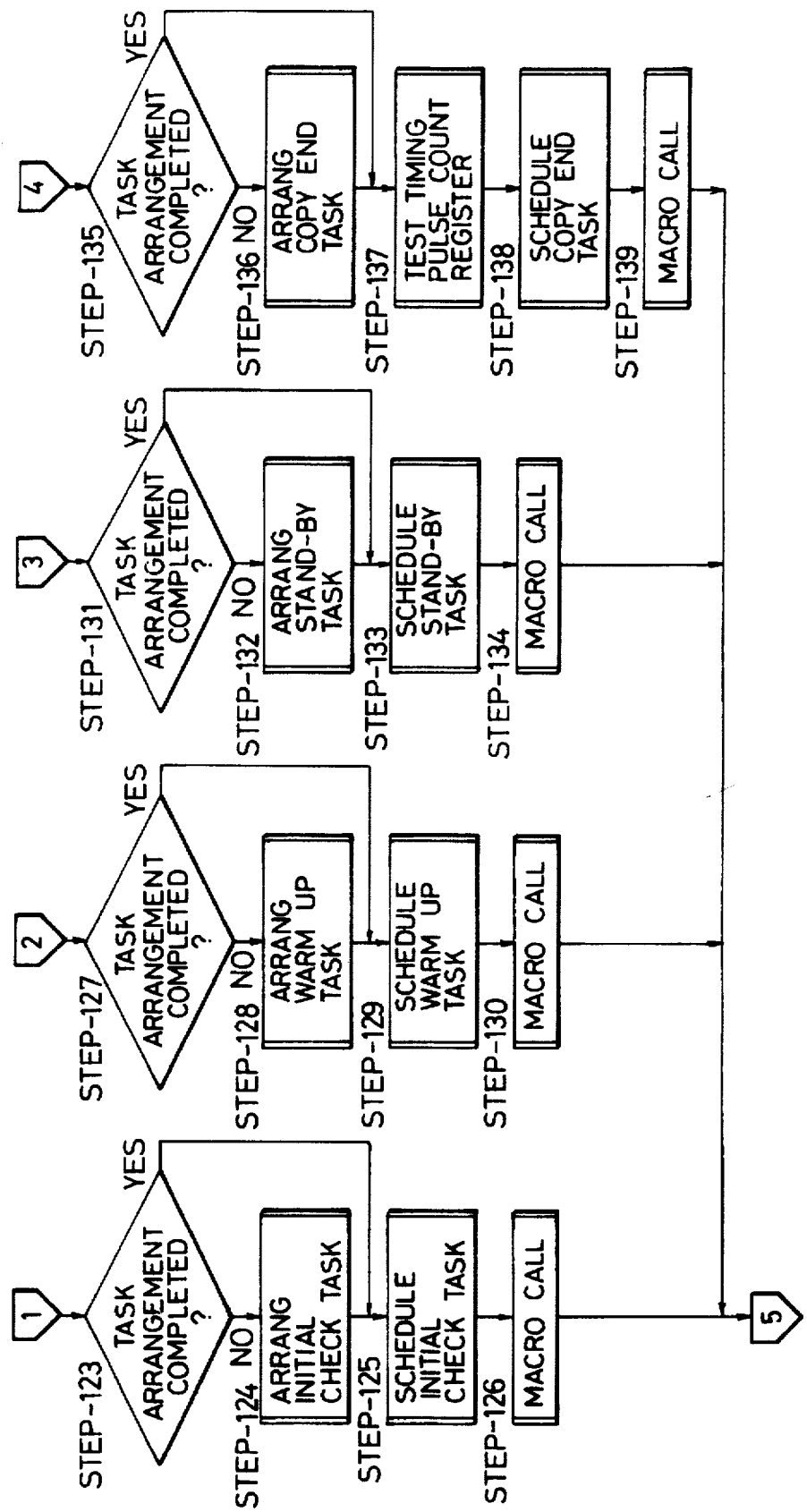

FIG. 25-1 shows a general flow chart of the monitor functions.

A step 101 is started upon the power-on. The data memory and the I/O initialization are checked. The RAM initialization is also checked. (If it has been done when the power was turned on, it need not be done subsequently.)

In a step 102, the RAM is cleared. The designated address of the mapping memory are accessed.

In a step 103, the I/O initialization is checked. It need be done only once upon the power-on like the RAM clear (step 102). If the initialization is required by the diagnose program because the CPU overrun by the noise, the steps 102 and 103 are executed even after the power-on.

In a step 104, the I/O absolute addresses are set. The input/output ports and the addresses of I/O devices are determined.

In a step 105, the I/O is batch-processed. The programs are executed in the respective tasks, the data in the I/O buffer is outputted and the external information is inputted through the input port and stored in the input buffer. Accordingly, the execution results of the tasks are combined and batch-processed in this step. Accordingly, the execution result of the processing task is somewhat delayed depending on the speed of the MPU. When a high precision control without any delay is required (for example, the registration in the high speed copying machine or the servo control in the optical system), the input/output operation may be done by the interruption. When the zero-crossing trigger is required, the flag of the interrupted processing program in the monitor is detected.

In a step 106, the register shown in FIG. 22 is checked to schedule the task. This is shown in the flow chart of FIG. 23. Tables 5–7 show the contents of the status. The task scheduling is checked with the high priority to the malfunction processing task and the processing during the execution of the copy process.

In a step 107, the malfunction mode is checked.
In a step 108, the mode for the copy process is checked.
In a step 109, the initial check mode is checked.
In a step 110, the warm-up mode is checked.
In a step 111, the stand-by mode is checked.
In a step 112, the processing after the copy process is checked.

In a step 113, the execution of the processing task is entered if it is not scheduled in any stage. Since the program might have overrun by the noise, it is diagnosed, and the abnormal processing task is executed or the system is again initialized and started from the first.

In a step 114, the program jumps to the malfunction processing stage. The task arrangement is checked, and if it has been completed, the program jumps to a step 116.

In a step 115, the malfunction processing task is arranged. The content of the arrangement is shown in the example ⑥ described above.

In a step 116, the tasks are scheduled. The individual tasks are returned to the monitor after the execution and the next task is executed. Some tasks need not be executed once it is executed, unless a new event occurs. The order of execution of those tasks is controlled by the register.

In a step 117, the processing tasks are macro-called by the scheduling of the step 116. The tasks are executed separately from the monitor. The task is finally returned to the monitor. The monitor may be called to again enter it in the monitor, or the monitor may detect the end of execution by the interruption (software interruption).

In a step 118, the copy process is executed. The task arrangement is checked.

In a step 119, the tasks are arranged. The content of the arrangement is shown in the example ④ shown above.

In a step 120, the process is executed and the switching of the tasks depends on the count of the encoder pulse. The event counter or the count of the pulses applied for the interruption is checked to check the present value.

In a step 121, the tasks are scheduled by the count of the encoder pulses. The tasks which have no connection with the count of the encoder pulses, such as the entry of the display input key or the counting of the clock are alternately executed irrespectively of the count.

In a step 122, the tasks are macro-called.
Reference is made to FIG. 25-2.

In steps 123–126, the initial check tasks are arranged by the content shown in the example ① and sequentially executed in accordance with the scheduling.

In steps 127–130, the warm-up tasks are arranged. The content of the arrangement is shown in the example ②.

In steps 131–134, the stand-by routine tasks are arranged. The content of the arrangement is shown in the example ③.

In steps 135–139, the copy end processing tasks are arranged. In this stage, the photosensitive drum and other units are cleaned or positioned in preparation for the next copy cycle, and in some cases, the copy process is still being executed (for example, the paper is executed or the scanner is returned). Accordingly, it depends on the count of the encoder pulses. The copy enable signal is issued if the next copy operation is permitted.

What is claimed is:

1. A data processing apparatus which operates in a plurality of operation modes comprising:

program memory means for storing a plurality of program modules each for one of a plurality of tasks to be executed in the plurality of operation modes, at least one of the tasks being common to at least two of the operation modes;

first monitor means for monitoring an execution status of the plurality of operation modes and a condition of said apparatus;

a plurality of second monitor means each for monitoring execution statuses of tasks to be executed in respective operation modes in accordance with an execution order of the tasks;

mode selection means for selecting one of the plurality of operation modes and activating one of the second monitor means corresponding to a selected operation mode on the basis of a monitoring result by said first monitor means;

task selection means for selecting a task to be executed next on the basis of the execution statuses monitored by said second monitoring means; and execution means for executing a program module corresponding to the task selected by said task selection means.

2. A data processing apparatus according to claim 1, wherein said first monitor means counts a timing pulse generated by an encoder driven by a motor and determines the execution statuses of the plurality of operation modes based on a counted value of the timing pulse.

3. A data processing apparatus according to claim 1, wherein said first monitor means detects a malfunction of said apparatus during the monitoring of the condition of said apparatus.

4. A data processing apparatus according to claim 1, wherein said first monitor means detects an operation of said apparatus by a user during the monitoring of the condition of said apparatus.

5. A data processing apparatus according to claim 1, further comprising a heater in said apparatus, wherein said first monitor means monitors a temperature of said heater.

6. A data processing apparatus according to claim 1, wherein said first monitor means checks a plurality of types of conditions of said apparatus in a predetermined order.

7. A data processing apparatus according to claim 1, wherein said first monitor means transfers a control right to one of said second monitor means when said one second monitor means is activated.

8. A data processing apparatus according to claim 7, wherein said one second monitor means returns the control right to said first monitor means when the operation mode corresponding to said one second monitor means is completed.

* * * * *

UNITED STATES PATENT AND TRADEMARK OFFICE
CERTIFICATE OF CORRECTION

PATENT NO. : 5,701,481
DATED : December 23, 1997
INVENTOR(S) : MASAO HOSAKA ET AL.

Page 1 of 7

It is certified that error appears in the above-identified patent and that said Letters Patent is hereby corrected as shown below:

AT [57] ABSTRACT

Line 2, "modules" should read --modules,-- and "task" should read --task,--.

IN THE DRAWINGS

Figures 1, 17:
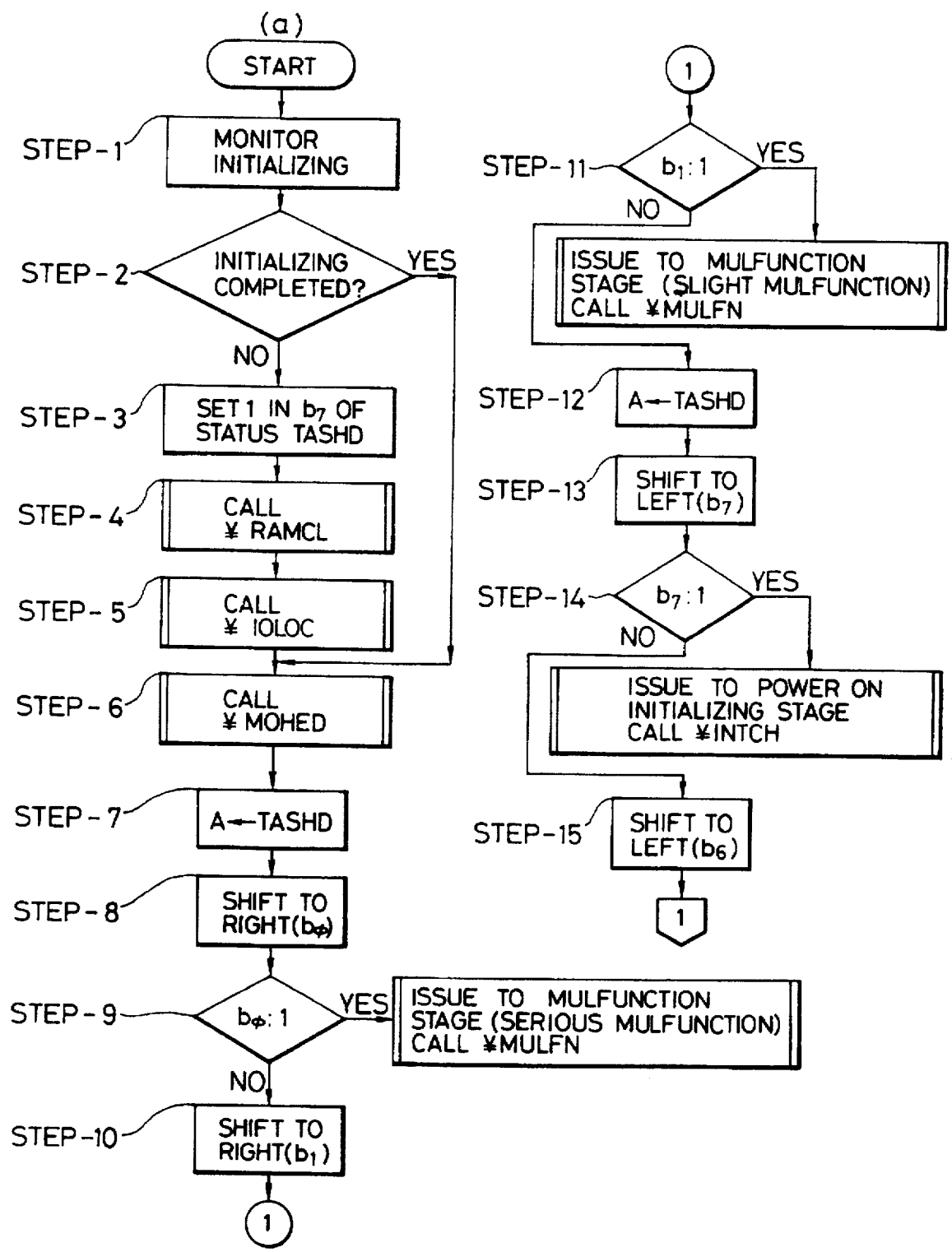
Figures 2, 17:
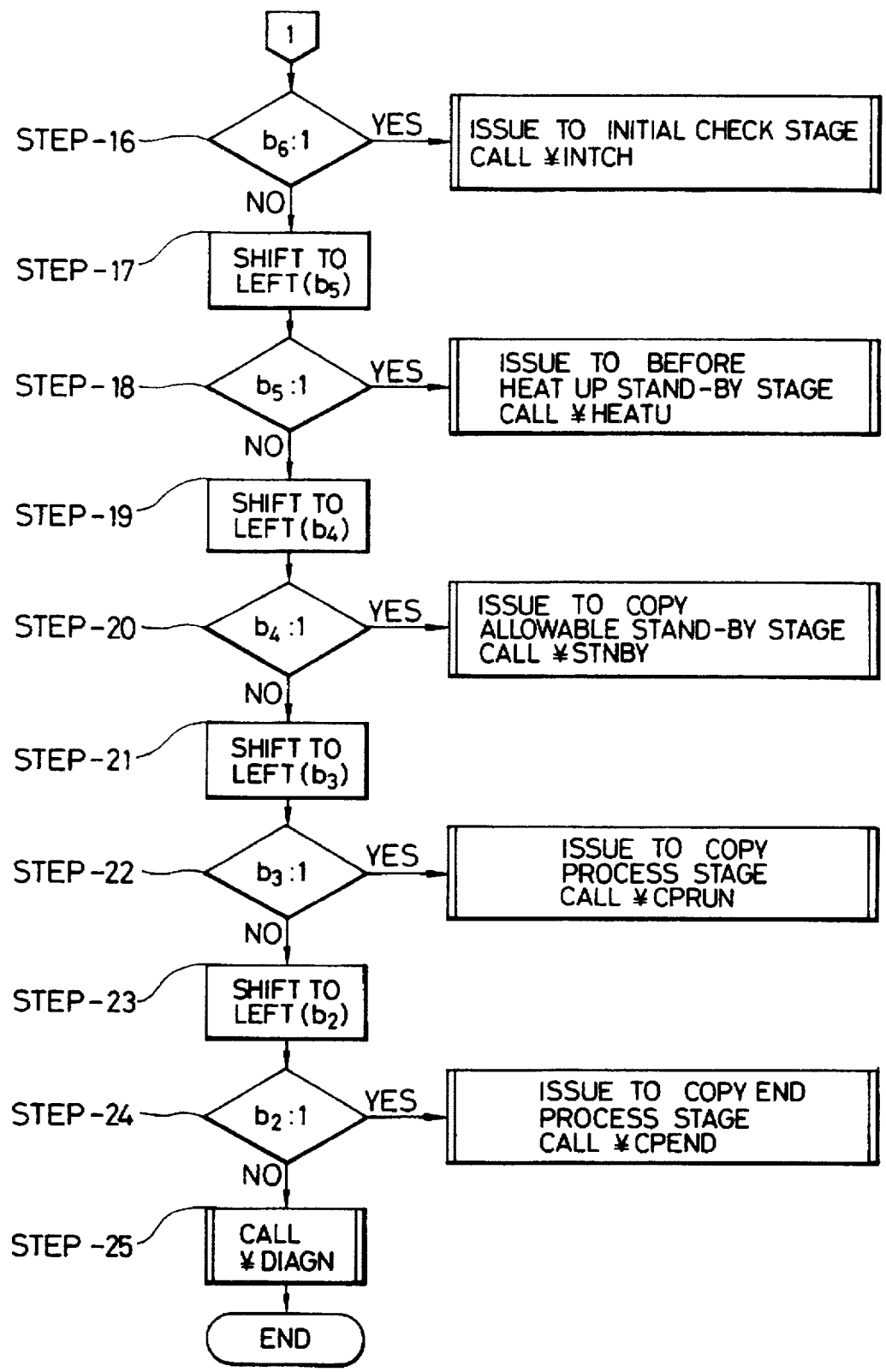
Figures 3, 17:
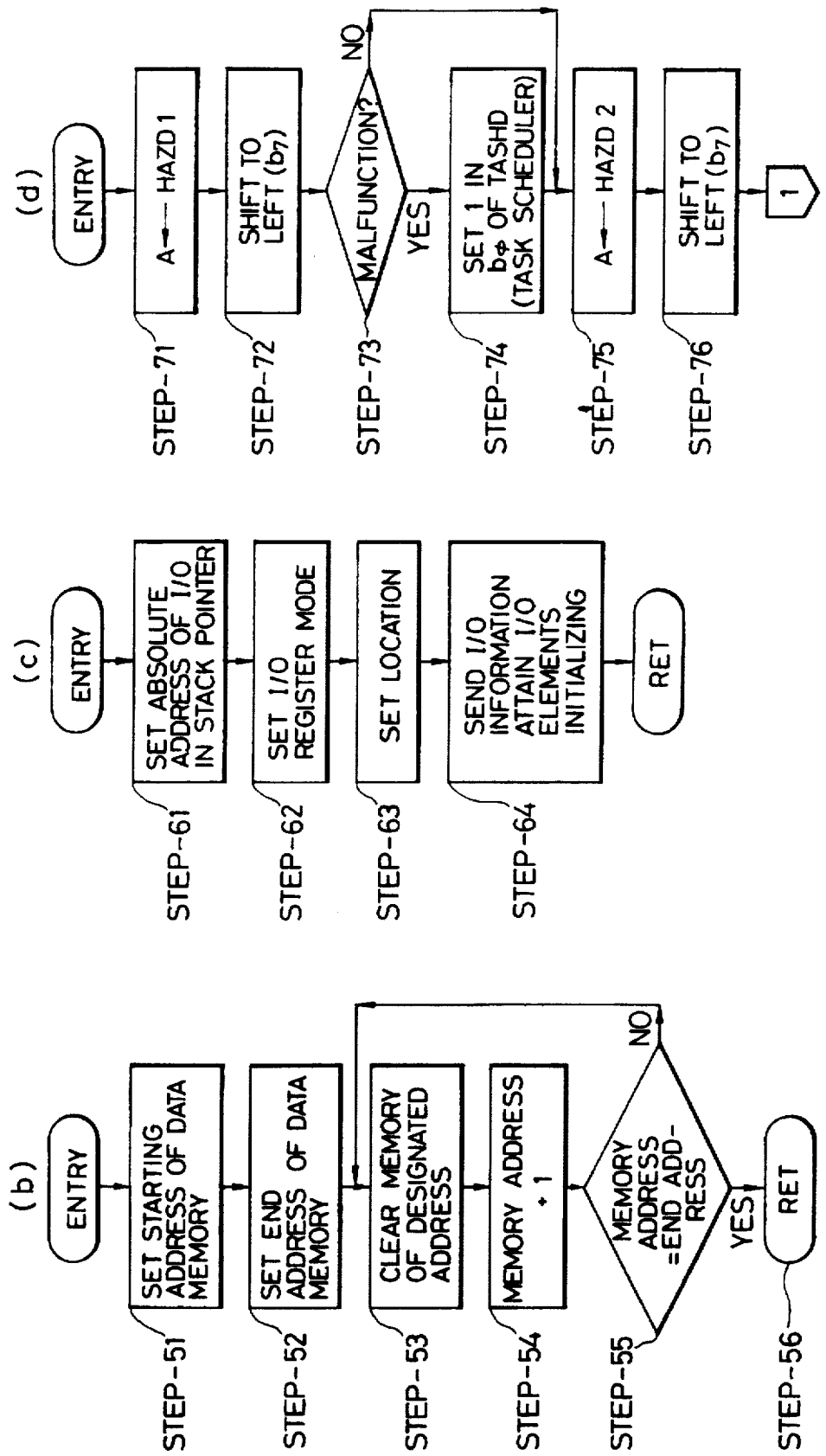
Figures 5, 17:
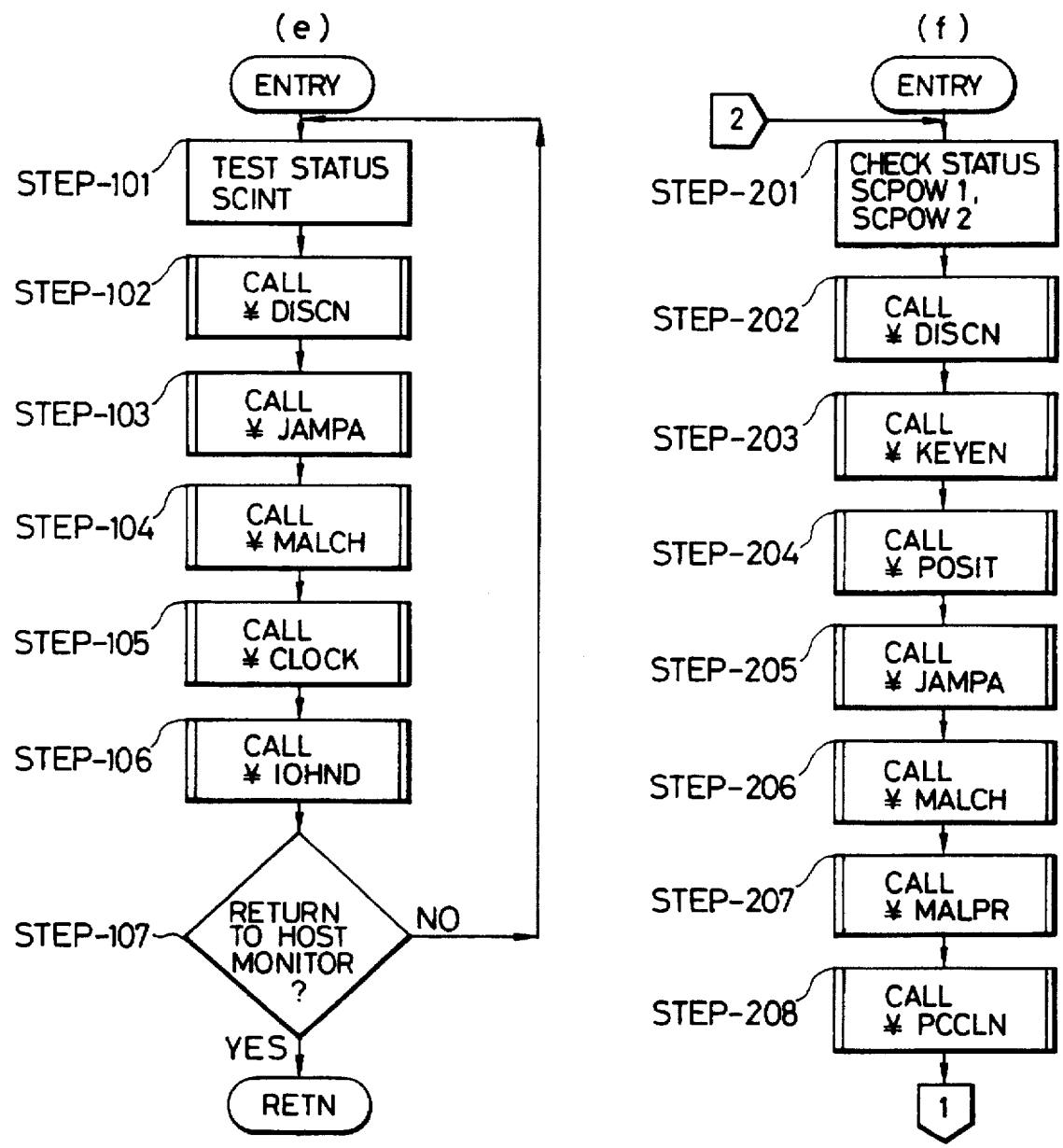
Figures 6, 17:
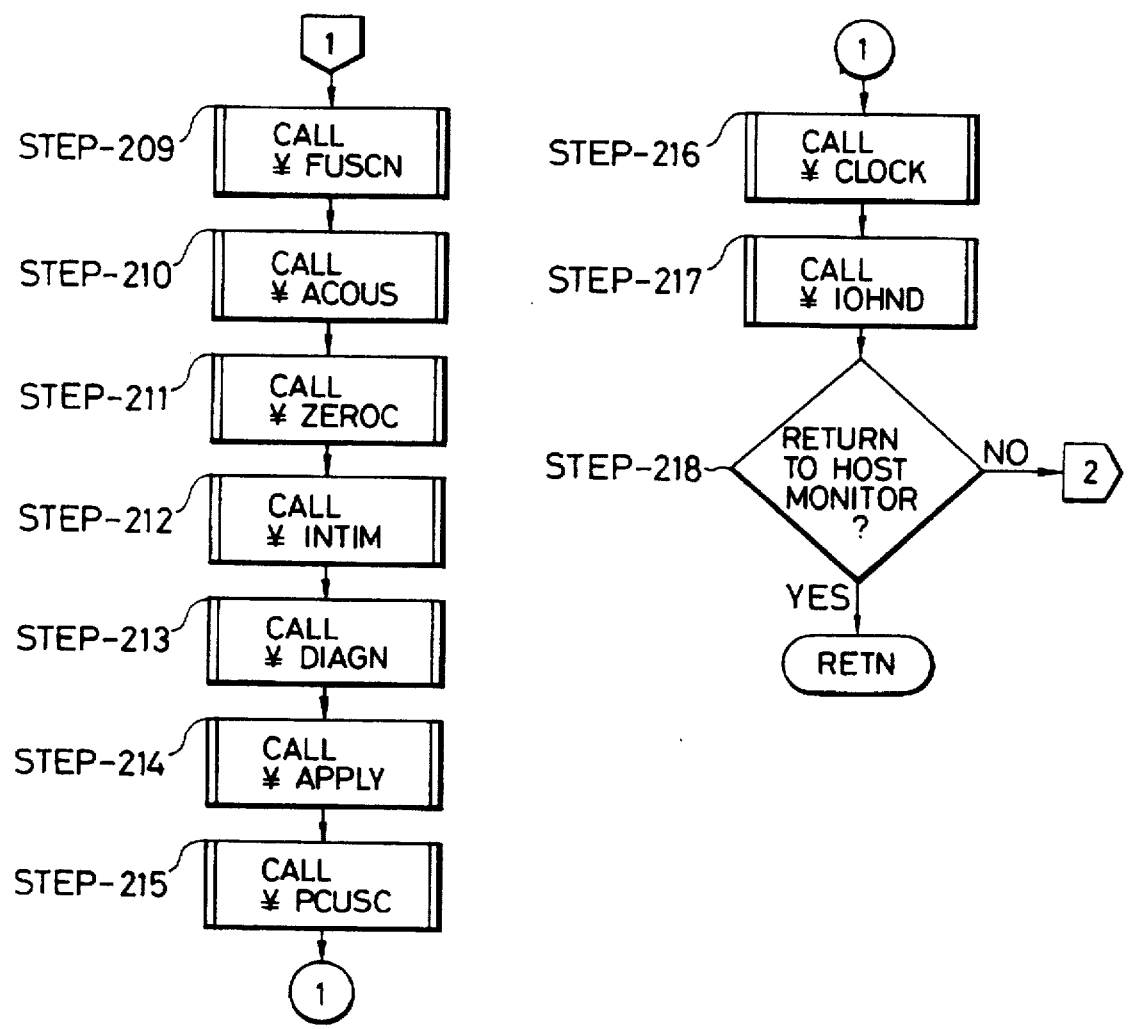
Figures 7, 17:
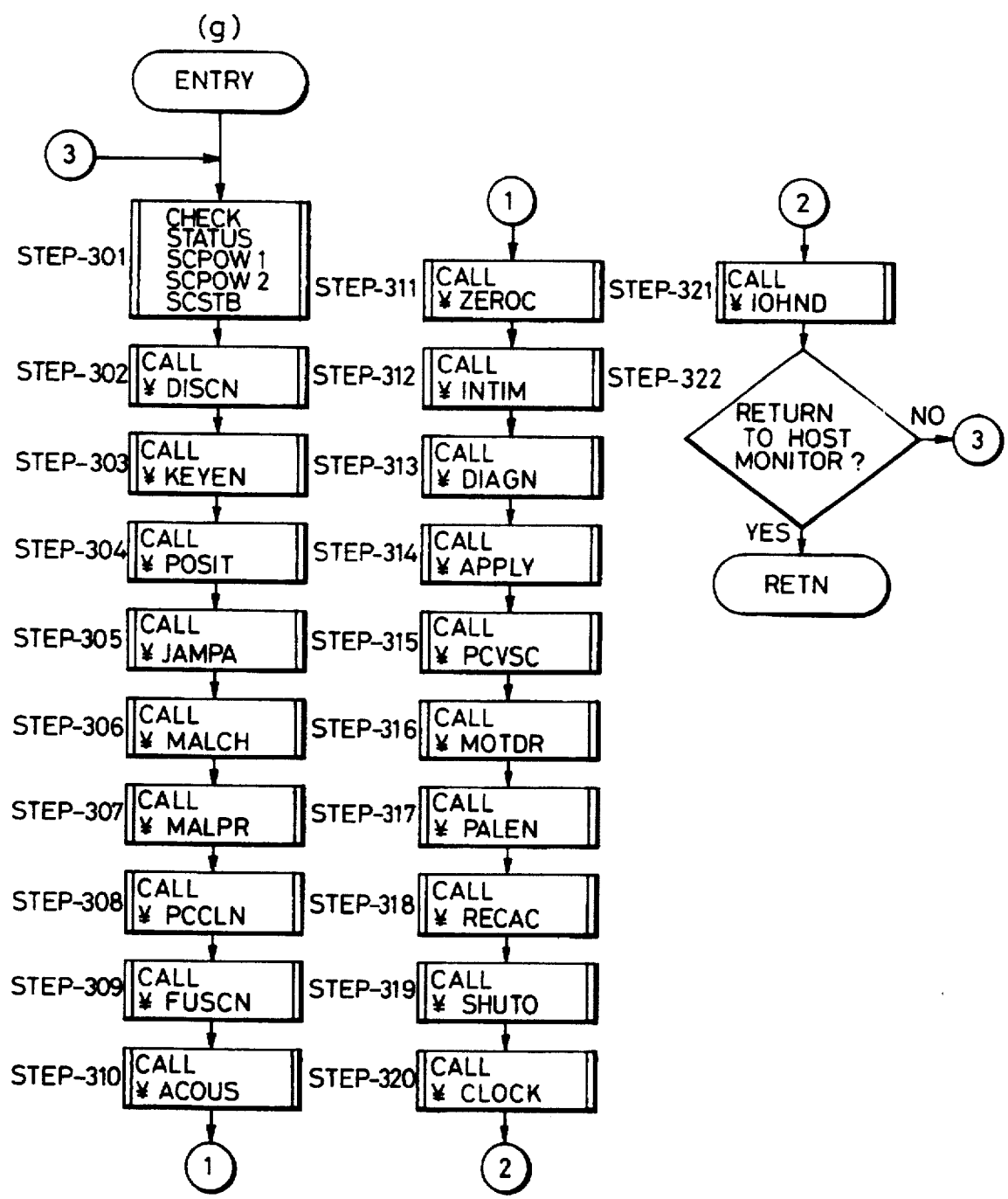
Figures 8, 17:
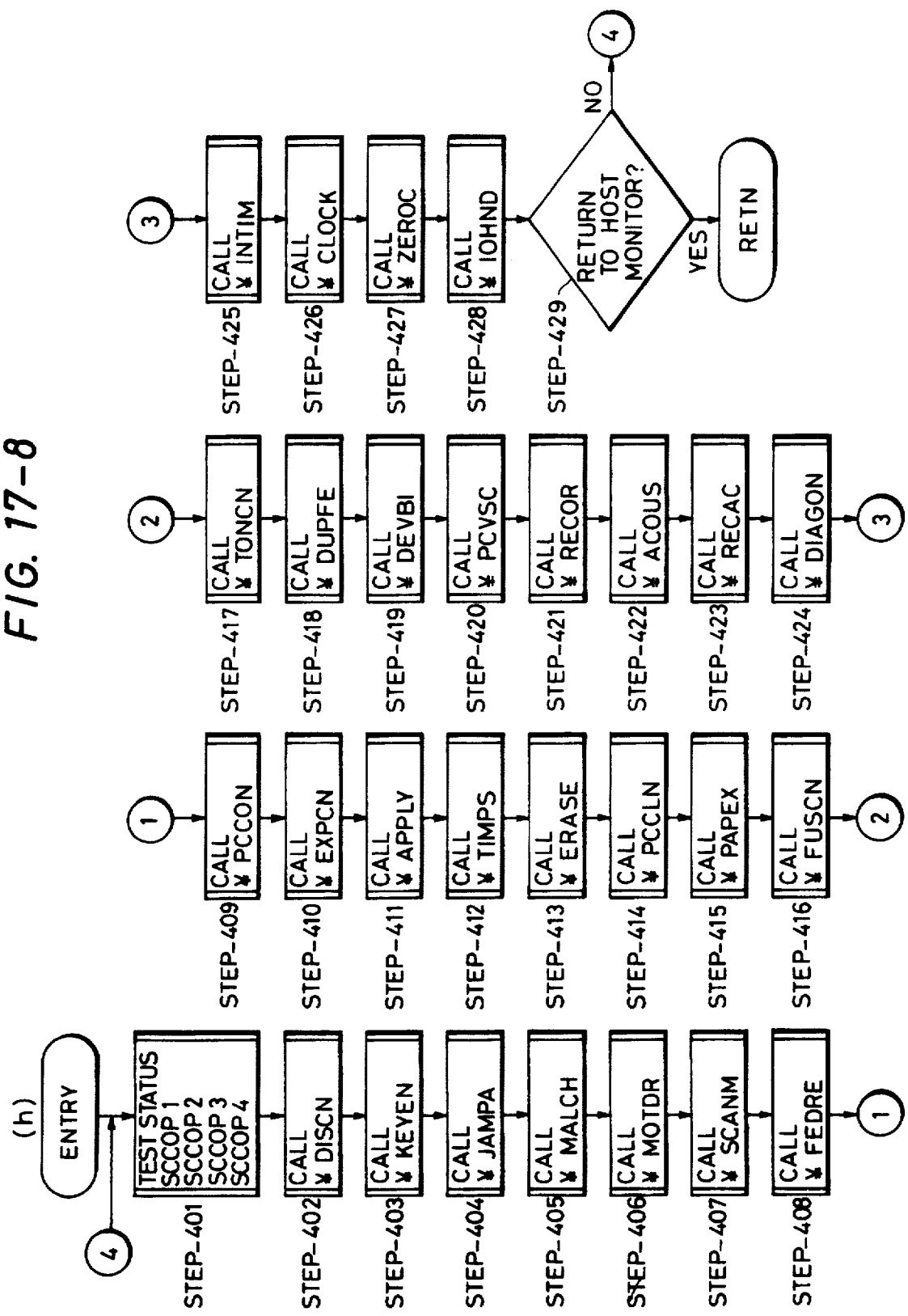
Figures 9, 17:
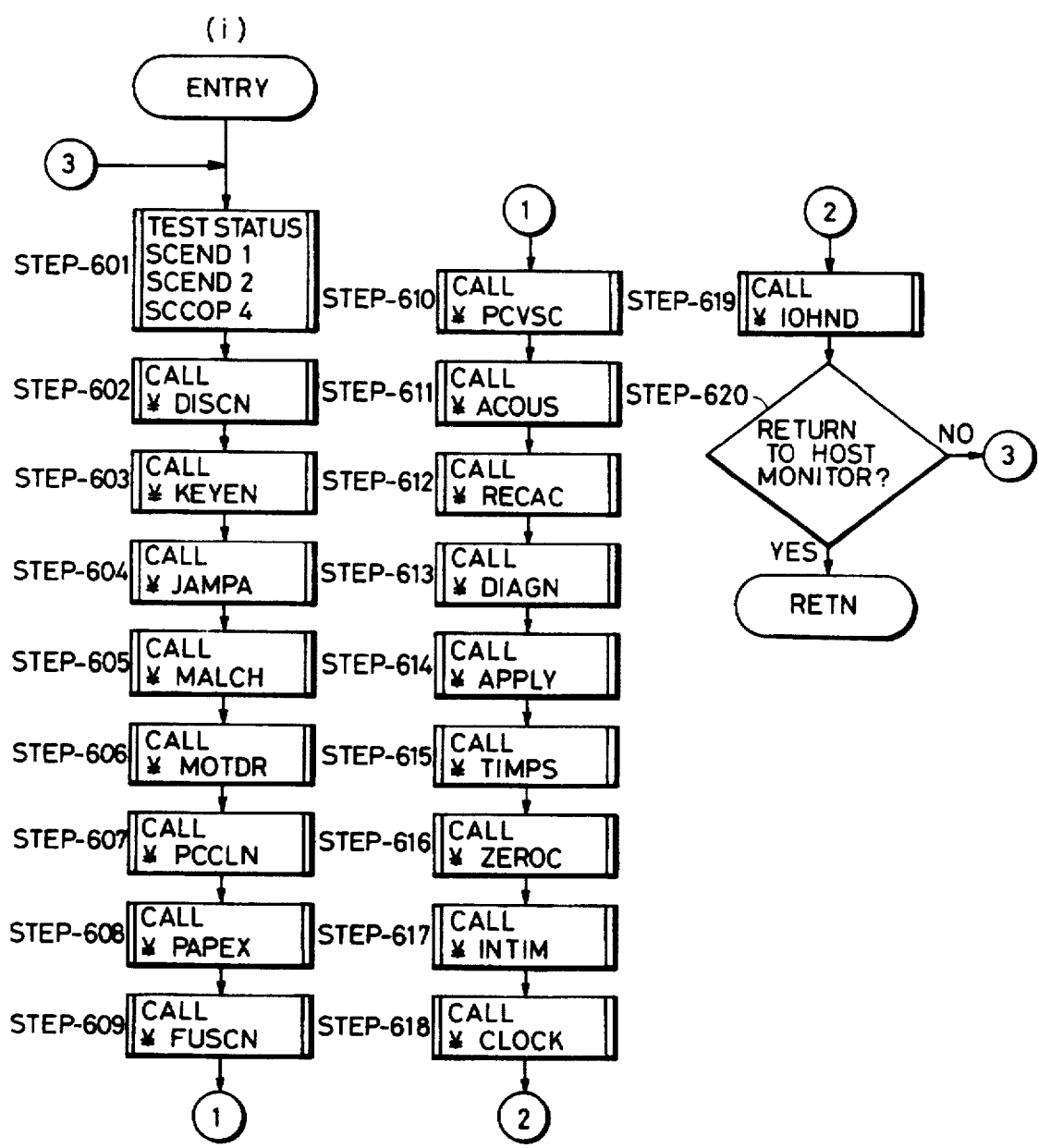
Figures 10, 17:
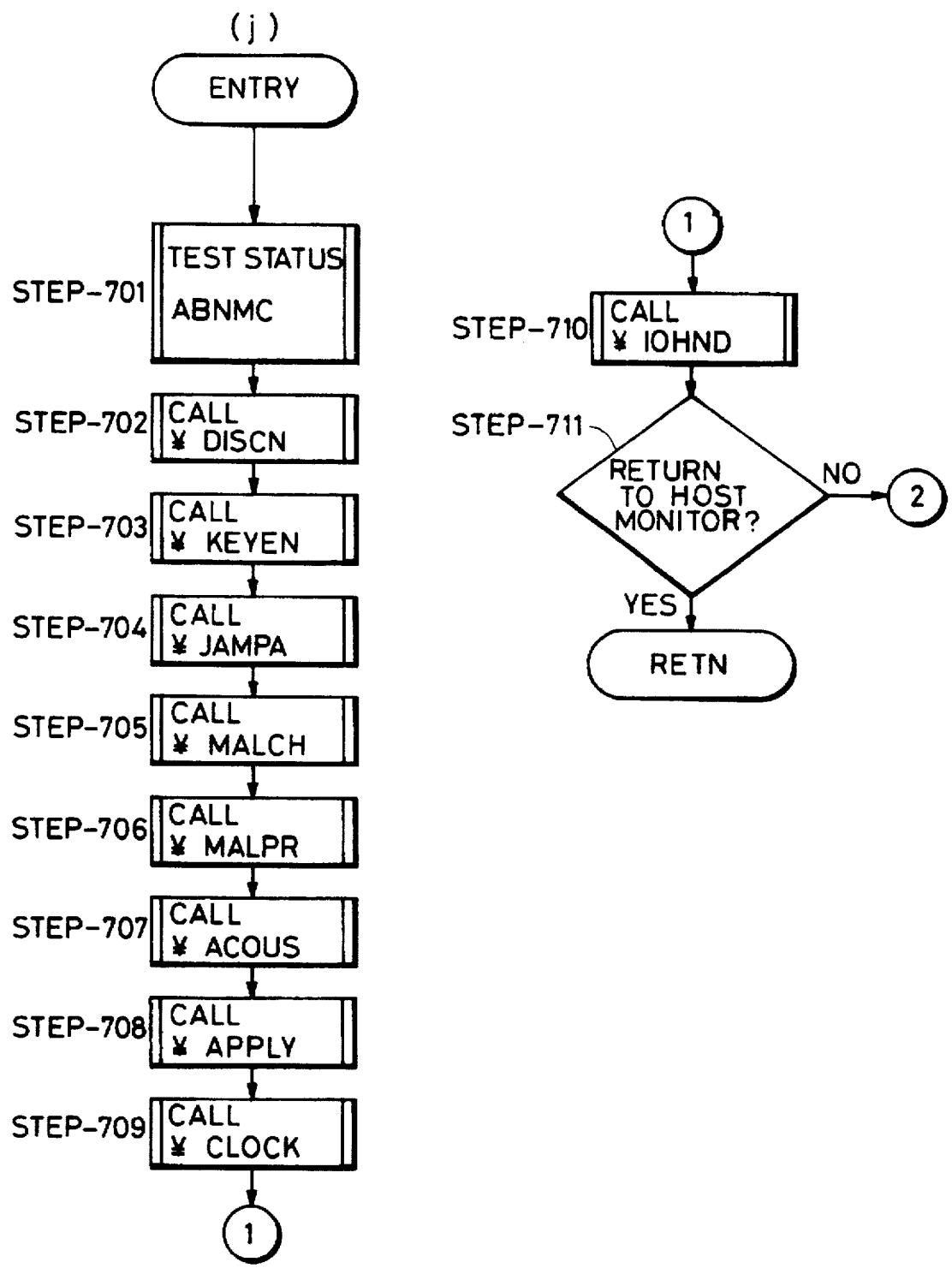

Sheet 16, Fig. 17-1, "MULFUNCTION" (all occurrences) should read --MALFUNCTION--;
    Sheet 33, Fig. 24, "SORTOR" should read --SORTER--; and
    Sheet 35, Fig. 25-2, "ARRANG" should read --ARRANGE--.

COLUMN 1

Line 24, "a" should be deleted;
    Line 25, "Furhter" should read --Further--;
    Line 46, "other" should read --another--;
    Line 50, "other" should read --another--;
    Line 54, "other" should read --another--;
    Line 61, "other" should read --another--; and
    Line 66, "other" should read --another--.

COLUMN 2

Line 4, "other" should read --another--; and
    Line 10, "other" should read --another--.

UNITED STATES PATENT AND TRADEMARK OFFICE
CERTIFICATE OF CORRECTION

PATENT NO. : 5,701,481
DATED     : December 23, 1997
INVENTOR(S) : Masao Hosaka et al.

It is certified that error appears in the above-identified patent and that said Letters Patent is hereby corrected as shown below:

COLUMN 3

Line 1, "superiv-" should read --superv- --;
    Line 33, "Of" should read --of--;
    Line 35, "be next" should read --be executed next.--;
    Line 36, "executed." should be deleted;
    Line 38, "And" should read --and--;
    Line 46, "a" should be deleted; and
    Line 54, "module," should read --modules,--.

COLUMN 4

Line 7, "real time" should read --real-time--;
    Line 12, "in" should read --in a--;
    Line 36, "on a" should read --in--; and
    Line 53, "addresses." should read --address.--.

COLUMN 5

Line 15, "This." should read --This--;
    Line 21, "a" (first occurrence) should be deleted;
    Line 24, "them" should read --then--;
    Line 28, "a step" should read --step--;
    Line 60, "Those copy process" should read --These copy processes--; and
    Line 61, "comprises" should read --comprise--.

COLUMN 6

Line 6, "machine" should read --machines--; and
    Line 17, "are" should read --is--.

UNITED STATES PATENT AND TRADEMARK OFFICE
CERTIFICATE OF CORRECTION

PATENT NO. : 5,701,481
DATED : December 23, 1997
INVENTOR(S) : Masao Hosaka et al.

It is certified that error appears in the above-identified patent and that said Letters Patent is hereby corrected as shown below:

COLUMN 7

Line 8, "turn" should read --turns--.

COLUMN 9

Line 41, "(Limit-less" should read --(Limitless--; and
    Line 47, "tungusten" should read --tungsten--.

COLUMN 10

Line 48, "it" should be deleted.

COLUMN 11

Line 7, "A.C." should read --AC--; and
    Line 28, "monitor" should read --this monitor--.

COLUMN 12

Line 58, "the unity," should read --unity,--.

COLUMN 14

Line 55, "error. When" should read --error when--; and
    Line 65, "the speech" should read --speech--.

COLUMN 15

Line 67, "are" should read --is--.

UNITED STATES PATENT AND TRADEMARK OFFICE
CERTIFICATE OF CORRECTION

PATENT NO. : 5,701,481
DATED : December 23, 1997
INVENTOR(S) : Masao Hosaka et al.

It is certified that error appears in the above-identified patent and that said Letters Patent is hereby corrected as shown below:

COLUMN 16

Line 26, "separetely" should read --separately--; and
    Line 44, "denotes" should read --denote--.

COLUMN 17

Line 4, "detail" should read --details--; and
    Line 57, "bias and" should read --bias, and--.

COLUMN 18

Line 21, "photo-sensitive" should read --photosensitive--;
    Line 39, "option" should read --an option--; and
    Line 60, "speaker of the speech" should read --speech--.

COLUMN 19

Line 5, "of certain decument" should read --of a certain document--; and
    Line 6, "other" should read --another--.

COLUMN 21

Line 3, "overrun" should read --been overrun--;
    Line 4, "dignosis" should read --diagnosis--;
    Line 38, "the step" should read --step--; and
    Line 60, "rised" should read --has risen--.

COLUMN 22

Line 2, "have" should read --has--.

UNITED STATES PATENT AND TRADEMARK OFFICE
CERTIFICATE OF CORRECTION

PATENT NO. : 5,701,481
DATED : December 23, 1997
INVENTOR(S) : Masao Hosaka et al.

It is certified that error appears in the above-identified patent and that said Letters Patent is hereby corrected as shown below:

COLUMN 23

Line 67, "(cooy" should read --(copy--.

COLUMN 24

Line 24, "hardwares" should read --hardware--; and
    Line 25, "and the" should read --and a--.

COLUMN 25

Line 12, "I/O input/output" should read --I/O--;
    Line 36, "is" (second occurrence) should be deleted; and
    Line 41, "counter," should read --counter is used,--.

COLUMN 26

Line 45, "other" should read --another--.

COLUMN 28

Line 9, "10" should be deleted.

COLUMN 29

Line 10, "b1 Not use" should read --b1 Not used--.

COLUMN 30

Line 53, "T-18 Double fee&sensor" should read
      --T-18 Double feed sensor--.

UNITED STATES PATENT AND TRADEMARK OFFICE
CERTIFICATE OF CORRECTION

PATENT NO. : 5,701,481

DATED : December 23, 1997

INVENTOR(S) : Masao Hosaka et al.

It is certified that error appears in the above-identified patent and that said Letters Patent is hereby corrected as shown below:

COLUMN 31

Line 27, "carreis" should read --carries--;
    Line 54, "taste deposit" should read
        --waste is deposited-- and
        "tangusten" should read --tungsten--; and
    Line 58, "tangusten" should read --tungsten--.

COLUMN 32

Line 24, "supplement" should read --supplements--;
    Line 57, "diagnosis" should read --diagnoses--; and
    Line 67, "they,are" should read --they are--.

COLUMN 33

Line 9, "set" should read --sets--.

COLUMN 35

Line 57, "farmware" should read --firmware--.

UNITED STATES PATENT AND TRADEMARK OFFICE
CERTIFICATE OF CORRECTION

PATENT NO.  : 5,701,481
DATED       : December 23, 1997
INVENTOR(S) : Masao Hosaka et al.

It is certified that error appears in the above-identified patent and that said Letters Patent is hereby corrected as shown below:

COLUMN 36

Line 59, "are" should read --is--.

Signed and Sealed this

First Day of September, 1998

Attest:

Attesting Officer

BRUCE LEHMAN
Commissioner of Patents and Trademarks